United States Patent
Tezaur et al.

(10) Patent No.: US 10,339,643 B2
(45) Date of Patent: Jul. 2, 2019

(54) ALGORITHM AND DEVICE FOR IMAGE PROCESSING

(71) Applicant: Nikon Corporation, Tokyo (JP)

(72) Inventors: Radka Tezaur, Belmont, CA (US); Gazi Ali, Mountain View, CA (US); Tetsuji Kamata, Tokyo (JP); Li Hong, San Diego, CA (US)

(73) Assignee: NIKON CORPORATION (JP)

(*) Notice: Subject to any disclaimer, the term of this patent is extended or adjusted under 35 U.S.C. 154(b) by 0 days.

(21) Appl. No.: 15/694,626

(22) Filed: Sep. 1, 2017

(65) Prior Publication Data

US 2017/0365046 A1  Dec. 21, 2017

Related U.S. Application Data

(63) Continuation of application No. 14/826,961, filed on Aug. 14, 2015, now Pat. No. 9,779,491.

(60) Provisional application No. 62/038,100, filed on Aug. 15, 2014, provisional application No. 62/037,979, (Continued)

(51) Int. Cl.
  *G06K 9/40* (2006.01)
  *G06T 5/20* (2006.01)
  *G06T 5/00* (2006.01)

(52) U.S. Cl.
  CPC .......... *G06T 5/20* (2013.01); *G06T 5/004* (2013.01); *G06T 2207/10024* (2013.01); *G06T 2207/20016* (2013.01)

(58) Field of Classification Search
  CPC .......... G06T 5/00; G06T 5/001; G06T 5/003; H04N 5/23264; H04N 5/217; H04N 5/357; H04N 5/365; H04N 5/23212; H04N 5/23248; H04N 5/23254; H04N 5/23258
  See application file for complete search history.

(56) References Cited

U.S. PATENT DOCUMENTS

| | | |
|---|---|---|
| 6,928,182 B1 | 8/2005 | Chui |
| 8,582,910 B2 | 11/2013 | Zhang et al. |
| 2005/0083517 A1 | 4/2005 | Asad et al. |

(Continued)

FOREIGN PATENT DOCUMENTS

| | | |
|---|---|---|
| WO | WO2011139288 A1 | 11/2011 |
| WO | WO2012060835 A1 | 5/2012 |

(Continued)

OTHER PUBLICATIONS

Zhe Hu, et al. "Good Regions to Deblur", ECCV 2012, Firenze, Italy, Oct. 2012.

(Continued)

*Primary Examiner* — Duy M Dang
(74) *Attorney, Agent, or Firm* — Roeder & Broder LLP; Steven G. Roeder

(57) ABSTRACT

Deblurring a blurry image (14) includes the steps of (i) computing a spatial mask (256); (ii) computing a modified blurry image (264) using the blurry image (14) and the spatial mask (256); and (iii) computing a latent sharp image (16) using the modified blurry image (264) and a point spread function (260). Additionally, the image (714) can be analyzed to identify areas of the image (714) that are suitable for point spread function estimation. Moreover, a region point spread function (1630) can be analyzed to classify the point spread function(s) as representing (i) motion blur, (ii) defocus blur, or (iii) mixed motion blur and defocus blur. A point spread function (2670) can also be estimated.

20 Claims, 40 Drawing Sheets

Related U.S. Application Data filed on Aug. 15, 2014, provisional application No. 62/037,804, filed on Aug. 15, 2014.

(56) References Cited

U.S. PATENT DOCUMENTS

| | | | |
|---|---|---|---|
| 2008/0317357 | A1 | 12/2008 | Steinberg et al. |
| 2012/0105655 | A1 | 5/2012 | Ishii et al. |
| 2013/0033608 | A1 | 2/2013 | Hong |
| 2013/0169824 | A1 | 7/2013 | Hong et al. |
| 2014/0078320 | A1 | 3/2014 | Hong |

FOREIGN PATENT DOCUMENTS

| | | | |
|---|---|---|---|
| WO | WO2013025220 | A1 | 2/2013 |
| WO | WO2013148139 | A1 | 10/2013 |
| WO | WO2013148142 | A1 | 10/2013 |
| WO | WO2014074137 | A1 | 5/2014 |
| WO | WO2014074138 | A1 | 5/2014 |
| WO | WO2015/047538 | A1 | 4/2015 |

OTHER PUBLICATIONS

M.S.C. Almeida, A. Abelha, and L.B. Almeida, "Multi-resolution approach for blind deblurring of natural images", IEEE International Conference on Image Processing, ICIP'2012, Sep. 30-Oct. 3, Orlando, Florida, US 2012.

Michal Sorel and Filip Sroubek, "Restoration in the presence of unknown spatially varying blur", Chapter 1 of Image Restoration: Fundamentals and Advances, Editors: Gunturk Bahadir and Li Xi, Sep. 11, 2012, CRC Press.

Hyeoungho Bae, Charless C. Fowlkes and Pai H. Chou, "Patch Mosaic for Fast Motion Deblurring", Computer Vision, ACCV 2012, Lecture Notes in Computer Science vol. 7726, 2013, pp. 322-335.

International Search Report and Written Opinion of the International Searching Authority, PCT/US2013/029655, dated May 13, 2013, Nikon Corporation.

International Application Serial No. PCT/US2013/029655 with its entire prosecution and file history, Mar. 7, 2013, Nikon Corporation.

Matlab Image Procession Toolbox function, deconvlucy. Applicant does not know the exact date of this publication. However, Applicant admits this is prior art.

He, et al. "Guided Image Filtering", IEEE, Transactions on Pattern Analysis and Machine Intelligence, vol. 35, No. 6, pp. 1397-1490, Jun. 2013 (updated version of a paper published at ECCV 2010).

Wang, et al. "A New Alternating Minimization Algorithm for Total Variation Image Reconstruction", Society for Industrial and Applied Mathematics, J. Imaging Sciences, vol. 1, No. 3, pp. 248-272, 2008.

Sroubek, et al. "Robust Multichannel Blind Deconvolution via Fast Alternating Minimization", IEEE, Transactions on Image Processing, vol. 21, No. 4, pp. 1687-1700, 2012.

He, et al. "Guided Image Filtering", ECCV, 2010.

Cho, et al. "Handling Outliers in Non-Blind Image Deconvolution", ICCV.

Whyte, et al. "Deblurring Shaken and Partially Saturated Images", ICCV, 2011.

Hirsch, et al, "Fast Removal of Non-Uniform Camera Shake", Proc. IEEE International Conference on Computer Vision, 2011.

Whyte, et al. "Non-uniform Deblurring for Shaken Images", Proc. CVPR, 2010.

Kumar, et al. "Real-Time Affine Global Motion Estimation Using Phase Correlation and Its Application for Digital Image Stabilization,", IEEE Trans. on Image Processing, Dec. 2011.

Cho, et al. "Fast Motion Deblurring", SigGraph 2009.

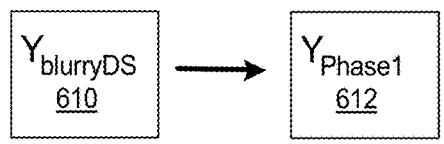
Fig. 6A
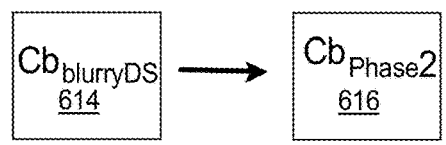
Fig. 6B
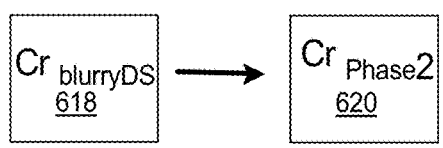
Fig. 6C
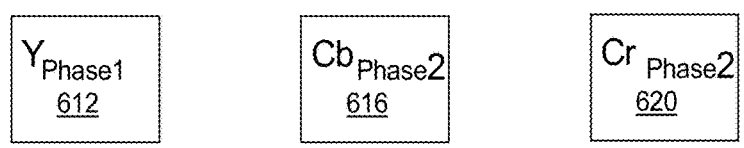
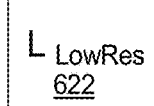
Fig. 6D
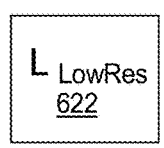 ... 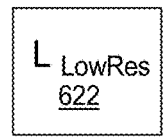
Fig. 6E
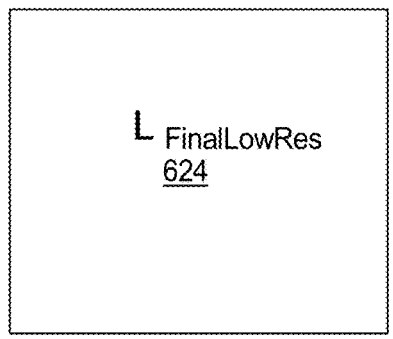

ALGORITHM AND DEVICE FOR IMAGE PROCESSING

RELATED APPLICATIONS

This application is a continuation of U.S. patent application Ser. No. 14/826,961, filed on Aug. 14, 2015, and entitled "ALGORITHM AND DEVICE FOR IMAGE PROCESSING". U.S. patent application Ser. No. 14/826,961 claims priority on U.S. Provisional Application No. 62/038,100, entitled "DETECTION OF SUITABLE REGION OF IMAGE FOR PSF ESTIMATION", and filed on Aug. 15, 2014. U.S. patent application Ser. No. 14/826,961 also claims priority on U.S. Provisional Application No. 62/037,979, entitled "ALGORITHM AND DEVICE FOR DECONVOLUTION WITH OUTLIER MASKING", and filed on Aug. 15, 2014. Further, U.S. patent application Ser. No. 14/826,961 claims priority on U.S. Provisional Application No. 62/037,804, entitled "POINT SPREAD FUNCTION ANALYSIS AND GLOBALLY DOMINANT POINT SPREAD FUNCTION ESTIMATION", and filed on Aug. 15, 2014. As far as permitted, the contents of U.S. patent application Ser. No. 14/826,961, the contents of U.S. Provisional Application No. 62/038,100, the contents of U.S. Provisional Application No. 62/037,979, and the contents of U.S. Provisional Application No. 62/037,804 are incorporated herein by reference.

BACKGROUND

Cameras are commonly used to capture an image of a scene that includes one or more objects. Unfortunately, some of the images can be blurred. For example, movement of the camera and/or movement of the objects in the scene during the exposure time of the camera can cause the image to be blurred. Further, if the camera is not properly focused when the image is captured, the image can be blurred. Additionally, blur can be caused by lens aberrations in the image apparatus.

When blur is sufficiently spatially uniform, a blurred captured image can be modeled as the convolution of a latent sharp image with some point spread function ("PSF") plus noise, $$B=K*L+N_o. \quad \text{Equation (1)}$$

In Equation 1 and elsewhere in this document, (i) "B" represents a blurry image, (ii) "L" represents a latent sharp image, (iii) "K" represents a PSF kernel, and (iv) "$N_o$" represents noise (including quantization errors, compression artifacts, etc.).

A non-blind deconvolution problem seeks to recover the latent sharp image L when the PSF kernel K is known or already estimated. The non-blind deconvolution problem is a very difficult to accurately solve because it is sensitive to any departures from the underlying mathematical model, estimation errors, and noise in the data. The inverse problem of recovering both the latent sharp image L and the PSF kernel K when only the blurry image B is known, is called a blind deconvolution problem.

Moreover, many blurry images include areas that further complicate the problem of recovering a latent sharp image L and/or the point spread function. For example, extremely bright areas where the sensor pixels reach their saturation point in the blurry image B can adversely influence the resulting latent sharp image L. Additionally, salt and pepper noise due to defective pixels in the sensor, and other outliers violating the convolution blurring model tend to reduce the accuracy of the latent sharp image.

The pixels containing extremely bright areas, noise, and other outliers can be clipped during the deconvolution process to reduce the influence on the accuracy of the latent sharp image. Unfortunately, the clipping of these pixels tend to produce severe ringing artifacts in the resulting latent sharp image, which are very hard to avoid. Some special techniques for suppressing these artifacts have been developed, but they tend to be complicated and computationally expensive.

Additionally, many images have strong edge bias, noise, or lack sufficient reliable edge/texture information. As a result thereof, the estimated PSF kernel in many instances is not very accurate.

Further, sophisticated deconvolution methods used for high quality deblurring tend to be very complex and slow. This makes deblurring of high resolution images produced by modern digital cameras too slow for the use in a commercial product used by the general public.

Additionally, certain areas of a blurry image B will have a different blur PSF kernel. Thus, it is often very difficult to accurately determine the PSF kernel K and the latent sharp image L of a blurry image.

SUMMARY

The present invention is directed to a method for deblurring a blurry image having a point spread function. In one embodiment, the method includes the steps of: (i) computing a spatial mask for the blurry image; (ii) computing a modified blurry image using the blurry image and the spatial mask; and (iii) computing a latent sharp image using the modified blurry image and the point spread function. As provided herein, these three steps can alternately be repeated and updated for a plurality of iterations. Further, the unique three step method is efficient, fast, and suitable for deblurring high resolution images produced by modern digital cameras. Additionally, the proposed method can be used in conjunction with any selected non-blind deconvolution model.

The spatial mask can be computed by using a boundary mask, a highlight mask, and an outlier mask. With this design, the spatial mask suppresses ringing artifacts that are caused by clipped highlights, defective pixels, boundary pixels, and other outliers. This will improve the quality of the deblurred image.

As provided herein, the outlier mask can be based on a difference between the blurry image and the re-blurred latent sharp image. In one embodiment, the outlier mask is computed by (i) generating a reblurred image by reblurring the latest version of the latent sharp image with the point spread function; (ii) generating an absolute difference array by comparing the blurry image and the reblurred image; (iii) generating a transformed array by transforming the absolute difference array to have values in the range of zero to one; (iv) generating a binary array by converting the transformed array to values of zero or one; and (v) processing the transformed array with the binary array to generate the outlier mask. It should be noted that steps (iv) and (v) can be optional.

In one embodiment, the modified blurry image can be computed by (i) generating a reblurred image by reblurring the latent sharp image with the point spread function; and (ii) using the reblurred image to compute the modified blurry image.

Further, as provided herein, the step of computing a latent sharp image can include using a Wiener filter. Alternatively, the step of computing a latent sharp image can include using a regularized least squares cost function or a generalized regularized least squares cost function. In certain embodiments, the latent sharp image cost function can be a modified regularized least squares cost function that includes one or more fidelity terms and one or more regularization terms.

In another embodiment, the method includes the steps of: (i) downsampling the blurry image to create downsampled blurry image, the downsampled blurry image being in the YCbCr color space and including a luminance channel, a Cb chrominance channel, and a Cr chrominance channel; (ii) downsampling the point spread function to create a downsampled point spread function; (iii) performing a phase one of deconvolution on the luminance channel of the downsampled blurry image to generate a phase one image; (iv) performing a phase two of deconvolution on the chrominance channels of the downsampled blurry image to generate a Cb phase two image and a Cr phase two image; and (v) utilizing the phase one image, and the phase two images to generate the latent sharp image.

In still another embodiment, the method can include the steps of: (i) downsampling the blurry image to create downsampled blurry image, the downsampled blurry image being in the YCbCr color space and including a luminance channel, a Cb chrominance channel, and a Cr chrominance channel; (ii) downsampling the point spread function to create a downsampled point spread function; (iii) performing a phase one of deconvolution on the luminance channel of the downsampled blurry image to generate a phase one image; (iv) performing a phase two of deconvolution on the chrominance channels of the downsampled blurry image to generate a Cb phase two image and a Cr phase two image; (v) upsampling the phase one image to create an upsampled phase one image; (vi) upsampling the Cb phase two image to create an upsampled Cb phase two image; (vii) upsampling the Cr phase two image to create an upsampled Cr phase two image; (viii) performing a phase three of deconvolution on a luminance channel of the blurry image to create a phase three image; and (ix) blending the upsampled phase one image, the upsampled phase two images, and the phase three image to generate the latent sharp image.

With this design, the present method produces high quality deblurred images, and, because large portion of computations is performed at a lower resolution, it is very fast, which makes it practical for deblurring of high resolution images produced by modern digital cameras.

In one embodiment, the step of performing a phase two of deconvolution includes the step of generating an edge mask using the phase one image and using the edge mask during the phase two of deconvolution.

Further, the step of performing a phase one of deconvolution can include the step of using an adaptive number of iterations depending on a presence of ringing artifacts in the blurry image.

Moreover, the step of performing a phase three of deconvolution can include the step of using the upsampled phase one image during the phase three of deconvolution.

Additionally, the step of performing a phase one of deconvolution can include using phase one regularization weights, the step of performing a phase three of deconvolution can include using phase three regularization weights, and the phase three regularization weights can be lower than the phase one regularization weights.

In one embodiment, the step of blending includes the step of blending a detail layer of the phase three image with a base layer of the upsampled phase one image to create a blended luminance channel image. As provided herein, the "base layer" is the result of filtering the image with either a low-pass filter (such as a Gaussian filter), or with a smoothing edge-preserving filter, such as a bilateral filter or a guided filter. The "detail layer" is what is left after subtracting the base layer from the image.

Moreover, in certain embodiments, the step of upsampling the Cb phase two image can include using the blended luminance channel image as a guide, and the step of upsampling the Cr phase two image can include using the blended luminance channel image as a guide.

In still another embodiment, the present invention is directed to a system and method for evaluating an image to identify areas of the image that are suitable or best suited for point spread function estimation. In one embodiment, the method includes (i) dividing the image into a plurality of image regions with a control system that includes a processor, each image region including a plurality of pixels; (ii) selecting a first image region from the plurality of image regions; and (iii) computing a first feature value for a first region feature of the first image region with the control system, the first region feature being a low level feature that is related to the accuracy of the point spread function estimation.

As provided herein, in order to make the PSF estimation more robust and more accurate, the present invention uses certain characteristics that make the PSF estimation more reliable or less reliable to identify image regions in the image that are best suited for PSF estimation. More specifically, the low level region features can relate to characteristics that make the PSF estimation more reliable or less reliable. For example, a lot of texture and edges in many different directions typically makes the PSF estimation more reliable, while insufficient brightness or the presence of saturated (clipped) highlights typically makes the PSF estimation less reliable.

In certain embodiments, one or more of the region feature(s) can be selected from a group that includes (i) an edge direction histogram skewness; (ii) a relative amount of edges; (iii) a dynamic range of gradient magnitude; (iv) a relative amount of strong highlights; and (v) an average intensity.

Additionally, the present method can include computing a second feature value for a second region feature of the first image region, the second region feature being related to the accuracy of the point spread function estimation. Further, the first feature value can be transformed to a first feature score, and the second feature value can be transformed to a second feature score. Moreover, the feature scores can have a similar range. Additionally, a region score for the first image region can be computed utilizing the first feature score and the second feature score. Next, the region score can be evaluated to estimate if the selected image region is suitable for PSF estimation In another embodiment, a third feature value for a third region feature of the first image region is also calculated. In this embodiment, the third region feature is also related to the accuracy of the point spread function estimation. Additionally, the third feature value can be transformed to a third feature score, and the feature scores all have a similar range. Further, the region score can be computed for the first image region utilizing the first feature score, the second feature score, and the third feature score.

It should be noted that the present method can be repeated for each of the image regions in the image. Next, the region scores can be reviewed to identify the image regions best suited for PSF estimation. Further, PSF estimation and deconvolution can be performed.

In still another embodiment, the present invention is directed to a method for classifying a region point spread function of an image region. In certain embodiments, an image can be divided into one or more image regions, and the present invention can be used to determine a region point spread function for each image region and classify each region point spread function. In one embodiment, the region point spread function estimation and subsequent processing may be performed with a control system with a processor or a personal computer. In one embodiment, the method includes analyzing a shape of the region point spread function to estimate a trail characteristic (e.g. a trail width or trail length) of the region point spread function. In one embodiment, the region point spread function is converted into a binary point spread function that includes a binary blur trail, and the trail characteristic is estimated from the binary blur trail of the binary point spread function. Subsequently, for example, the information regarding the trail characteristic can be used to accurately classify the one or more point spread function(s) representing different classes, for example (i) motion blur, (ii) defocus blur, or (iii) mix of motion blur and defocus blur (mixed blur).

In one embodiment, the "trail length" is equal to a length (number of pixels) of the path connecting a beginning to an ending in the binary blur trail. Further, in one embodiment, the "trail width" is equal to an average width (number of pixels perpendicular to the trail path) in the binary blur trail.

In one embodiment, the present invention (i) applies a skeleton or morphological operation on the binary point spread function to generate a skeleton region point spread function having a skeleton blur trail; and (ii) utilizes information from the skeleton blur trail of the skeleton region point spread function to estimate the trail width. In this embodiment, the trail length is determined from the skeleton blur trail, and the trail width is determined by dividing the area of the binary blur trail by the trail length.

In another embodiment, the present invention (i) closely encircles the binary blur trail of the binary point spread function with an ellipse having a major axis and a minor axis; and (ii) estimates the trail width as the length of the ellipse along the minor axis.

In still another embodiment, the present invention (i) determines a perimeter of the binary blur trail of the binary point spread function; (ii) estimates the upper bound of the trail length to be equal to the perimeter divided by two; (iii) estimates a blur trail area of the binary point spread function; and (iv) estimates the trail width to be equal to the blur trail area divided by the trail length.

Additionally, in certain embodiments, the present invention classifies the region point spread function as one of non-motion blur, mixed blur, or motion blur based on the estimated trail width. For example, the region point spread function is (i) classified as non-motion blur if the estimated trail width is greater than a first width threshold; (ii) classified as mixed blur if the estimated trail width is less than the first width threshold but greater than a second width threshold which is less than the first width threshold; and (iii) classified as motion blur if the estimated trail width is less than a third width threshold which is less than the second width threshold.

The present invention is also directed to a method for estimating a globally dominant point spread function for at least a portion of an image. In this embodiment, the method includes the steps of dividing the image into a plurality of image regions; estimating a separate region point spread function for a plurality of the image regions; classifying each of the region point spread functions; and estimating the group point spread function using the region point spread functions that have been classified as mixed blur or motion blur. The term globally dominant can also be referred to as group, because the resulting globally dominant point spread function represent the global change that occurs in a group of image regions.

Additionally, the present invention is directed to a method for estimating a spatially varying point spread function for an image that includes the steps of dividing the image into a plurality of image regions; estimating a separate region point spread function for a plurality of the image regions; classifying each of the region point spread functions; and estimating the spatially varying point spread function using the region point spread functions that have been classified as mixed or motion blur. In another embodiment, the present invention is directed to a device that includes a control system that preforms one or more of the steps provided herein. The present invention is also directed to a camera that performs the steps provided herein.

Moreover, the present invention is directed to a system and method for estimating a point spread function for at least a portion of a blurred image. In one embodiment, the method includes the steps of: dividing the blurred image into a plurality of image blocks including a first image block, a second image block and a third image block; downsampling the blurred image to create a low resolution image; creating a plurality of patch images from the low resolution image; estimating a seed point spread function for each of the patch images; estimating a first starter point spread function using a plurality of the seed point spread functions; and estimating a first block point spread function of the first image block using the first starter point spread function to start the point spread function estimation for the first image block in a multiple resolution framework.

As provided herein, the accuracy of the first starter point spread function is improved because multiple seed point spread functions are used when it is being estimated. A more accurate first starter point spread function will improve the resulting first block point spread function and will reduce the computational time.

In one embodiment, the same first starter point spread function is used to start the point spread function estimation for each image block in the blurred image. For example, (i) a second block point spread function of the second image block can be estimated using the first starter point spread function to start the point spread function estimation for the second image block in a multiple resolution framework; and (ii) a third block point spread function of the third image block can be estimated using the first starter point spread function to start the point spread function estimation for the third image block in a multiple resolution framework. In this embodiment, the first starter point spread function can use the plurality of seed point spread functions to estimate a globally dominant point spread function that is used as the first starter point spread function.

In another embodiment, a different starter point spread function is used to start the point spread function estimation for each image block. For example, (i) the second block point spread function of the second image block can be estimated using a second starter point spread function to start the point spread function estimation for the second image block in a multiple resolution framework; and (ii) the third block point spread function of the third image block can be estimated using a third starter point spread function to start the point spread function estimation for the third image block in a multiple resolution framework. In this embodiment, for example, each starter point spread function can be a weighted sum average of the seed point spread functions.

Additionally, in certain embodiments, during estimation of each block point spread function, properties from a plurality of the seed point spread functions are used to check the quality of refinement.

In another embodiment, the present invention is directed to a method for estimating an area point spread function of an image area of a blurred image. In this embodiment, the method can include the steps of: downsampling the blurred image to create a low resolution image; creating a plurality of patch images from the low resolution image; estimating a separate seed point spread function for each of the patch images; estimating a starter point spread function using a plurality of the seed point spread functions; and estimating the area point spread function of the image area using the starter point spread function as the starting point spread function for the image area in a multiple resolution framework.

In still another embodiment, the present invention is directed to a system for estimating a point spread function for at least a portion of a blurred image. In this embodiment, the system can include a control system having a processor that (i) divides the blurred image into a plurality of image blocks including a first image block, a second image block and a third image block; (ii) downsamples the blurred image to create a low resolution image; (iii) creates a plurality of patch images from the low resolution image; (iv) estimates a seed point spread function for each of the patch images; (v) estimates a first starter point spread function using a plurality of the seed point spread functions; and (vii) estimates a first block point spread function of the first image block using the first starter point spread function to start the point spread function estimation for the first image block in a multiple resolution framework.

Additionally, the present invention is directed to a system and method for estimating a region point spread function for an image region. In one embodiment, the method includes the steps of: (i) estimating a point spread function mask for the image region; (ii) estimating a preliminary point spread function for the image region; and (iii) estimating the region point spread function by cropping the preliminary point spread function using the point spread function mask. The step of estimating the region point spread function can occur at full resolution of the image region.

As an overview, in certain embodiments, the point spread function mask is used to crop the preliminary point spread function to reduce outlier created by strong edge bias and noise. This should improve the accuracy of the resulting point spread function.

In one embodiment, the point spread function mask is estimated by (i) downsampling the image region; (ii) estimating a downsampled point spread function from downsampled image region; and (iii) computing the point spread function mask using the downsampled point spread function. Further, this method can include the steps of (i) thresholding the downsampled point spread function to generate an initial, thresholded point spread function, and (ii) slightly expanding the initial thresholded point spread function to generate the point spread function mask.

The region point spread function can be estimated by (i) identifying outliers by comparing the preliminary point spread function to the point spread function mask, and (ii) applying a cropping operation on the preliminary point spread function. In this example, the step of applying a cropping operation includes the steps of (i) setting a pixel value to zero for each identified outlier; and (ii) renormalizing the cropped point spread function. In certain embodiments, a cropping threshold test must be met prior to cropping.

The present invention is also directed to a system for estimating a region point spread function for an image region. The system can include a control system having a processor that (i) estimates a point spread function mask for the image region; (ii) estimates a preliminary point spread function for the image region; and (iii) estimates the region point spread function by using the point spread function mask to reduce outliers from the preliminary point spread function.

In yet another embodiment, the method includes the steps of: (i) estimating a histogram of gradients for the pixels of the image region, the histogram of gradients including a plurality of first gradient pixels having a first gradient orientation and a plurality of second gradient pixels having a second gradient orientation; (ii) generating a first gradient magnitude threshold for the first gradient orientation; (iii) generating a second gradient magnitude threshold for the second gradient orientation that is different from the first gradient magnitude threshold; (iv) identifying the first gradient pixels having a magnitude greater than the first gradient threshold, and the second gradient pixels having a magnitude greater than the second gradient threshold; and (v) estimating the region point spread function using the identified first gradient pixels and the identified second gradient pixels.

Further, the method can include the step of estimating a first edge strength of the first gradient orientation and a second edge strength of the second gradient orientation. In this embodiment, if the first edge strength is greater than the second edge strength, then the second gradient magnitude threshold is set to be less than the first gradient magnitude threshold. Additionally, in this embodiment, the method can include the step of estimating an initial gradient magnitude threshold. In this example, the first gradient magnitude threshold is determined by increasing the initial gradient magnitude threshold, and the second gradient magnitude threshold is determined by decreasing the initial gradient magnitude threshold.

Additionally, the histogram of gradients can include a plurality of third gradient pixels having a third gradient orientation. In this example, the method includes the steps of (i) estimating a third edge strength of the third gradient orientation and a second edge strength of the second gradient orientation; (ii) generating a third gradient magnitude threshold for the third gradient orientation that is different from the first gradient magnitude threshold and the second gradient magnitude threshold; and identifying the third gradient pixels having a magnitude greater than the third gradient threshold. In this example, the step of estimating the region point spread function uses the identified third gradient pixels.

In yet another embodiment, the present invention is directed to a system having a control system that includes a processor that (i) estimates a histogram of gradients for the pixels of the image region, the histogram of gradients including a plurality of first gradient pixels having a first gradient orientation and a plurality of second gradient pixels having a second gradient orientation; (ii) generates a first gradient magnitude threshold for the first gradient orientation; (iii) generates a second gradient magnitude threshold for the second gradient orientation that is different from the first gradient magnitude threshold; (iv) identifies the first gradient pixels having a magnitude greater than the first gradient threshold, and the second gradient pixels having a magnitude greater than the second gradient threshold; and (v) estimates the region point spread function using the identified first gradient pixels and the identified second gradient pixels.

Additionally, the present invention is directed to a system and method for estimating a latent sharp image from a blurry image using one or more region point spread functions.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6A is a simplified illustration of a blurry, downsampled luminance channel image ("$Y_{BlurryDS}$") and a deblurred, low resolution, luminance channel image ("$Y_{Phase1}$");

FIG. 6B is a simplified illustration of a illustrates that a blurry, downsampled first ("Cb") chrominance channel image ("$Cb_{BlurryDS}$"), and a deblurred, low resolution, first chrominance channel image ("$Cb_{Phase2}$");

FIG. 6C is a simplified illustration of a blurry, downsampled second ("Cr") chrominance channel image ("$Cr_{BlurryDS}$"), and a deblurred, low resolution, second chrominance channel image ("$Cr_{Phase2}$") 620;

FIG. 6D is a simplified illustration of the deblurred, low resolution, luminance channel image ("$Y_{Phase1}$"), the deblurred, low resolution, first chrominance channel image ("$Cb_{Phase2}$"), the deblurred, low resolution, second chrominance channel image ("$Cr_{Phase2}$"), and a deblurred, low resolution image region ("$L_{LowRes}$");

FIG. 6E is a simplified illustration of a plurality of deblurred, low resolution images ("$L_{LowRes}$") and a low resolution deblurred entire image ("$L_{FinalLowRes}$");

FIGS. 20A, 20B, and 200 illustrate alternative binary regions point spread functions encircled by an ellipse;

DESCRIPTION

Figure 1:
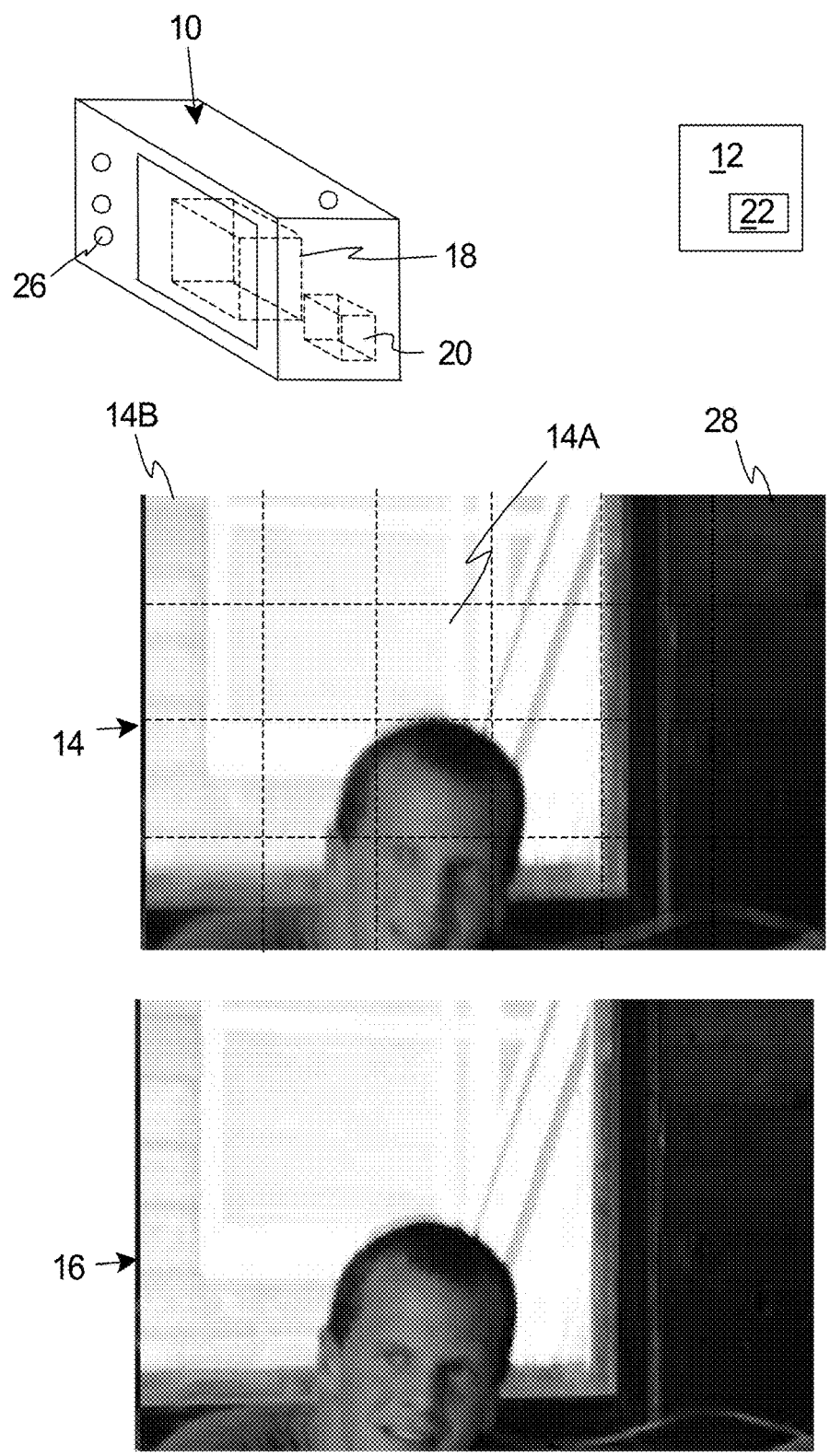
FIG. 1 is a simplified view a computer having features of the present invention, an image apparatus having features of the present invention, a blurry image, and a deblurred image.

FIG. 1 is a simplified perspective view of an image apparatus 10 (e.g. a digital camera), and a computer 12 (illustrated as a box). FIG. 1 also illustrates an entire blurry image 14 (illustrated away from the image apparatus 10) captured by the image apparatus 10, and an entire deblurred, latent sharp image 16 (illustrated away from the image apparatus 10). It should be noted that the entire blurry image 14 illustrated in FIG. 1 includes an extremely bright area 14A ("highlights") where some of the pixels of an image sensor 18 of the image apparatus 10 have reached their saturation point, and a boundary region 14B at the edges of the image 14.

As an overview, in certain embodiments, the present invention is directed to one or more unique algorithms that provide fast and efficient means of suppressing ringing artifacts in the deblurred image 16 that are caused by clipped highlights, defective pixels, boundary pixels, and other outliers in the image data that violate the convolution blurring model. In certain embodiments, the proposed method allows for the use of a spatial mask ("M") that suppresses ringing artifacts in the deblurred image 16 caused by the clipped highlights, boundary pixels, and other outliers. This will improve the quality of the deblurred image 16. The proposed method is efficient, fast, and suitable for deblurring high resolution images produced by modern digital cameras.

Additionally, the proposed methods can be used in conjunction with any selected non-blind deconvolution model (sometimes referred to as a "deblurring algorithm"). This provides more flexibility in the design of the deblurring algorithm, while still allowing for the suppression of ringing artifacts. Further, this will allow for the suppression of ringing artifacts using algorithms developed in the future that are faster and/or produce deblurred images of higher quality.

In one embodiment, the image apparatus 10 can include a control system 20 that uses one or more of the algorithms for deconvoluting the blurred image 14 to provide the latent sharp image 16. Alternatively, the computer 12 can include a control system 22 that uses one or more of the algorithms for deconvoluting the blurred image 14 to provide the latent sharp image 16. Each control system 20, 22 can include one or more processors and circuits. Further, each of the control systems 20, 22 can include software that utilizes one or more methods provided herein to deblur the blurry image 14. Additionally, each control system 20, 22 can include data storage.

Additionally, the image apparatus 10 can include the image sensor 18 (e.g. a semiconductor device that records light electronically and a Bayer filter) that captures the image 14, and one or more control switches 26 that allow for the control and operation of the image apparatus 10. For example, one or more of the control switches 26 can be used to selectively switch the image apparatus 10 to the image processing (e.g. deblurring) disclosed herein.

As provided herein, the entire blurry image 14 can be classified and processed as a single unit. Alternatively, the entire blurry image 14 can be divided into a plurality of image regions 28 (divided with dashed lines), with a separate deblurring process being performed on one or more of the image regions 28. With this design, different levels of deblurring can subsequently be performed on one or more of the image regions 28. This may allow for quicker processing of very large images 14, or improved processing for images 14 having a spatially varying point spread function. With a spatially varying point spread function, one or more of the image regions 28 will have a different point spread function.

In FIG. 1, each image region 28 is generally rectangular shaped and the entire blurry image 14 is divided into a four by six grid that includes twenty-four, equally sized, block shaped image regions 28. Alternatively, the shape and/or number image regions 28 can be different than that illustrated in FIG. 1. For example, the entire blurry image 14 can be one image region, or the entire blurry image 14 can be divided into a five by five, a seven by seven, or a nine by nine grid. Still alternatively, the entire blurry image 14 can be divided into a number of irregularly shaped image regions.

Figure 2A:
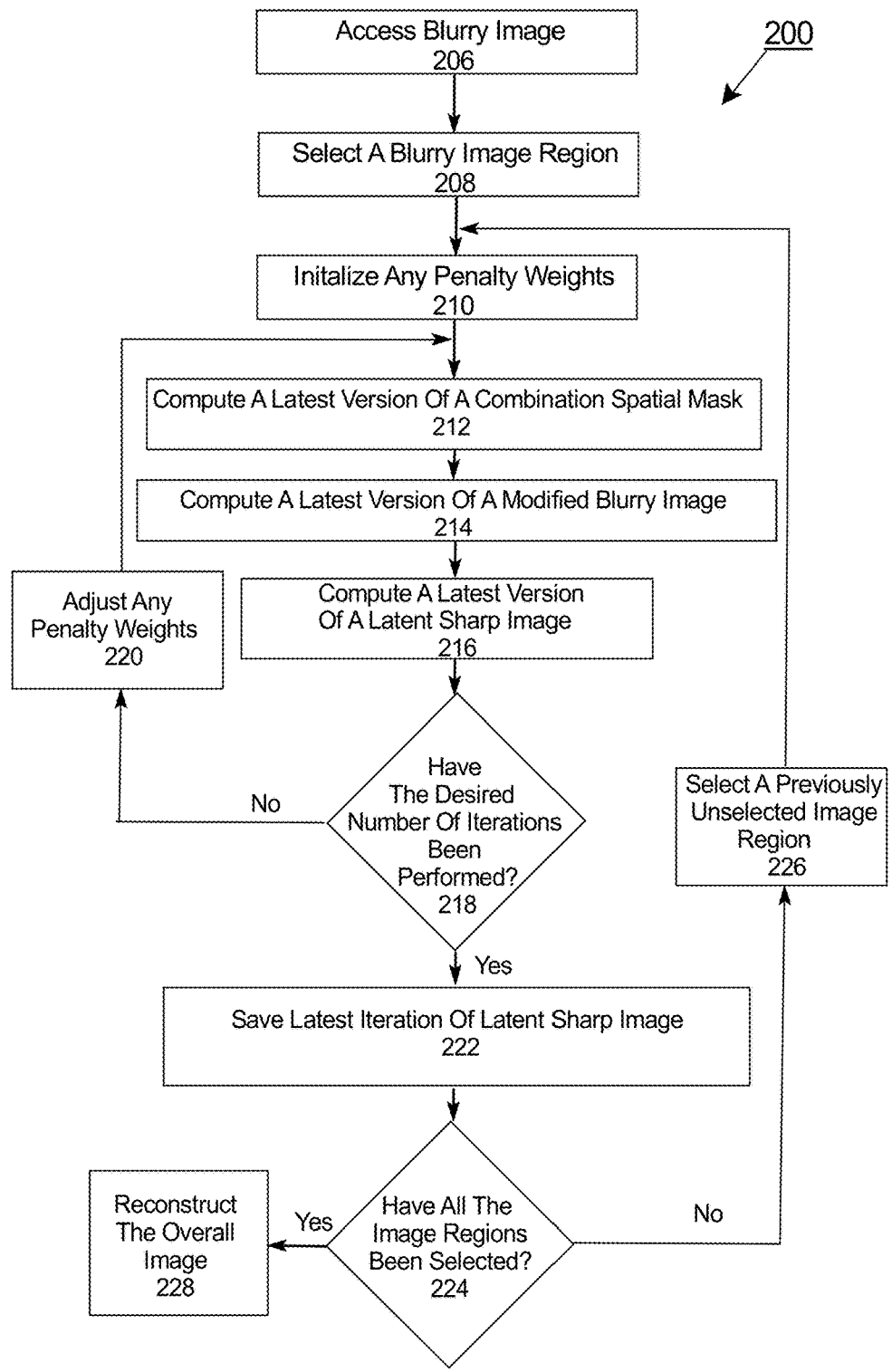
FIG. 2A is a simplified flow chart that illustrates an image processing method having features of the present invention, for processing a blurry image.

FIG. 2A is a simplified flow chart of one, non-exclusive embodiment of an image processing method 200 having features of the present invention. Each and every of the blocks (or steps) in FIG. 2A can be performed by one of the control systems 20, 22 of FIG. 1. In one embodiment, the control system 20, 22 can use with any non-blind deconvolution method in which the point spread function "K" is known or estimated.

In FIG. 2A, at block 206, the control system 20, 22 accesses the entire blurry image 14 (illustrated in FIG. 1) that is to be deblurred. Subsequently, at block 208, a blurry image region "B" is selected. As provided above, the blurry image region can be the entire blurry image 14 or just a portion of the blurry image. At this time, there is an estimated point spread function kernel "K" for the blurry image region "B". For ease of discussion, the term blurry image "B" is used to refer to the blurry image region, which can be the entire blurry image 14 or a portion thereof.

As provided in more detail below, certain of the deblurring algorithms include one or more penalty weights to balance any penalty terms in the deblurring algorithm. At block 210, these penalty weights can be initialized.

Next, at block 212 (sometimes referred to as the "first iterative step") a latest version of the spatial mask ("M") is computed for the blurry image "B". In one embodiment, the spatial mask "M" is a combination of three masks, namely (i) a boundary mask ("boundary_mask") that deals with pixels around the boundaries 14B (illustrated in FIG. 1) of the blurry image "B"; (ii) a highlight mask ("highlight_mask") that deals with pixels inside the clipped highlight regions 14A (illustrated in FIG. 1) of the blurry image "B"; and (iii) an outlier mask ("outlier_mask") that deals with pixels around and near the clipped highlight regions 14A of the blurry image "B". In certain embodiments, the spatial mask can be referred to as a combination spatial mask.

Figure 2B:
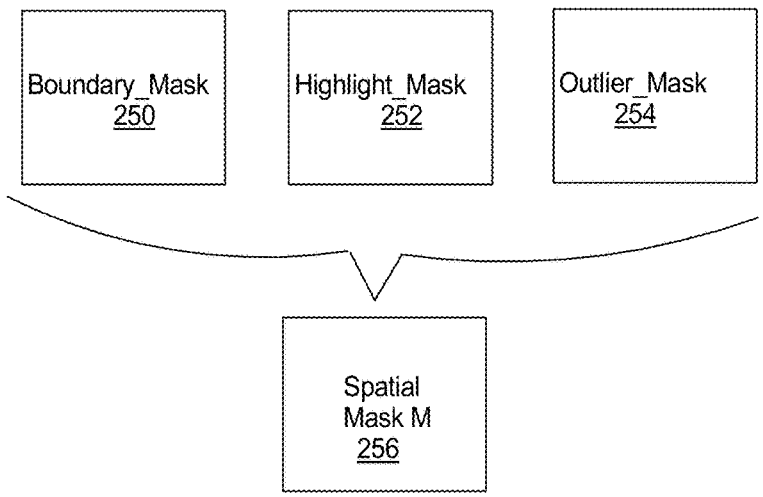
FIG. 2B is a simplified illustration of a boundary mask, a highlight mask, an outlier mask, and a spatial mask having features of the present invention.

FIG. 2B illustrates that the boundary mask 250 (illustrated as a box), the highlight mask 252 (illustrated as a box), and the outlier mask 254 (illustrated as a box) can be used to generate the spatial mask 256 (illustrated as a box).

Referring back to FIG. 2A, in one embodiment, (i) the boundary mask and the highlight mask can be computed before the iterative process starts; and (ii) the outlier mask is updated during each iteration. Thus, in this embodiment, the spatial mask "M" is updated during each iteration. In one embodiment, the outlier mask is updated during each iteration using the latest version of the latent sharp image. One non-exclusive example of a suitable method for computing the spatial mask "M" is described in detail below in reference to FIG. 3A.

Next, at block 214 (sometimes referred to as the "second iterative step"), a latest version of a modified blurry image "$I_M$" is computed for the blurry image "B". In one embodiment, the latest version of the modified blurry image "$I_M$" is generated using the spatial mask "M" and a re-blurred image ("Rebl"). For example, the re-blurred image "Rebl" can be the latest version of the latent sharp image "L" estimate blurred using the point spread function "K" (Rebl=K*L). In the second iterative step, the aim is to replace the areas of the blurry image "B" that contain outliers by the same areas from the reblurred image ("Rebl").

Figure 2C:
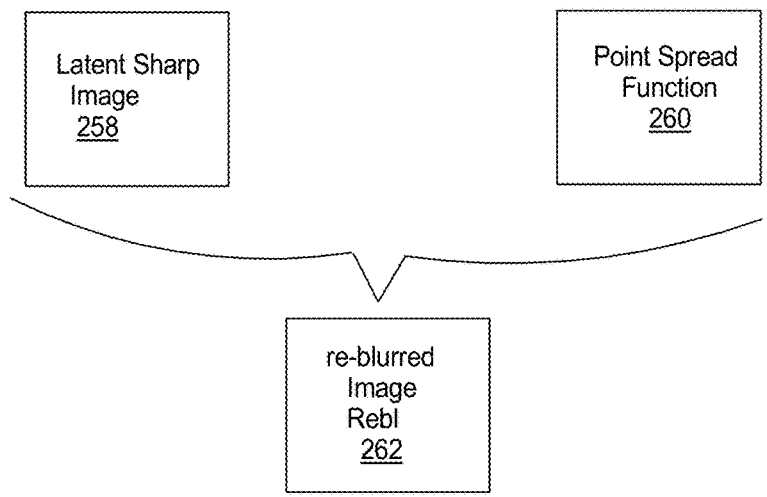
FIG. 2C is a simplified illustration of a latent sharp image, a point spread function, and a Re-blurred image having features of the present invention.

FIG. 2C illustrates that the latent sharp image 258 (illustrated as a box) and the point spread function 260 (illustrated as a box) can be used to generate the re-blurred image 262 (illustrated as a box).

Referring back to FIG. 2A, at block 214, in one non-exclusive embodiment, the modified blurry image "$I_M$" is equal to (i) the sum of the spatial mask "M" squared, multiplied by the blurry image "B", plus the re-blurred image ("Rebl") multiplied by a first penalty weight "α" (e.g., a fidelity term penalty weight); and (ii) divided by the sum of the spatial mask "M" squared plus the first penalty weight "α". Thus, the modified blurry image $I_M$ can be calculated as follows:

$$(I_M=(M^2*B+\alpha*\text{Rebl})/(M^2+\alpha)) \qquad \text{Equation (2)}.$$

In this equation and elsewhere, the multiplication by the spatial mask M is element-wise.

Figure 2D:
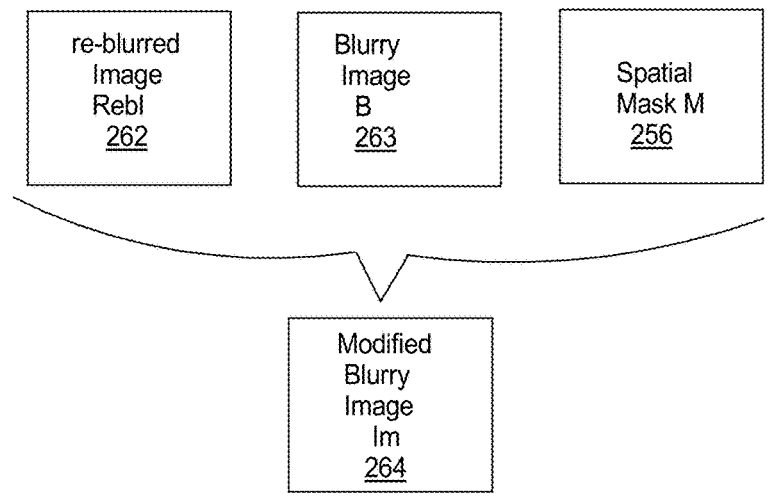
FIG. 2D is a simplified illustration of a re-blurred image, the spatial mask, the blurry image, and a modified blurry image having features of the present invention.

FIG. 2D illustrates that the re-blurred image 262 (illustrated as a box), the blurry image B 263 (illustrated as a box) and the spatial mask 256 (illustrated as a box) can be used to generate the modified blurry image 264 (illustrated as a box).

Referring back to FIG. 2A, next, at block 216 (sometimes referred to as the "third iterative step"), an updated, latest version of the latent sharp image "L" is computed. In one embodiment, the modified blurry image "$I_M$" is deblurred to obtain the latest version of the latent sharp image estimate "L". As provided herein, any deblurring method that utilizes the modified blurry image "$I_M$" can be used to calculate the latest version of the latent sharp image "L".

A couple of non-exclusive, algorithms are described below which provide more detail on how the second iterative step 214, and the third iterative step 216 can be performed. In certain embodiments, simple deconvolution methods can be used.

Subsequently, at block 218, the algorithm evaluates if the desired number of iterations have been performed. If not, at block 220, any penalty weights are updated, and blocks 212-218 are repeated to improve the current estimates. More specifically, (i) at block 212, an updated latest version of the spatial mask "M" is generated using the most recent, latest version of the latent sharp image; (ii) at block 214, an updated latest version of the modified blurry image "$I_M$" is generated using the updated, latest version of the spatial mask "M"; and (iii) at block 216, an updated latest version of the latent sharp image "L" is generated using the updated, latest version of the modified blurry image "$I_M$". These three steps (along with the updating of any penalty weights) are repeated until the desired number of iterations have been performed. In each iteration, (i) the latest version of the spatial mask "M", (ii) the latest version of the modified blurry image "$I_M$", and (iii) the latest version of the latent sharp image "L" are updated. Thus, the present algorithm provides a simple iterative method that involves alternating three steps.

After the desired number of iterations have been performed, at block 222, the final, latest version of the latent sharp image estimate "L" is saved as the latent sharp image "L" for the blurry image "B". The number of iterations required for the algorithm to converge on a suitable latent sharp image can be varied. As a non-exclusive example, the number of iterations can be between approximately four and twelve iterations.

It should be noted that one or more of the blocks illustrated in FIG. 2A and described above may be optional or performed in a different order. For example, the penalty weight block can be optional. Further, it should be noted that blocks 212-214 can be performed in any order during any of the iterations. In FIG. 2A, the estimation of the spatial mask (block 212) is listed as first. Alternatively, the estimation of the latent sharp image (block 216) or estimation of the modified blurry image (block 214) can be performed first. As provided herein, in alternative embodiments, the order of the blocks can be: (i) 212, 214, 216; (ii) 212, 216, 214; (iii) 214, 212, 216; (iv) 214, 216, 212; (v) 216, 212, 214; or (vi) 216, 214, 212.

Next, at block 224, the image regions 28 are reviewed to determine if all of the desired image regions 28 have been deblurred. If not, at block 226, a previously unselected image region is selected and blocks 210-222 are repeated until all of the desired image regions have been deblurred.

If the answer at block 224 is yes (all the desired image regions 28 have been selected), then, at block 228, the overall deblurred image can be outputted. For example, the overall deblurred image can include a reconstruction and/or blending of a plurality of deblurred image regions 28.

Figure 3A:
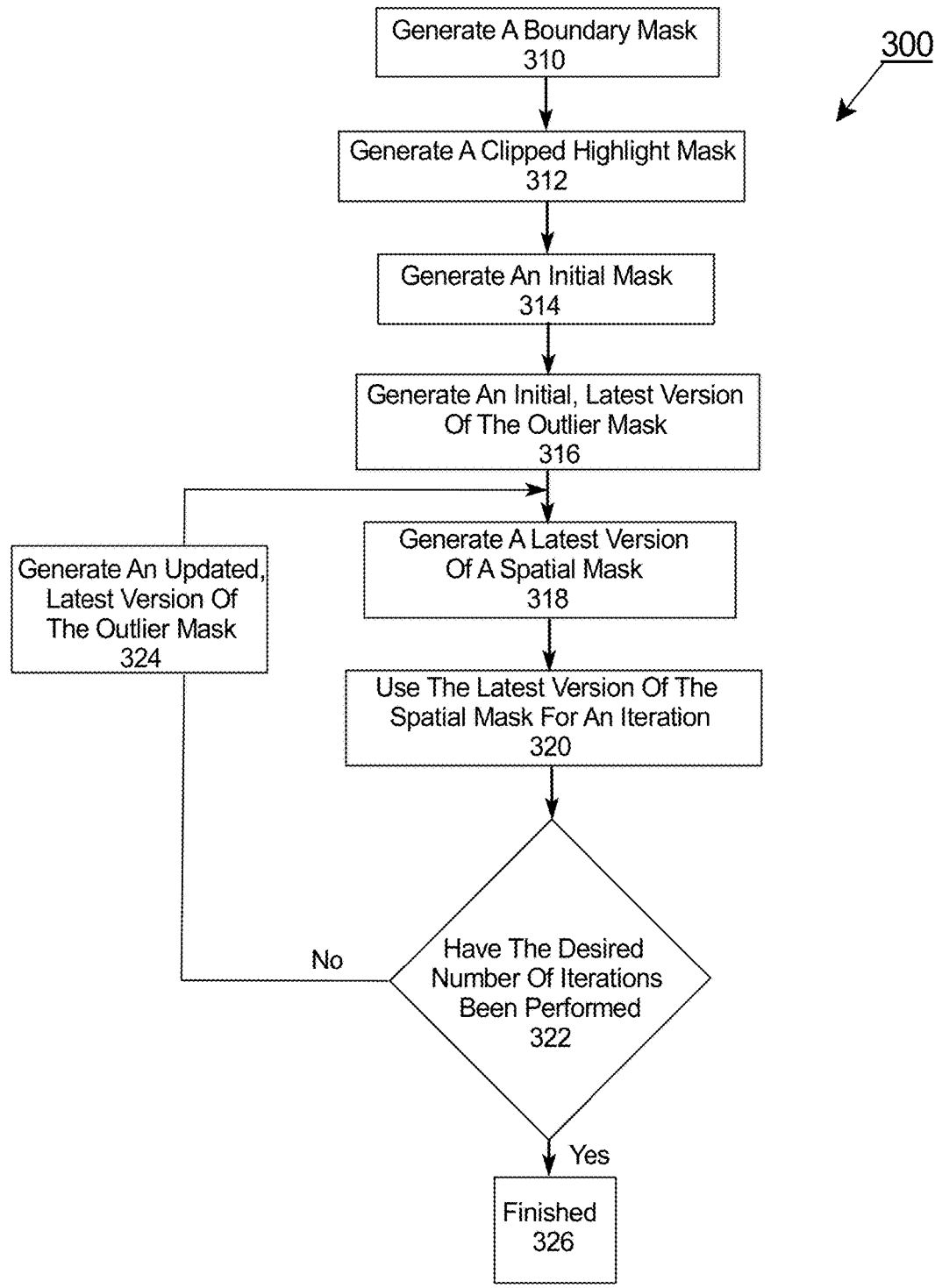
FIG. 3A is a flow chart that illustrates a method for generating a spatial mask having features of the present invention.

FIG. 3A illustrates one, non-exclusive method 300 for generating and updating the spatial mask "M". In one embodiment, as provided above, the spatial mask "M" is the combination of three masks, namely (i) the boundary mask, (ii) the highlight mask, and (iii) the outlier mask. With this design, the spatial mask "M" suppresses ringing artifacts (i) around image borders; (ii) inside clipped highlight regions; and (iii) around clipped highlight regions. Alternatively, in certain embodiments, the spatial mask can be a combination of just two of these masks or only one mask.

Further, as provided above, (i) the boundary mask and the highlight mask can be computed before the iterative process starts; and (ii) the outlier mask is computed during each iteration.

In FIG. 3A, at block 310, the boundary mask is generated for the selected image region that inhibits ringing artifacts around image borders of the selected image region. In one embodiment, the boundary mask is a two dimensional array with each pixel in the array being given a value of between zero ("0") and one ("1"). For example, in one embodiment of the boundary mask, the pixels at the boundaries of the blurry image "B" are assigned a value of zero, while the pixels away from the boundaries of the blurry image "B" are assigned a value of one. In this embodiment, a pixel is assigned a value of one when normal deconvolution is desired, and a value zero when no deconvolution is desired (ignore the pixel). Pixels in a transition between the boundary and the non-boundary can be assigned a value of between zero and one to assist in getting smooth transitions in latent sharp image "L". Alternatively, other values can be assigned the pixels in the boundary mask.

In one embodiment, the blurry image "B" can be extended and padded before the generation of the boundary mask.

Next, at block 312, the highlight mask is generated for the selected image region that inhibits ringing artifacts inside clipped highlight regions of the selected image region. In one embodiment, the highlight mask is a two dimensional, binary array with each pixel in the selected image region given a value of either zero ("0") or one ("1"). For example, in one embodiment of the highlight mask, the pixels where values have been clipped due to sensor saturation are identified (pixels inside the clipped highlight regions) and are assigned a value of one, while the pixels outside the clipped highlight regions are assigned a value of zero. Alternatively, other values can be assigned the pixels in the highlight mask.

Subsequently, at block 314, an initial mask "$M_0$" is generated for the selected image region by combining the boundary mask and the highlight mask. For example, the initial mask can be the minimum of the combination of the boundary mask and one minus the highlight mask ((Initial mask: $M_0$=min(boundary_mask,1−highlight mask)). Because, the boundary mask and the highlight mask are computed before the iterative process starts, the initial mask can also be computed before the iterative process starts. Further, the initial mask for the selected image region remains the same and is not updated during the iterative process for the selected image region.

In one embodiment, the initial mask is a two dimensional, array with each pixel in the array having a value of between zero ("0") and one ("1"). Further, the number of elements in the array is equal to the number of pixels in the blurry image "B".

Figure 3B:
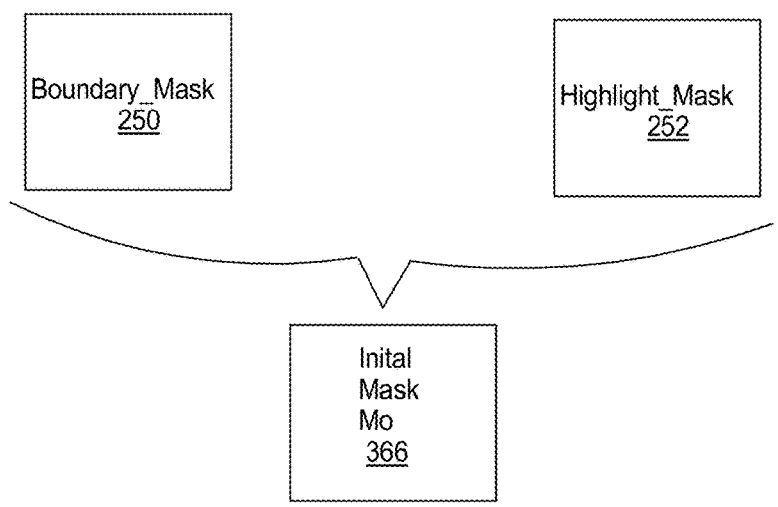
FIG. 3B is a simplified illustration of the boundary mask, the highlight mask, an initial mask having features of the present invention.

FIG. 3B illustrates that the boundary mask 250 (illustrated as a box) and the highlight mask 252 (illustrated as a box) can be used to generate the initial mask 366 (illustrated as a box).

Referring back to FIG. 3A, next, at block 316, the initial, latest version of the outlier mask is generated that is used to identify which areas (one or more pixels) of the blurry image "B" contain outliers. For example, the outlier mask can be used to identify pixels near and adjacent to the clipped highlight regions. In one embodiment, the outlier mask is computed based on the difference between the given blurry image "B" and the reblurred image "Rebl".

As provided herein, the outlier mask can be a two dimensional array having the same number of pixels as the blurry image "B". In one embodiment, each pixel in the array is given a value of between zero ("0") and one ("1"). Alternatively, the array is binary and each pixel in the array is given a value of either zero ("0") or one ("1"). Still alternatively, other values can be assigned the pixels in the outlier mask.

Figure 4A:
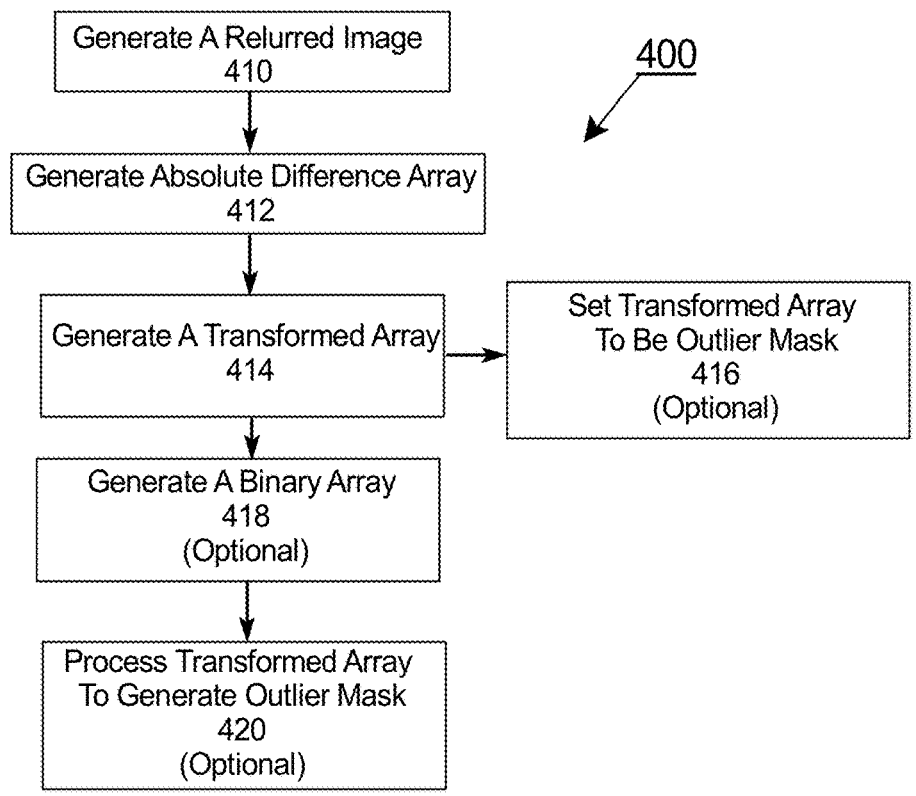
FIG. 4A is a flow chart that illustrates a method for calculating an outlier mask.

There is a number of possible ways of creating the outlier mask. FIG. 4A illustrates one, non-exclusive method 400 for generating the outlier mask. At block 410, the re-blurred image "Rebl" is calculated by blurring the latest version of the latent sharp image "L" with the known point spread function "K" (Rebl=K*L). It should be noted that if block 212 of FIG. 2A is performed before block 216, then, the latest version of the latent sharp image "L" can be set to be equal to the blurry image (L=B). During subsequent iterations, the latest version of the latent sharp image "L" is the estimate provided by block 216 in FIG. 2A.

Referring back to FIG. 4A, at block 412, an absolute difference array is computed that represents the absolute difference between the given blurry image "B" and the reblurred image "Rebl". This can be represented by ((Diff=abs(B−Rebl)). In one embodiment, the absolute difference array is a two dimensional array with each pixel in the array being assigned a value that represents the absolute difference between the corresponding pixels in the blurry image "B" and the reblurred image "Rebl". Further, the number of elements in the array is equal to the number of pixels in the blurry image "B". It should be noted that the values of the pixels in the absolute difference array is not limited to the range of between zero ("0") and one ("1").

Next, at block 414, a transformed array ("trans_array") is generated by transforming the absolute difference array to have values in the range of between zero ("0") and one ("1"). As non-exclusive examples, a transformation function or a look up table can be used for the transformation. In the case of the transformation function, this can be expressed as trans_array=f(Diff; p,s). In one, non-exclusive embodiment, the following transformation function can be utilized:

$$f(t;p,s)=(1+\exp(-s^2/2))\exp(-s^2t^2/(2p^2))/(\exp(-s^2t^2/(2p^2))+\exp(-s^2/2))$$ Equation (3).

Figure 4B:
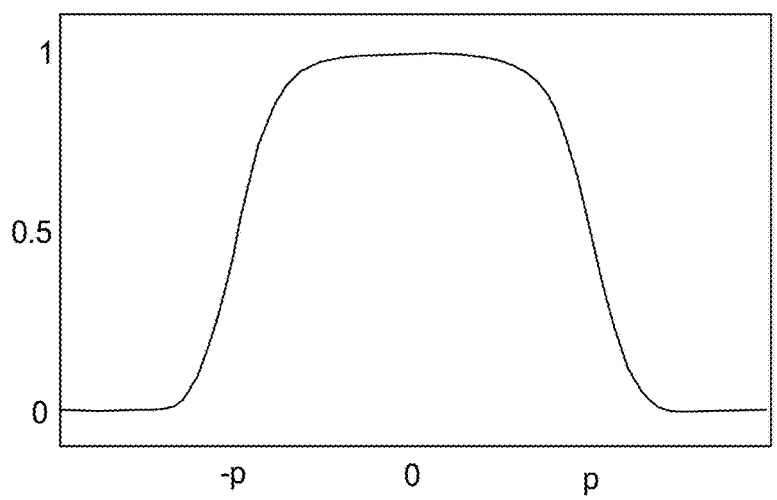
FIG. 4B is a simplified illustration of a transform graph.

In one embodiment, (i) f(0; p,s)=1; (ii) f(p; p,s)≈½; (iii) f(t; p,s)≈0 for |t|>>p; (iv) p controls the position of transition, and (v) s controls the speed of transition. In one, non-exclusive embodiment, the following can be set: s=2, and p=max(0.015, const*median(Dift)), (adapting p to overall size of Dift). FIG. 4B is a graph that illustrates a transformation curve having features of the present invention.

Optionally, in one embodiment, at block 416, the transformed array from block 414 can be used as the latest version of the outlier mask.

Alternatively, and optionally, additional steps (e.g. blocks 418 and 420 described below) can be performed that can improve the outlier mask, and thereby improve the quality of the deblurred images. In certain embodiments, the improved outlier mask will identify and mask out, outlier pixels in the vicinity of strong outlier pixels, and thus more completely suppress ringing artifacts around such strong outliers, while not masking out weak outliers in other regions, which leads to unnecessary residual blur in the restored images.

In one embodiment, at block 418 (optional), a binary array can be generated from the absolute difference array using hysteresis thresholding. In this embodiment, weaker outliers are selected only if they are connected to a very strong outlier. In one embodiment, a low threshold is first applied to the absolute difference array to identify pixels that may be outliers. In this embodiment, pixels in the absolute difference array having a value that is less than the low threshold are assigned a value of zero, while pixels having a value that is equal to or greater than the low threshold are identified. The identified pixels can be referred to as Possible Outlier Pixels. In one embodiment, the low threshold can be chosen adaptively based on the range of values in the absolute difference array. The purpose of the low threshold is to identify any possible outlier pixels.

Subsequently, a high threshold can be applied to the Possible Outlier Pixels. In this embodiment, pixels in the absolute difference array having a value that is greater than or equal to the high threshold are assigned a value of one. These pixels can be referred to as Strong Outlier Pixels. Further, Possible Outlier Pixels having a value of between the low threshold and the high threshold (i) are given a value of one if they are connected (positioned near (within a pixel or two)) to a Strong Outlier Pixel; and (ii) are given a value of zero if they are not connected (positioned near) a Strong Outlier Pixel. The purpose of the high threshold is to identify Strong Outlier Pixels, and any weak outlier pixels that are positioned nearby, while excluding weak pixels positioned away from Strong Outlier Pixels. In one embodiment, the high threshold can be chosen adaptively based on the range of values in the absolute difference array.

The thresholding can be expressed as binary_array(x,y)=1 if Diff(x,y)>low_threshold and (x,y) is connected to some $(x_0,y_0)$ with Diff$(x_0,y_0)$>high_threshold, otherwise binary_array(x,y)=0 (hysteresis thresholding of Diff, finding areas connected to strong outliers).

For the binary array, pixels having a value of one are classified as outliers, while pixels having a value of zero are not outliers.

Alternatively, the binary array can be generated from the transformed array instead of the absolute difference array. In one embodiment, weaker outliers are again selected only if they are connected to a very strong outlier. In one embodiment, a low threshold is first applied to the transformed array to identify pixels that may be outliers. In this embodiment, pixels in the transformed array having a value that is less than the low threshold are assigned a value of zero, while pixels having a value that is equal to or greater than the low threshold are identified. The identified pixels can be referred to as Possible Outlier Pixels. In one embodiment, the low threshold can have a value between zero and one and is typically closer to zero. The purpose of the low threshold is to identify any possible outlier pixels.

Subsequently, a high threshold can be applied to the Possible Outlier Pixels. In this embodiment, pixels in the transformed array having a value that is greater than or equal to the high threshold are assigned a value of one. These pixels can be referred to as Strong Outlier Pixels. Further, Possible Outlier Pixels having a value of between the low threshold and the high threshold (i) are given a value of one if they are connected (positioned near) a Strong Outlier Pixel; and (ii) are given a value of zero if they are not connected (positioned near) a Strong Outlier Pixel. The purpose of the high threshold is to identify Strong Outlier Pixels, and any weak outlier pixels that are positioned nearby, while excluding weak pixels positioned away from Strong Outlier Pixels. In one embodiment, the low threshold can have a value between zero and one, and is typically closer to one.

In yet another embodiment, the binary array can be generated form the transformed array using simple thresholding. In this example, pixels in the transformed array having a value that is less than the threshold are assigned a value of zero, while pixels having a value that is equal to or greater than the threshold are assigned a value of one. In still another embodiment, the binary array can be generated form the absolute difference array using simple thresholding in a similar fashion.

Subsequently, at block 420 (optional), the transformed array from block 414 can be processed using the binary array from block 418 to generate the latest version of the outlier mask. In one embodiment, a pixel in the generated outlier mask will have a value of lower than one (1) only if the pixel is classified as an outlier in the binary array at block 418. Thus, pixels in the outlier mask will have a value of zero if they have a value of zero in the binary array, and areas not connected to Strong Outlier Pixels will not be masked out by the outlier mask.

It should be noted that the present invention does not rely on probabilistic model for the outliers and, instead, it uses a deterministic approach to construct the spatial mask "M".

Referring back to FIG. 3A, at block 318, the latest version of the spatial mask M is generated. In one embodiment, the spatial mask M is the minimum of the initial mask and the outlier mask (M=min($M_0$, outlier_mask)). In one embodiment, the resulting spatial mask "M" is a two dimensional, mask having values between zero ("0") and one ("1"), with a pixel being assigned a value of one when normal deconvolution is desired, and a value zero when no deconvolution is desired. The spatial mask "M" will also have a smooth transition between zero and one regions for getting smooth transitions in deblurred image.

Figure 3C:
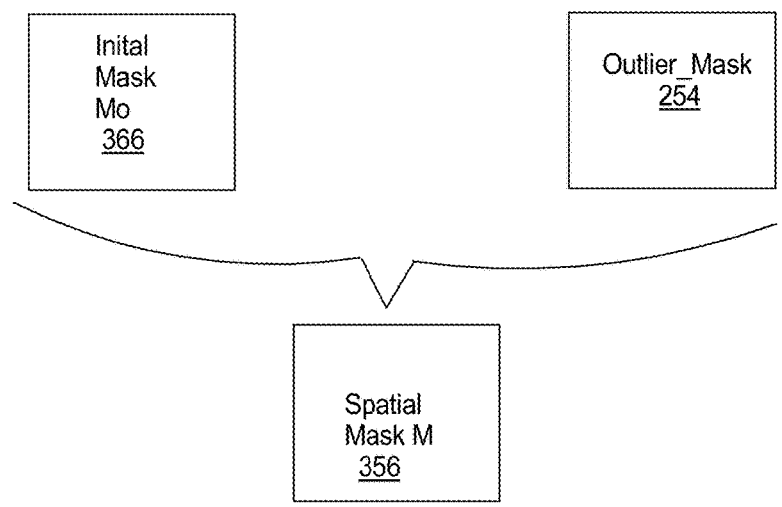
FIG. 3C is a simplified illustration of the initial mask, the outlier mask, and the spatial mask.

FIG. 3C illustrates that the initial mask 366 (illustrated as a box) and the outlier mask 254 (illustrated as a box) can be used to generate the spatial mask 356 (illustrated as a box).

Referring back to FIG. 3A, next, at block 320, the latest version of the spatial mask is used in the deblurring algorithm described in reference to FIG. 2A.

Subsequently, at block 322, the algorithm evaluates if all of the desired number of iterations have been performed. If not, at block 324, an updated latest version of the outlier mask is generated. The updated, lastest version of the outlier mask can be calculated similar to the initial outlier mask described in reference to block 316 (using blocks 410-420 of FIG. 4A). However, in block 324, the latest version of the latent sharp image "L" from block 216 of FIG. 2A is used to estimate the outlier mask via the reblurred image "Rebl". Thus, every iteration will have a new latest version of the latent sharp image "L" and a new latest version of the outlier mask.

Subsequently, blocks 318-320 are repeated. After the desired number of iterations have been performed, at block 326, the process is finished.

As provided herein, the spatial mask "M" can be used with any deblurring method to help suppress unpleasant ringing artifacts. A number of non-exclusive examples of suitable algorithms for computing the latest version of the modified blurry image and the latest version of latent sharp image are described in detail herein.

A relatively common type of deblurring algorithm used for deconvolution is a regularized least squares (RLS) cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness. A generic, latent sharp image, regularized least squares cost function "c(L)" can be expressed as follows:

$$c(L) = \text{Fidelity term}(s) + \text{Regularization term}(s) \quad \text{Equation (4)}.$$

The number of Fidelity terms and the number of Regularization terms can be adjusted to suit the desired requirements of deblurring. Generally speaking, the accuracy and computational costs increase as the number of terms increase in the cost function. It should be noted that in certain embodiments, the spatial mask "M" described above can be incorporated into one or more of the Fidelity term(s) of the cost function.

In one, non-exclusive embodiment, a suitable latent sharp image generalized RLS cost function that utilizes the spatial mask "M" can be expressed as follows:

$$c(L) = \|M(K*L-B)\|_z^z + \omega(\|D_x*L\|_q^q + \|D_y*L\|_q^q) \quad \text{Equation (5)}.$$

In Equation 5, and elsewhere (i) w is a regularization penalty weight that is selected to achieve the proper balance between the fidelity and the regularization terms; (ii) $D_x$ and $D_y$ denote the convolution kernels used for computing derivatives in x- and y-direction; (iii) $\| \|^z$ denotes the z-norm (or pseudonorm) raised to the power z for the fidelity term(s); and (iv) $\| \|^q$ denotes the q-norm (pseudonorm) raised to the power q for the regularization term(s). As non-exclusive examples, the type of z-norm and q-norm utilized can be less than one, one, between one and two, two, or more than two. When the z-norm and q-norm are equal to two, the generalized RLS cost function is a RLS cost function.

In the non-exclusive, generalized RLS cost function example of Equation 5, the fidelity term includes the spatial mask "M", the fidelity term does not include derivatives, and the regularization terms include only $1^{st}$ order derivatives. It should be noted that the generalized RLS cost function of Equation 5 is a very simple cost function; and that more complicated cost functions can be used, such as those with more fidelity terms involving derivatives of $1^{st}$ or higher order, and regularization terms involving derivations of higher than $1^{st}$ order.

The cost function of Equation 5 can be modified to (i) specify a z-norm of two (z=2) for the fidelity term(s); and (ii) specify a q-norm of two (q=2) for the regularization term(s) as follows:

$$c(L) = \|M(K*L-B)\|_2^2 + \omega(\|D_x*L\|_2^2 + \|D_y*L\|_2^2). \quad \text{Equation (6.1)}$$

Further, the cost function of Equation 6.1 can be modified using a splitting technique as follows to add the modified blurry image "$I_M$" (sometimes referred to as an "auxiliary variable"), along with a fidelity term penalty weight "α" as follows:

$$c(L, I_M) = \|M(I_M-B)\|_2^2 + \alpha\|K*L-I_M\|_2^2 + \omega(\|D_x*L\|_2^2 + \|D_y*L\|_2^2). \quad \text{Equation (6.2)}.$$

The modified blurry image "$I_M$" (block 214 in FIG. 2A) as provided in Equation (7) below, and the latent sharp image, regularized least squares cost function "c(L)" (block 216 in FIG. 2A) can be alternating minimizated, e.g., the latent sharp image, regularized least squares cost function "c(L)" can be efficiently minimized using fast Fourier transform as provided in Equation (8), as follows:

$$I_M = \frac{M^2 B + \alpha(K*L)}{M^2 + \alpha}. \quad \text{Equation (7)}$$

and $$F(L) = \frac{\overline{F(K)}F(A)}{\overline{F(K)}F(K) + (\omega/\alpha)D}. \quad \text{Equation (8)}$$

In Equation 7, minimization is over the modified blurry image "$I_M$", and in Equation 8, minimization is over the latent sharp image "L". In Equation 8, $D=|F(D_x)|^2+|F(D_y)|^2$. Other techniques can be used to simplify the minimization and add the modified blurry image "$I_M$" to the cost function, such as that provided in F. Šroubek, P. Milanfar: *Robust Multichannel Blind Deconvolution via Fast Alternating Minimization*, IEEE Trans Im. Proc., 2012 (hereinafter "Šroubek". As far as permitted, the contents of Šroubek are incorporated herein by reference.

It should be noted from Equation (8), that the latent sharp image is determined by RLS deblurring of the modified blurry image "$I_M$", instead of the blurry image "B". With this design, for pixels where the value of the spatial mask M is zero, $I_M$ is equal to re-blurred image (K*L). Alternatively, for pixels where the value of spatial mask "M" is large, "$I_M$" is close to "B". In practice, Equations 7 and 8 are alternated along with the updating of spatial mask M as described in reference to FIG. 3A for each iteration.

In this embodiment, the cost function is minimized in an efficient manner by a variable splitting method and alternating minimization over the latent sharp image variable and introduced auxiliary variable (the modified blurry image).

The spatial mask is computed in each iteration, using the difference between the given blurry image and the reblurred estimate of the latent sharp image. To make the algorithm fast, the iterative process of updating the spatial mask M can be combined and merged with the iterative variable splitting minimization into a single iterative process in which the spatial mask M, the modified blurry image $I_M$, and the latent sharp image L are all updated in each iteration.

In another embodiment, formula of Equation 8, resulting from using a generalized RLS cost function, could be replaced by a similar formula representing the Wiener filter (see Equation (9)). The alternating blocks of computing (i) the spatial mask M as provided in reference to FIG. 3A; (ii) the modified blurry image as provided in Equation (7); and (iii) the latent sharp image are again performed. However, when the Wiener filter is used, the latent sharp imaae can be minimized as follows:

$$F(L) = \frac{\overline{F(K)} F(I_M)}{\overline{F(K)} F(K) + (1/\alpha) G}.$$  Equation (9)

In Equation (9), G is the ratio of the power spectrum of noise and the power spectrum of ideal sharp image (G√P (N)/P($L_{ideal}$)). The power spectrum of the ideal image is not known, but it can be approximated. In this embodiment, the Wiener filter is similar to RLS, except the term resulting from regularization is replaced by the estimate of the ratio of the power spectrum of noise and ideal sharp image.

It should be noted that other types of deblurring algorithms can be used instead of the RLS algorithm or Wiener filter. Still alternatively, more complicated RLS algorithms can be utilized. For example, another, non-exclusive example of suitable fidelity term(s) and regularization term(s) for a generalized RLS cost function are as follows:

Fidelity term(s)=$a\|M(B-K*L)\|_z^z+b(\|M(B_x-K*L_x)\|_z^z+\|M(B_y-K*L_y)\|_z^z)+c(\|M(B_{xx}-K L_{xx})\|_z^z+2\|M(B_{xy}-K L_{xy})\|_z^z+\|M(B_{yy}-K*L_{yy})\|_z^z)$  Equation (10)

Regularization term=$\omega\|N\nabla L\|_q^q$  Equation (11).

In the Equations 10 and 11 and elsewhere, (i) L is the latent sharp image; (ii) B is the blurry image; (iii) K is the point spread function kernel; (iv) subscripts x,y at L and B are partial derivatives with respect to ("w.r.t.") x and y; (v) M is the spatial mask that is used in the fidelity terms; (vi) a, b, c are fidelity term weights; (vii) N is an adaptive regularization term spatial mask; (viii) w is a regularization term penalty weight; (ix) ∇L is a gradient of the latent sharp image $(L_x^2 L_y^2)^{1/2}$; (x) $\|\|_z^z$ denotes the norm for the fidelity term(s); (xi) $\|\|_q^q$ denotes the norm for the regularization term(s); and (xii) * represents convolution and it should be noted that multiplication of the arrays is element-wise. In this embodiment, the fidelity terms include derivatives up to the second order. Further, one or more of the fidelity term weights (a, b, c) can be set to zero to reduce number of fidelity terms.

In one non-exclusive embodiment, in Equation 10, the norm z can be set to be two (z=2) as follows:

Fidelity term(s)=$a\|M(B-K*L)\|_2^2+b(\|M(B_x-K*L_x)\|_2^2+\|M(B_y-K*L_y)\|_2^2)+c(\|M(B_{xx}-K*L_{xx})\|_2^2+2\|M(B_{xy}-K*L_{xy})\|_2^2+\|M(B_{yy}-K*L_{yy})\|_2^2)$  Equation (12).

Somewhat similarly, in one non-exclusive embodiment, the regularization term of Equation 11 can be modified to specify a norm of one (q=1) as follows:

Regularization term=$\omega\|N\nabla L\|_1$  Equation (13).

However, other norms can be used in Equations 12 and 13 to achieve different results.

In one embodiment, the minimization process includes a variable splitting algorithm that introduces three auxiliary variables. For example, the variable splitting algorithm can introduce (i) auxiliary variables, namely $I_M$ (the modified blurry image), $W_x$, and $W_y$; and (ii) the appropriate penalty weights α and β, respectively. In this embodiment, for example, (i) $I_M \approx B-K*L$; (ii) $W_x \approx L_x$; and (iii) $W_y \approx L_y$. This leads to the following new RLS cost function:

$f(L,I_M,W_x,W_y)$=Fidelity terms+Regularization term+Penalty term  Equation (14).

Alternatively, other techniques can be used to simplify the minimization while adding the modified blurry image "$I_M$" to the cost function, such as that provided in "Šroubek".

In Equation (14), the fidelity terms, regularization terms, and penalty terms, respectively, can be expressed as follows:

Fidelity terms=$a\|MI_M\|_2^2+b(\|M(D_x*I_M)\|_2^2+\|M(D_y*I_M)\|_2^2)+c(\|M(D_{xx}*I_M)\|_2^2+2\|M(D_{xy}*I_M)\|_2^2+\|M(D_{yy}*I_M)\|_2^2)$.  Equation (15)

Regularization term=$\omega\|N(W_x^2+W_y^2)^{1/2}\|_1^1$  Equation (16)

Penalty terms=$\alpha(\|I_M-(B-K*L)\|_2^2+\omega\beta(\|W_x-D_x*L\|_2^2+\|W_y-D_y*L\|_2^2)$  Equation (17).

In these Equations, $D_x$, $D_y$, $D_{xx}$, $D_{xy}$, and $D_{yY}$ are partial derivative convolution kernels, the cost function is minimized iteratively, by alternating minimization over $I_M$, $W_x$, $W_y$, and L. Further, each of these minimization problems can be solved quickly, using a closed form formula. Further, in each iteration, the fidelity term, spatial mask "M" is updated and penalty weights are increased.

The overall procedure for estimating the latent sharp image using the regularized least squares cost function from Equations 15-17 with the spatial mask M updated in each iteration is provided below. As provided in FIG. 2A, the procedure alternates the steps of (i) estimating the spatial mask M, (ii) estimating the modified blurry image $I_M$, and (iii) estimating the latent sharp image L for a plurality of iterations.

In one non-exclusive example, the initial spatial mask M is calculated first. At the beginning, (i) the latent sharp image can be set to be equal to the blurry image B (Set L:=B); (ii) the initial mask $M_0$ can be calculated from the boundary mask and the highlight mask ($M_0$:=min(boundary_mask,1−highlight_mask)); and (iii) the penalty weights α, β can be initialized. In future iterations, the latent sharp image is equal to the latent sharp image from the previous estimate and not the blurry image B.

Next, (i) the reblurred image "Rebl" can be initially calculated or updated in subsequent iterations (Rebl=K*L); (ii) the outlier mask can be initially calculated or updated in subsequent iterations (see FIG. 4); and (iii) the spatial mask M can be initially calculated or updated in subsequent iterations (see FIG. 3A) (M=min($M_0$, outlier_mask)).

Subsequently, the modified blurry image $I_M$ is initially calculated or updated in subsequent iterations (($I_M$=($M^2$ B+a Rebl)/($M^2$+a)).

Additionally, (i) the latent sharp image partial derivatives are initially calculated or updated in subsequent iterations ($L_x$:=$D_x$*L, $L_y$:=$D_y$*L); and (ii) the regularization term auxiliary variables are initially calculated or updated in subsequent iterations (($W_x$,$W_y$)=soft threshold_2D($L_x$,$L_y$; N/(2β)).

Next, the latent sharp image is initially calculated or updated in subsequent iterations using the following:

Equation (18)
$$F(L\_k) = \frac{(Fidterm\overline{F(K)}F(I_M) + (\omega\beta/\alpha)(\overline{F(D_x)}F(W_x) + \overline{F(D_y)}F(W_y))}{(Fidterm\overline{F(K)}F(K) + (\omega\beta/\alpha)regterm}$$

In Equation 18, (i) Fidterm=a+b $(|F(D_x)|^2+|F(D_y)|^2)$+c $(|F(D_{xx})|^2+2|F(D_{xy})|^2+|F(D_{yy})|^2)$ and (ii) regterm= $(|F(D_x)|^2+|F(D_y)|^2)$.

Subsequently, the penalty weights α and β can be increased, and the steps of (i) estimating the spatial mask M, (ii) estimating the modified blurry image $I_M$, and (iii) estimating the latent sharp image L are repeated.

It should be noted that (i) F is a two dimensional ("2D") Fourier transform; and (ii) multiplication, division, and other algebraic operations, including soft thresholding, are all element-wise. Further, for two dimensional soft thresholding: (i) (x',y')=soft_threshold_2D(x,y;t); (ii) g=$(x^2+y^2)^{1/2}$; (iii) g'=max(g−t, 0); and (iv) x'=x (g'/g), y'=y (g'/g). It should be noted that (x',y')=soft_threshold 2D(x,y;t) is used as a shortcut for operations (ii)-(iv) in the previous sentence.

Moreover, in certain embodiments, the regularization term spatial mask N can be used for suppressing ringing artifacts in smooth regions around high contrast edges by making the regularization weight locally adaptive. For example, the regularization term spatial mask N can have values of greater than or equal to one (N≥1). In one embodiment, the pixels of the spatial mask N can have (i) a value one (1) at edge regions (regions where basic regularization weight ω is used); and (ii) an increased value at smooth regions (regions with low average gradient magnitude), and high contrast regions (regions with high local STD-window over which STD is computed is fairly large and depends on PSF). Further, the spatial mask N should have values that transition smoothly from between different regions. In certain embodiments, the smooth and high contrast regions can detected and identified using edge detection software on the blurry image B (e.g. the Y channel of the blurry image B).

Figure 5:
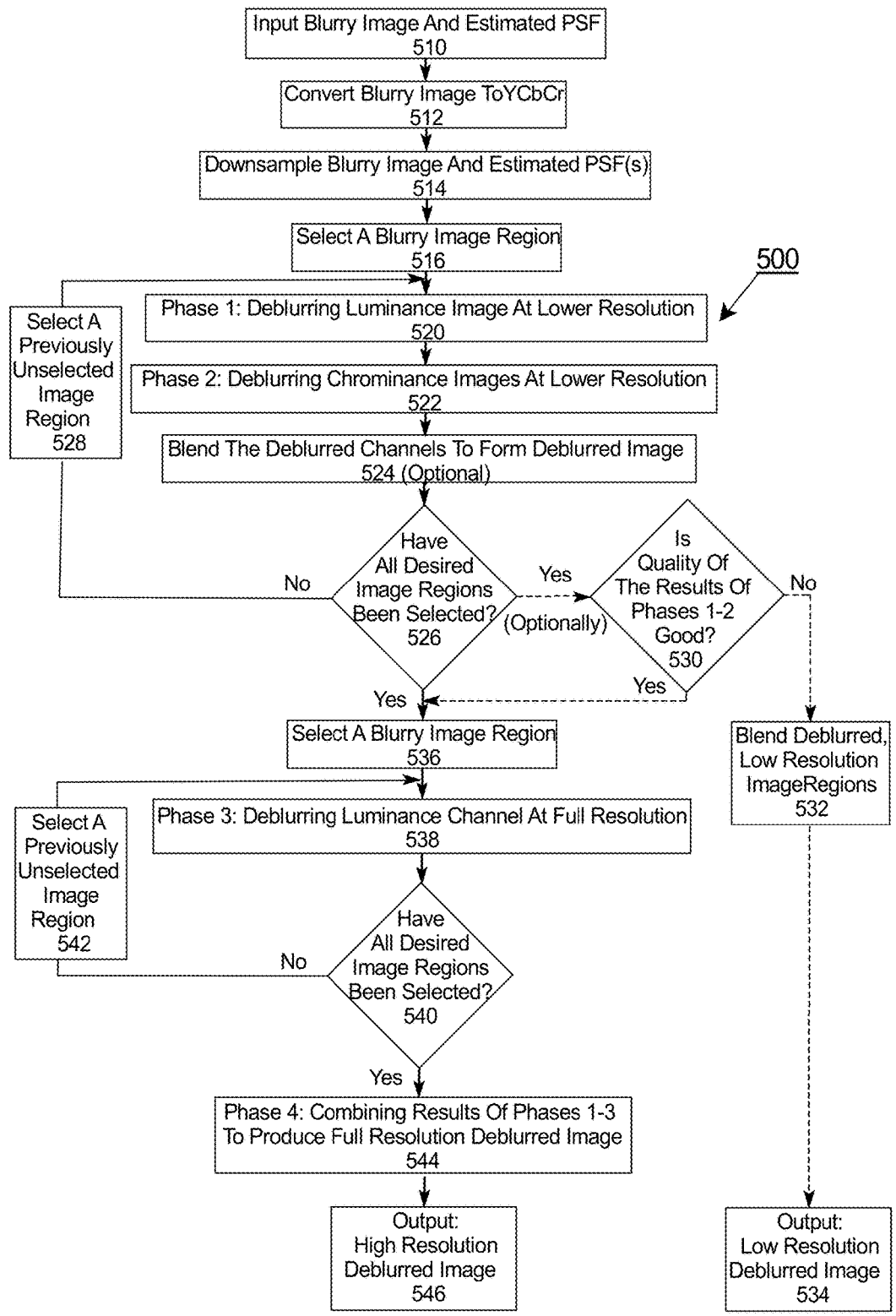
FIG. 5 is a simplified flow chart of another non-blind deconvolution algorithm having features of the present invention.

It should be noted that other types of deblurring algorithms can be used to deblur the entire blurry image. For example, FIG. 5 is a simplified flow chart of yet another, non-exclusive embodiment of a non-blind deconvolution method 500 having features of the present invention. Each of the blocks (e.g. steps) in FIG. 5 is performed by one of the control systems 20, 22 of FIG. 1. In certain embodiments, the deblurring algorithms described above can also be incorporated into the method described in reference to FIG. 5.

As an overview, in certain embodiments, the proposed algorithm in FIG. 5 consists of four primary phases, with a large portion of the deblurring computations being performed at a lower resolution. As a result thereof, the present method 500 is very fast, and practical for deblurring of high resolution images produced by modern digital cameras. Further, the present method 500 uses a unique method to suppress artifacts and restore fine texture, thereby producing high quality deblurred images.

In FIG. 5, at block 510, the control system 20, 22 accesses the entire blurry image 14 (illustrated in FIG. 1) that is to be deblurred. Also, (i) an estimated, single, dominant point spread function for the entire image is accessed; or (ii) an estimated array of spatially variant, point spread functions is accessed which correspond to the point spread functions for a plurality of image regions. In certain embodiments, at this time, the blurry image 14 can be at full resolution, and can be in a Red-Blue-Green ("RGB") color space.

Optionally, the highlight mask and the boundary mask can be generated at this time.

Next, at block 512, the blurry image is converted to a luminance and chrominance ("YCbCr") color space. Thus, the blurry image includes a luminance channel, a Cb channel, and a Cr channel.

Subsequently, a block 514, the blurry image is down-sampled to create a downsampled blurry image. Further, the point spread function(s) can be downsampled to create downsampled point spread function(s), and any mask(s) can be downsampled to create downsampled mask(s). The amount of downsampling can be varied. In alternative, non-exclusive embodiments, the amount of downsampling can be approximately ½, ⅓, ¼, or ⅕ resolution.

Subsequently, at block 516, a blurry image region "B" is selected. As provided above, the blurry image region "B" can be the entire, downsampled blurry image or just a portion of the downsampled blurry image. At this time, there is a downsampled, estimated point spread function kernel "K" for the blurry image region "B". For ease of discussion, the term blurry image "B" is used to refer to the blurry image region, which can be the entire blurry image 14 or a portion thereof. It should be noted that the selected, downsampled, blurry image region can be divided into (i) a blurry, downsampled luminance channel image ("$Y_{BlurryDS}$"); (ii) a blurry, downsampled first ("Cb") chrominance channel image ("$Cb_{BlurryDS}$"); and (iii) a blurry, downsampled second ("Cr") chrominance channel image ("$Cr_{BlurryDS}$").

Next, at block 520, Phase 1 Processing begins on the selected image image "B". In one embodiment, the corresponding blurry, downsampled luminance channel image ("$Y_{BlurryDS}$") is deblurred during Phase 1 Processing to generate a deblurred, low resolution, luminance channel image ("$Y_{Phase1}$")(also referred to as "Phase 1 Image"). Any deconvolution algorithm can be used in Phase 1 processing. In certain embodiments, the goal of Phase 1 processing is to produce a deblurred, low resolution, luminance channel image ("$Y_{Phase1}$") having as few artifacts as possible. As provided herein, stronger means of artifact suppression can be used in the deconvolution algorithm as fine image texture is recovered in later phases. Also, more iterations can be used as computations at lower resolution are fast.

In certain embodiments, the deblurred, low resolution, luminance channel image ("$Y_{Phase1}$") also serves as an input for subsequent phases.

In one non-exclusive embodiment, the deblurred, low resolution, luminance channel image ("$Y_{Phase1}$") can be estimated by alternating the blocks of (i) estimating the spatial mask M (block 212 of FIG. 2A), (ii) estimating the modified blurry image $I_M$ (block 214 of FIG. 2A), and (iii) estimating the latent sharp image L (block 216 of FIG. 2A) for a plurality of iterations.

In a specific, non-exclusive embodiment, the deconvolution algorithm minimizes a cost function that includes least squares (2-norm) fidelity terms (making the deblurred image to fit the given blurry image and estimated blur PSF) and total variation (1-norm) regularization term (Laplacian prior), sometimes in combination with a 2-norm spatial prior. An example of this cost function is provided in Equations 12 and 13 above. In this cost function, the spatial mask M is used in the fidelity terms, and spatial mask N is used for the regularization term to suppress artifacts and to improve the quality of a deblurred image. As provided above, a variable splitting method can be used for fast minimization of this cost function. With the variable splitting method, the new cost function is constructed by introducing auxiliary variables and penalty terms as provided in Equations 14 and 15 above, and the new cost function is minimized iteratively, by alternating minimization over the variable corresponding to the latent sharp image and the auxiliary variables as provided above. The cost function used for the Phase 1 processing can include phase one regularization weights.

The number of iterations used during Phase 1 processing can be varied to achieve the desired results. In early iterations, the latent sharp image contains more texture, but also more ringing artifacts and noise. As the iterations progress, ringing artifacts and noise get gradually reduced, but the fine texture also tends to disappear. For example, if higher phase one regularization weights are used for the spatial mask N to provide some robustness with respect to inaccuracies in estimated PSFs, the image resulting from running iterations to full convergence (usually no more than 12 iterations) may look posterized.

As provided herein, to obtain deblurred images with an improved natural look (to reduce posterization), it is desired to keep the number of iterations as low as possible (but high enough to sufficiently suppress ringing artifacts and noise). Thus, in one embodiment, during Phase 1 processing, an adaptive number of iterations can be performed with the minimization algorithm. For example, a different number of iterations can be used for each image region, depending on the presence of ringing artifacts in that image region. For example, image regions containing high contrast edges will need more iterations than image regions without high contrast edges.

As one, non-exclusive example, local variance of the difference between the results of two consecutive iterations can be used for detecting regions where ringing artifacts got significantly reduced from one iteration to the next. In this embodiment, gamma can be temporarily applied to the latent sharp images to detect ringing visible in latent sharp images. Further, a blending mask (blending mask) can be produced from the computed local variance mentioned above. In regions where the local variance is low the number of iterations was sufficient and the previous value is kept (blending mask value 0), in regions where the local variance is high, significant changes are still taking place and the new result needs to be kept (mask value 1 or close to 1). The blending mask has values between zero ("0") and one ("1"), with (i) regions having significant variance being given a value of one, (ii) regions having low variance being given a value of zero, and (iii) smooth transitions therebetween. In this embodiment, the latent sharp image with adaptive number of iterations can be formed as follows:

$$L=\text{blending\_mask } L_k+(1-\text{blending\_mask})L. \quad \text{Equation (19)}.$$

In Equation 19, k is the number of iterations, and $L_k$ is the estimated latent sharp image result of k-th iteration. When k is greater than a predetermined minimum number of iterations (k>min # iterations) and when no regions of latent sharp image L get updated in Equation 19, the iterative process is stopped to avoid unnecessary computations.

FIG. 6A illustrates that the blurry, downsampled luminance channel image ("$Y_{BlurryDS}$") 610 (illustrated as a box) is deblurred to generate the deblurred, low resolution, luminance channel image ("$Y_{Phase1}$") 612 (illustrated as a box).

Referring back to FIG. 5, next, at block 522, Phase 2 Processing begins on the selected image image "B". In one embodiment, (i) the corresponding blurry, downsampled first ("Cb") chrominance channel image ("$Cb_{BlurryDS}$") is deblurred during Phase 2 Processing to generate a deblurred, low resolution, first chrominance channel image ("$Cb_{Phase2}$"), and (ii) the corresponding blurry, downsampled second ("Cr") chrominance channel image ("$Cr_{BlurryDS}$") is deblurred during Phase 2 Processing to generate a deblurred, low resolution, second chrominance channel image ("$Cr_{Phase2}$"). These deblurred, low resolution chrominance channel images can collectively be referred to as "Phase 2 Image"). In certain embodiments, the goal of Phase 2 processing is to produce the deblurred, low resolution, chrominance channel images having as few artifacts and as little noise as possible.

Any deconvolution algorithm can be used in Phase 2 processing to deconvolve each chrominance channel. For example, the deconvolution algorithms described above in reference to Phase 1 processing can be utilized. The cost function used for the Phase 2 processing can include phase two regularization weights. However, in certain embodiments, during Phase 2 processing, higher Phase 2 regularization weights can be used than Phase 1 regularization weights (used during Phase 1 processing) in order to suppress color noise and ringing. As provided herein, color noise and ringing are more visible and annoying in the chrominance channels, and a lack of texture in chrominance channels is more acceptable. In certain embodiments, the adaptive regularization mask N for Phase 2 processing can be updated using a new, more accurate edge mask that is computed using the deblurred, low resolution, luminance channel image ("$Y_{Phase1}$") from Phase 1 processing. The high contrast region mask can be kept the same for Phase 2 processing. Further, in certain embodiments, the fidelity term, spatial mask M is not updated in every iteration, instead the spatial mask M from the last iteration of Phase 1 processing can be used in all iterations. Alternatively, the spatial mask M can be updated in each iteration.

It should be noted that the chrominance channels Cb and Cr typically require fewer iterations than luminance channel Y, as they usually do not contain such high contrast edges.

Further, it should be noted that a different deconvolution algorithm can be used for Phase 2 processing than is used for Phase 1 processing.

FIG. 6B illustrates that the blurry, downsampled first ("Cb") chrominance channel image ("$Cb_{BlurryDS}$") 614 (illustrated as a box) is deblurred to generate the deblurred, low resolution, first chrominance channel image ("$Cb_{Phase2}$") 616 (illustrated as a box). Similarly, FIG. 6C illustrates that the blurry, downsampled second ("Cr") chrominance channel image ("$Cr_{BlurryDS}$") 618 (illustrated as a box) is deblurred to generate the deblurred, low resolution, second chrominance channel image ("$Cr_{Phase2}$") 620 (illustrated as a box).

Referring back to FIG. 5, next, optionally, at block 524, the deblurred, low resolution, luminance channel image ("$Y_{Phase11}$"), and the deblurred, low resolution, chrominance channel images ("$Cb_{Phase2}$"), ("$Cr_{Phase2}$") can be blended to form a deblurred, low resolution image region ("$L_{LowRes}$").

FIG. 6D illustrates that the deblurred, low resolution, luminance channel image ("$Y_{Phase1}$") 612 (illustrated as a box), the deblurred, low resolution, first ("Cb") chrominance channel image ("$Cb_{Phase2}$") 616 (illustrated as a box), and the deblurred, low resolution, second ("Cr") chrominance channel image ("$Cr_{Phase2}$") 620 (illustrated as a box) can be blended together to generate the deblurred, low resolution image region ("$L_{LowRes}$") 622 (illustrated as a box).

Subsequently, referring back to FIG. 5, at block 526, the image regions are reviewed to determine if all of the desired image regions have had Phase 1 and Phase 2 processing. If no, at block 528, a previously unselected image region is selected and blocks 520-526 are repeated until all of the desired image regions have had Phase 1 and Phase 2 processing.

If the answer at block 526 is yes (all the desired image regions have been selected), then, Phase 1 and Phase 2 processing is complete.

Optionally, after Phase 1 and Phase 2 processing is complete, at block 530, a quality control test can be performed. This optional decision block 530 is inserted between Phase 2 and 3 processing. In one embodiment, during the quality control test 530, the quality of the deblurred low resolution luminance and chrominance channel images obtained in Phases 1 and 2 are evaluated. The type of quality control test performed on the deblurred, low resolution image regions can vary. For example, the quality control test 530 can evaluate the quality of restoration by analyzing deblurred low resolution image regions using some sharpness metric and/or a ringing metric (an algorithm that can detect ringing).

Alternatively, the quality control test 530 can include or be completely based only on predicting the quality using metadata (camera model, ISO sensitivity, . . . ), image content (landscape, night scene, . . . ), properties of PSF (size, shape, . . . ), estimated accuracy of PSF (determined when PSF is estimated), and other factors.

If it is estimated that the quality of deblurring is not good (e.g. the quality of deblurred image regions after Phase 1 and 2 is low), it would be a waste of time to try to recover more detail by performing computationally expensive Phase 3 and 4 processing. Instead, the lower resolution final deblurred image is produced from the results of Phase 1 and 2. More specifically, if the quality is low, at block 532, the deblurred, low resolution image regions ("$L_{LowRes}$") from block 524 are blended together to form a low resolution deblurred entire image. Subsequently, at block 534, the low resolution deblurred entire image is output as the entire latent sharp image ("$L_{FinaLowRes}$").

FIG. 6E illustrates that a plurality of deblurred, low resolution images ("$L_{LowRes}$") 622 (illustrated as a box) (e.g. one for each image region) can be blended to form the low resolution deblurred entire image ("$L_{FinaLowRes}$") 624 (illustrated as a box).

Referring back to FIG. 5, alternatively, if the answer at block 530 is yes (quality of deblurring is estimated to be high), or if it is desired to skip the optional quality control test 530, then the deblurring process continues with Phase 3 and 4 processing to produce a high quality high resolution deblurred image.

More specifically, at block 536, a blurry image region is again selected. Subsequently, this blurry image region is subjected to Phase 3 processing at block 538. During Phase 3 processing, deblurring of the luminance channel occurs at full resolution to generate a deblurred, full resolution luminance channel image ("$Y_{Phase3}$") (also referred to as "Phase 3 Image"). The goal of Phase 3 processing is to recover fine detail in luminance channel, using as few iterations as possible for the deblurred, full resolution luminance channel image ("$Y_{Phase3}$"). In certain embodiments, the deblurred, low resolution, luminance channel image ("$Y_{Phase1}$") from Phase 1 processing can be used as a prior, for generating spatial masks, and/or improving the quality of the deblurred full resolution luminance channel image ("$Y_{Phase3}$"). Some ringing artifacts in the luminance channel deblurred at full resolution are acceptable, as they will be reduced/eliminated during Phase 4 processing.

In one embodiment, at the beginning of Phase 3 processing, the deblurred, low resolution, luminance channel image ("$Y_{Phase1}$") from Phase 1 processing is upsampled to the resolution of the original blurry image region (full resolution) to create a deblurred, upsampled, luminance channel image ("$Y_{UpPhase1}$") (also referred to as "Upsampled Phase 1 Image"). The masks can also be upsampled.

Figure 6F:
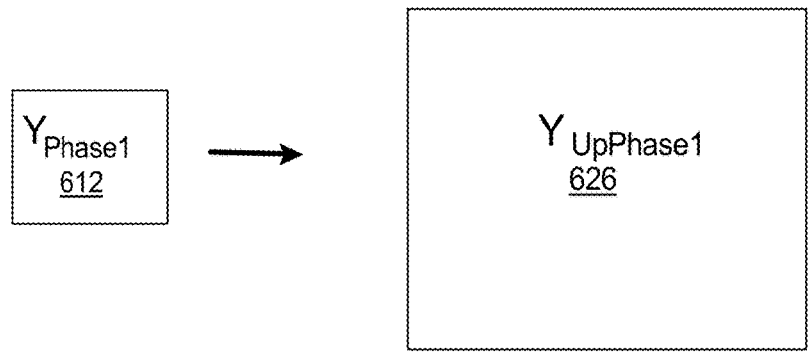
FIG. 6F is a simplified illustration of the deblurred, low resolution, luminance channel image ("$Y_{Phase1}$") and a deblurred, upsampled, luminance channel image ("$Y_{UpPhase1}$")

FIG. 6F illustrates that the deblurred, low resolution, luminance channel image ("$Y_{Phase1}$") 612 (illustrated as a box) has been upsampled blurry image region (full resolution) to create the deblurred, upsampled, luminance channel image ("$Y_{UpPhase1}$") 626 (illustrated as a box).

Figure 6G:
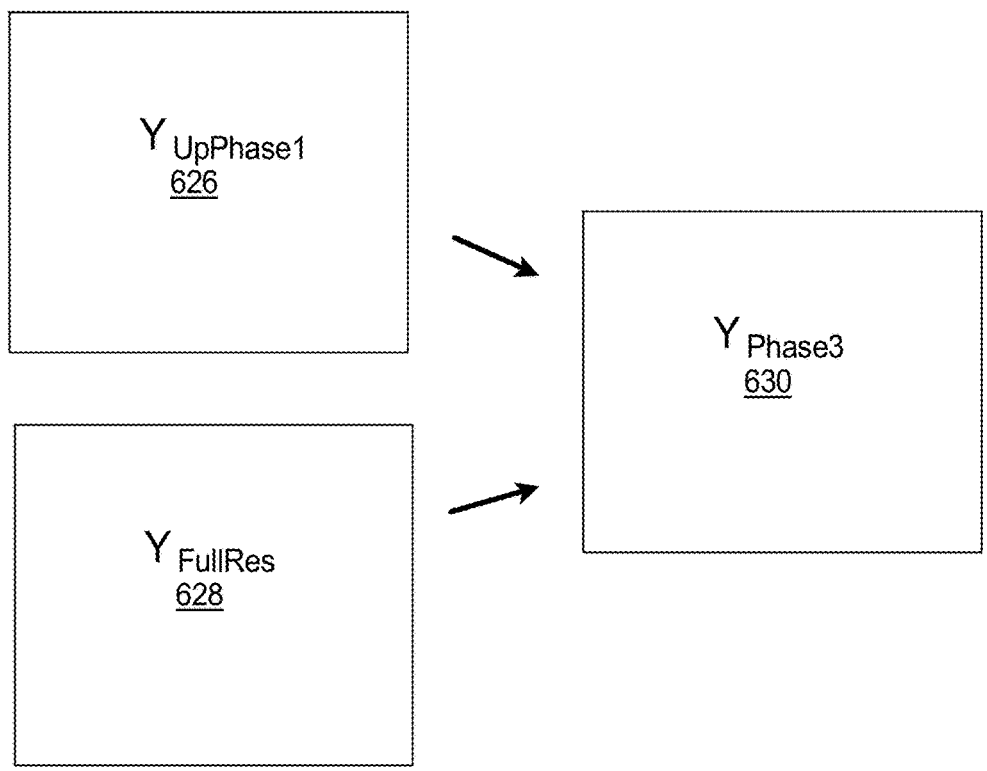
FIG. 6G is a simplified illustration of the deblurred, upsampled, luminance channel image ("$Y_{UpPhase1}$"), a blurry, full resolution, luminance channel image ("$Y_{FullRes}$"), and a deblurred full resolution luminance channel image ("$Y_{Phase3}$")

Subsequently, FIG. 6G both the deblurred, upsampled, luminance channel image ("$Y_{UpPhase1}$") 626 (illustrated as a box) and the blurry, full resolution, luminance channel image ("$Y_{FullRes}$") 628 (illustrated as a box) can be used to generate the deblurred full resolution luminance channel image ("$Y_{Phase3}$") 630 (illustrated as a box).

Referring back to FIG. 5, any deconvolution algorithm can be used in Phase 3 processing to deconvolve the luminance channel at full resolution. For example, the deconvolution algorithms described above in reference to Phase 1 processing can be utilized. However, in certain embodiments, during Phase 3 processing, an additional spatial prior regularization term can be added. As provided herein, using the deblurred, upsampled, luminance channel image ("$Y_{UpPhase1}$") (upsampled result of Phase 1 processing) as a prior will assist in suppressing ringing artifacts. For example, the regularization term (regterm) from Equation 13 can be amended as follows:

$$\text{Regularization terms} = \omega \|N(\nabla L)\|_1^1 + \theta \|L - Y_{UpPhase1}\|_2^2 \quad \text{Equation (20).}$$

Thus, in Equation 20, the deblurred, upsampled, luminance channel image ("$Y_{UpPhase1}$") is used as a prior to assist in suppressing ringing artifacts, and θ is a regularization term penalty weight.

Minimization of the deblurring algorithm is the same as provided above, except for the formula for updating the latent sharp image L is as follows:

$$F(L\_k) = \frac{(Fidterm\overline{F(K)}F(I_M) + (\omega\beta/\alpha)(\overline{F(D_x)}F(W_x) + \overline{F(D_y)}F(W_y)) + \theta F(Y_{UpPhase1})}{(Fidterm\overline{F(K)}F(K) + (\omega\beta/\alpha)regterm + \theta)}. \quad \text{Equation (21)}$$

Where, $L_k$ is the estimated latent sharp image result of k-th iteration

Additional differences during Phase 3 processing when compared to Phase 1 processing can include one or more of the following: (i) the deblurred, upsampled, luminance channel image ("$Y_{UpPhase1}$") can be used instead of the blurry image B to initialize latent sharp image L before the iterative process; (ii) the edge mask used for generating the adaptive regularization mask N can be computed using the deblurred, upsampled, luminance channel image ("$Y_{UpPhase1}$") instead of blurry image B; (iii) a bigger window can used when computing high contrast regions; (iv) lower regularization weights can be used to attempt to recover more texture (lower Phase 3 regularization weights can be used than Phase 1 regularization weights); and/or (v) penalty weights in the iterative process can be set higher, to try to reduce the number of iterations required.

Next, at block 540, the image regions are reviewed to determine if all of the desired image regions have had Phase 3 processing. If not, at block 542, a previously unselected image region is selected and blocks 538-540 are repeated until all of the desired image regions have had Phase 3 processing.

Next, after all of the desired image regions are subjected to Phase 3 processing, at block 544, Phase 4 Processing begins.

In one embodiment, the goal of Phase 4 processing is to produce a final full resolution, deblurred image by combining the luminance channel and chrominance channel results from Phases 1-3. For example, Phase 4 processing can use a guided filter to produce the final full resolution, deblurred image that is in the YCbCr color space.

In one, non-exclusive embodiment, the Phase 4 processing includes three sub-steps. Alternatively, Phase 4 processing can include more than three or fewer than three sub-steps.

For example, at sub-step 1, the Phase 3 Image (the deblurred, full resolution luminance channel image ("$Y_{Phase3}$")) is combined with the Upsampled Phase 1 Image (deblurred, upsampled, luminance channel image ("$Y_{UpPhase1}$")) to produce a combined, full resolution luminance channel image ("$Y_{SubStep1}$") (also referred to as "Substep 1 Results").

Figure 6H:
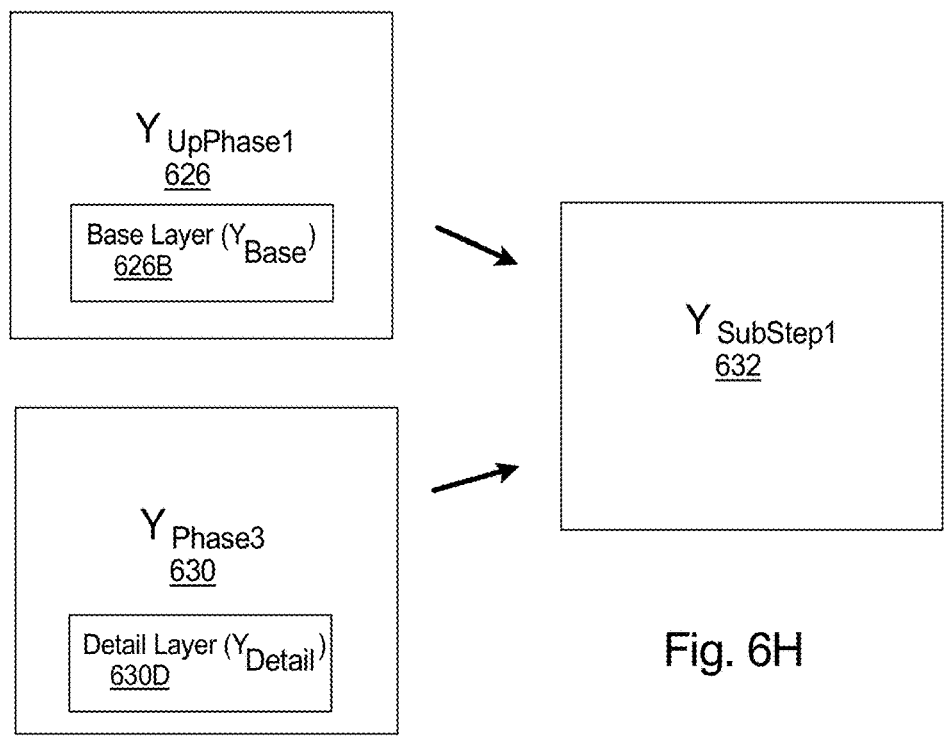
FIG. 6H is a simplified illustration of the deblurred, full resolution luminance channel image ("$Y_{Phase3}$"), the deblurred, upsampled, luminance channel image ("$Y_{UpPhase1}$"), and a combined, full resolution luminance channel image ("$Y_{SubStep1}$")

FIG. 6H illustrates that the Phase 3 Image (the deblurred, full resolution luminance channel image ("$Y_{Phase3}$")) 630 (illustrated as a box) is blended with the Upsampled Phase 1 Image (deblurred, upsampled, luminance channel image ("$Y_{UpPhase1}$")) 626 (illustrated as a box) to produce a combined, full resolution luminance channel image ("$Y_{SubStep1}$") 632.

The type of combining in sub-step 1 can be varied. In one non-exclusive embodiment, a detail layer 630D of the Phase 3 Image (the deblurred, full resolution luminance channel image ("$Y_{Phase3}$")) 630 is combined with a base layer 626B of the Upsampled Phase 1 Image (deblurred, upsampled, luminance channel image ("$Y_{UpPhase1}$")) 630 to produce the Substep 1 Results (combined, full resolution luminance channel image ("$Y_{SubStep1}$")) 632.

As provided herein, the Phase 3 Image ("$Y_{Phase3}$") contains more texture, but also more ringing artifacts than the Upsampled Phase 1 Image ("$Y_{UpPhase1}$"). During Phase 3 processing, the goal is to recover fine texture, while the goal of Phase 1 processing is artifact suppression. By transplanting the detail layer of the Phase 3 Image ("$Y_{Phase3}$") onto the (base layer of the Upsampled Phase 1 Image ("$Y_{UpPase1}$"), the ringing artifacts are reduced in the final result, while preserving most of the texture recovered in Phase 3 Image ("$Y_{Phase3}$"). Thus, the detail layer can be stripped the Phase 3 Image ("$Y_{Phase3}$") and added to the base layer of the Upsampled Phase 1 Image ("$Y_{UpPhase1}$"). The resulting image contains more texture than the Upsampled Phase 1 Image ("$Y_{UpPhase1}$"), but at the same time it contains less ringing than the Phase 3 Image ("$Y_{Phase3}$").

The method used to separate the Phase 3 Image (the deblurred, full resolution luminance channel image ("$Y_{Phase3}$") 630 and the deblurred, upsampled, luminance channel image ("$Y_{UpPhase1}$")) 630 into a base layer and the detail layer can vary.

In one non-exclusive embodiment, the luminance base layer ("$Y_{base}$") 626B can be calculated using an edge-preserving guided filter ("guided_filter") on the Upsampled Phase 1 Image ("$Y_{UpPhase1}$") and the Phase 3 Image ("$Y_{Phase3}$") as follows:

$$Y_{base} = \text{guided\_filter}(Y_{UpPhase1}, Y_{Phase3}, r_1, \varepsilon_1) \quad \text{Equation (22)}.$$

In Equation 22, $r_1$ is the radius of the guided filter window, and $\varepsilon_1$ is the regularization weight (i.e. the strength of smoothing).

Somewhat similarly, the luminance detail layer ("$Y_{detail}$") 630D can be calculated using an edge-preserving guided filter ("guided_filter") and the Phase 3 Image ("$Y_{Phase3}$") as follows:

$$Y_{detail} = \text{guided\_filter}(Y_{Phase3}) - \text{guided\_filter}(Y_{Phase3}) \quad \text{Equation (23.1)}.$$

Additionally, in one non-exclusive embodiment, to reduce the noise in the detail layer ("$Y_{detail}$") 630D, the edge-preserving guided filter can be included in Equation 23.1 to denoise the Phase 3 Image ("$Y_{Phase3}$") as follows.

$$Y_{detail} = \text{guided\_filter}(Y_{Phase3}, Y_{Phase3}, r_2, \varepsilon_2) - \text{guided\_filter}(Y_{Phase3}, Y_{Phase3}, r_1, \varepsilon_1) \quad \text{Equation (23.2)}.$$

In Equation 23.2, $r_2$ is the radius of the guided filter window, and $\varepsilon_2$ is the regularization weight (i.e. the strength of smoothing).

Next, the combined, full resolution luminance channel image ("$Y_{SubStep1}$") 632 can be determined by combining the luminance base layer ("$Y_{base}$") 626B with the luminance detail layer ("$Y_{detail}$") 630D as follows:

$$Y_{SubStep1} = Y_{base} + Y_{detail}. \quad \text{Equation (24)}.$$

In one embodiment, the four phases are applied strictly in an image region-wise fashion, i.e. first all four phases are applied to the image region, and then the processed image region is merged with other image regions. In this case, all the Y and Cb and Cr images listed here represent just one image region of the image. Alternatively, all of the image regions can be merged at the end of each of the deblurring phases one, two, and three. In this case all the Y and Cb and Cr images listed here are for the whole image, and Phase 4 is applied to the whole image (not image region-wise as in the former option).

Subsequently, Sub-Step 2 processing can begin. In one embodiment, to save computation time, the chrominance channels are deblurred only at the lower resolution. The human visual system is less sensitive to the lack of fine detail in the image chrominance channels than in the luminance channel. In certain embodiments, the present method takes advantage of this and deblurs the image chrominance channels only at lower resolution to make the algorithm fast.

In one embodiment, the final full resolution chrominance is generated by upsampling the chrominance deblurred at lower resolution. For example, to produce better quality chrominance, joint upsampling of the Phase 2 Image ("$Cb_{Phase2}$") ("$Cr_{Phase2}$") using the full resolution luminance channel image ("$Y_{SubStep1}$") as the guide produces more fine detail in the final full resolution chrominance.

Figure 6I:
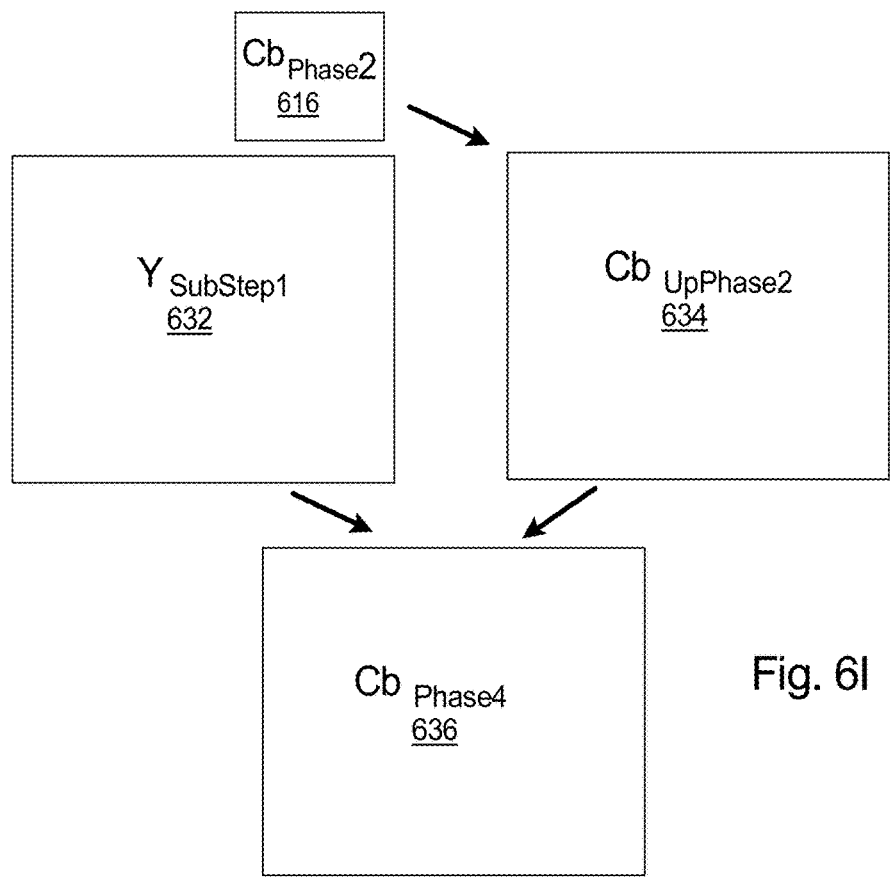
FIG. 6I is a simplified illustration of the deblurred, low resolution, first chrominance channel image ("$Cb_{Phase2}$"), an upsampled, deblurred, first chrominance channel image ("$Cb_{UpPhase2}$"), a full resolution, first chrominance channel image ("$Cb_{Phase4}$"), and the Substep 1 Results ("$Y_{SubStep1}$")

More specifically, referring to FIG. 6I, in this embodiment, the deblurred, low resolution, first chrominance channel image ("$Cb_{Phase2}$") 616 is upsampled to full resolution to create an upsampled, deblurred, first chrominance channel image ("$Cb_{UpPhase2}$") 634 (also referred to as "Upsampled Cb Phase 2 Image"). Subsequently, the full resolution, first chrominance channel image ("$Cb_{Phase4}$") 636 can be calculated with an edge-preserving guided filter ("guided_filter") using the Upsampled Cb Phase 2 Image ("$Cb_{UpPhase2}$") 634 and the Substep 1 Results ("$Y_{SubStep1}$") 632 as follows:

$$Cb_{Phase4} = \text{guided\_filter}(Cb_{UpPhase2}, Y_{SubStep1}, r_3, \varepsilon_3) \quad \text{Equation (25)}.$$

In Equation 25, $r_3$ is the radius of the guided filter window, and $\varepsilon_3$ is the regularization weight (i.e. the strength of smoothing).

Figure 6J:
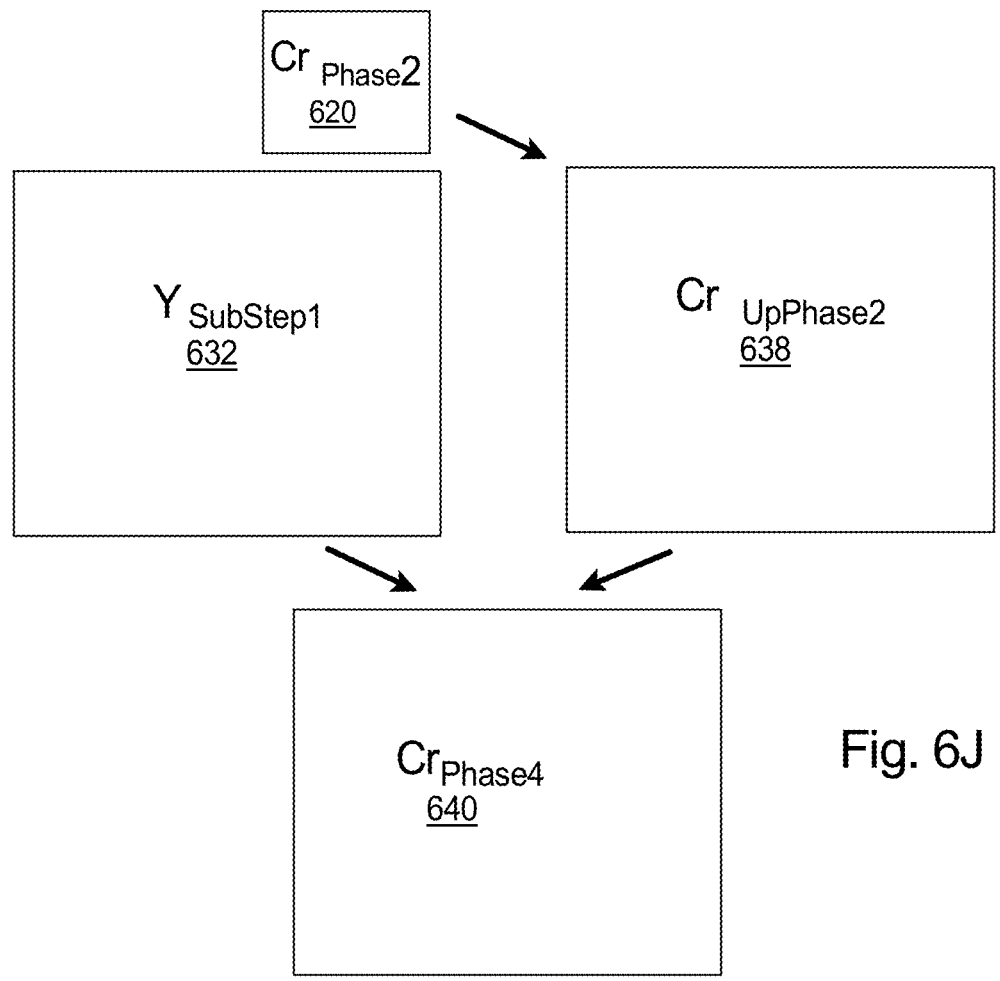
FIG. 6J is a simplified illustration of the deblurred, low resolution, second chrominance channel image ("$Cr_{Phase2}$"), an upsampled, deblurred, second chrominance channel image ("$Cr_{UpPhase2}$"), a full resolution, second chrominance channel image ("$Cr_{Phase4}$"), and the Substep 1 Results ("$Y_{SubStep1}$")

Similarly, referring to FIG. 6J, the deblurred, low resolution, second chrominance channel image ("$Cr_{Phase2}$") 620 is upsampled to full resolution to create an upsampled, deblurred, second chrominance channel image ("$Cr_{UpPhase2}$") 638 (also referred to as "Upsampled Cr Phase 2 Image"). Subsequently, the full resolution, second chrominance channel image ("$Cr_{Phase4}$") 640 can be calculated with an edge-preserving guided filter ("guided_filter") using the Upsampled Cr Phase 2 Image ("$Cr_{UpPhase2}$") 638 and the Substep 1 Results ("$Y_{SubStep1}$") 632 as follows:

$$Cr_{Phase4} = \text{guided\_filter}(Cr_{UpPhase2}, Y_{SubStep1}, r_3, \varepsilon_3) \quad \text{Equation (26)}.$$

In certain embodiments, Sub-Step 2 is performed prior to Sub-Step 3 to keep color noise down.

Figure 6K:
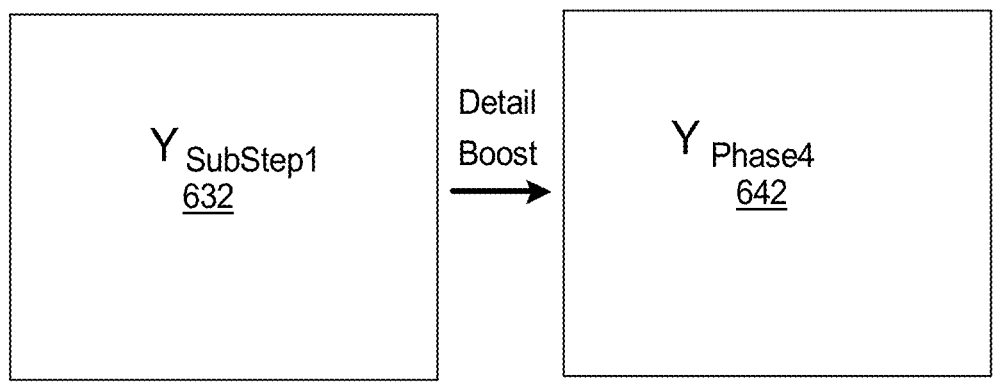
FIG. 6K is a simplified illustration of the full resolution luminance channel image ("$Y_{SubStep1}$") and the final luminance channel image ("$Y_{Phase4}$") 642.

Next, optionally, Sub-Step 3 can optionally be performed. Referring to FIG. 6K, during Sub-Step 3 processing to detail layer of the combined, full resolution luminance channel image ("$Y_{SubStep1}$") 632 ("Substep 1 Results") is boosted to generate and final luminance channel image "($Y_{Phase4}$)" 642. As provided herein, to produce more natural looking latent sharp images with more fine detail, the texture can be boosted in the produced full resolution luminance channel image ("$Y_{SubStep1}$") 632 by a certain factor. Any sharpening filter can be used. In one embodiment, a multiple of the detail layer computed in Sub-Step 1 can be used to boost the combined, full resolution luminance channel image ("$Y_{SubStep1}$") 632, while masking out the strongest edges to prevent their oversharpening. Performing Sub-Step 3 after the chrominance is upsampled in Sub-Step 2 allows for the use of a less noisy luminance image ("$Y_{SubStep1}$") 632 as the guide for joint upsampling, resulting in less chrominance noise in the final image ($Cb_{Phase4}$)($Cr_{Phase4}$). Further, an edge mask can be used to leave out strong edge regions when boosting texture, so as not to reduce the risk of oversharpening.

In one embodiment, detail boost can be expressed as follows:

$$Y_{Phase4} = Y_{SubStep1} + \text{texture\_gain\_factor} \times (\text{exclude\_strong\_edge\_mask}) \times Y_{detail} \quad \text{Equation (27)}$$

In certain embodiments, the exclude_strong_edge_mask can be obtained by applying some edge detection algorithm and the mask has value zero where there is a strong edge, one where there is no edge, and possibly with a smooth transition between zero and one values.

Figure 6L:
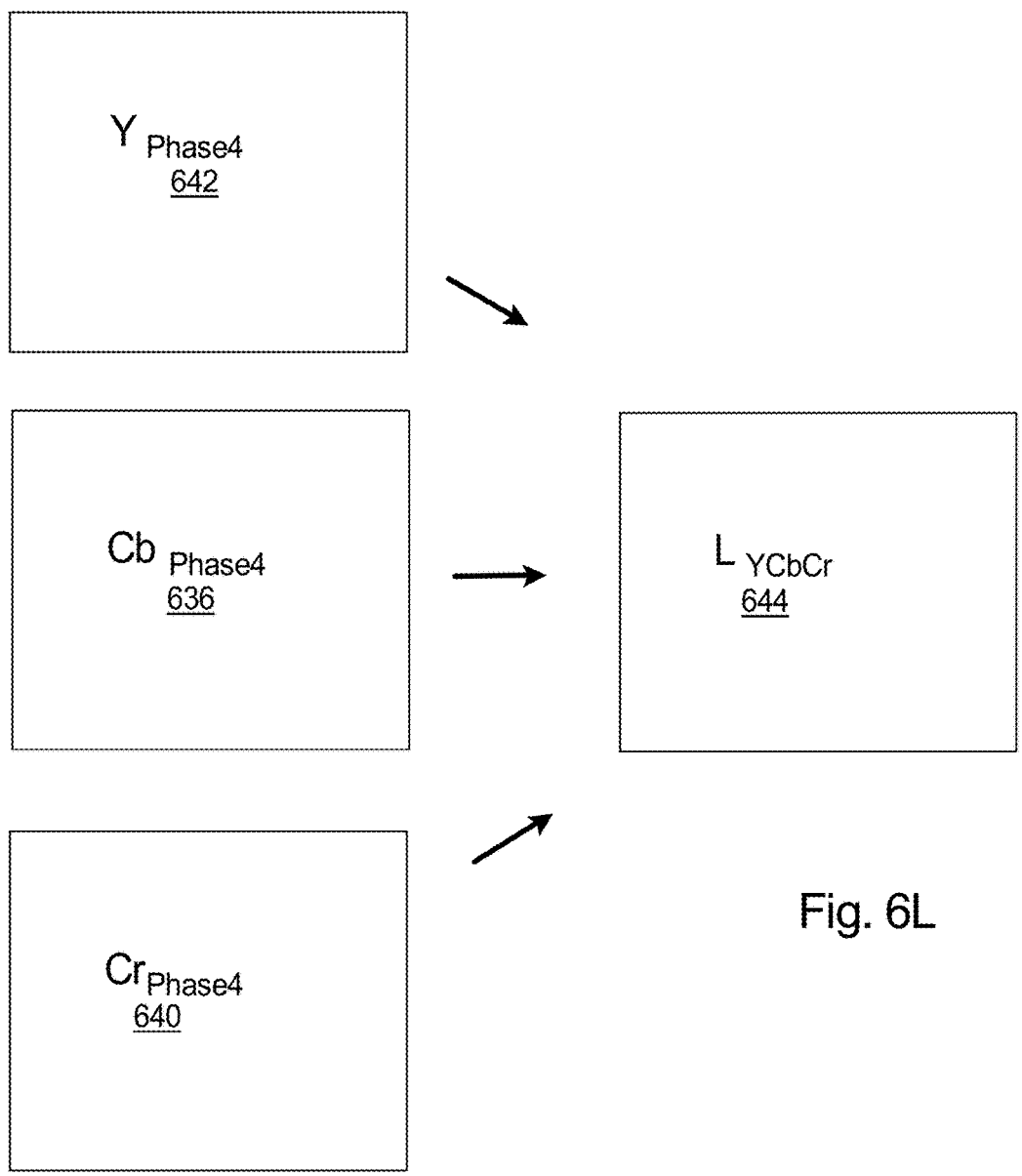
FIG. 6L is a simplified illustration of the final luminance channel image ("$Y_{Phase4}$"), the full resolution, first chrominance channel image ("$Cb_{Phase4}$"), the full resolution, second chrominance channel image ("$Cr_{Phase4}$"), and a final YCbCr latent sharp image ("$L_{yCbCr}$")

Next, referring to FIG. 6L, the final luminance channel image ("$Y_{Phase4}$") 642 can be combined with the full resolution, first chrominance channel image ("$Cb_{Phase4}$") 636 and the full resolution, second chrominance channel image ("$Cr_{Phase4}$")⁶⁴⁰ to generate the final YCbCr latent sharp image ("$L_{YCbCr}$") 644.

In one embodiment, the final YCbCr latent sharp image ("$L_{YCbCr}$") 644 is generated by concatenating the $Y_{Phase4}$, $Cb_{Phase4}$, and $Cr_{Phase4}$ color channels.

Referring back to FIG. 5, at block 546, the high resolution deblurred image is output as the latent sharp image. In certain embodiments, block 546 can include the step of converting the final YCbCr latent sharp image ("$L_{YCbCr}$") 644 to the red/blue/green color space to generate the final latent sharp image L.

Optionally, block 546 can include additional processing, such as contrast curves and gamma.

It should be noted that one or more of the steps illustrated in FIG. 5 and described above may be optional or performed in a different order. Additional, other possible modifications include, but are not limited to, using more than two resolutions and also possibly more than one decision block.

The type of filter used for computing the base layer can vary. One example is a guided filter. Other examples include bilateral filter, or a simple Gaussian filter. In one, non-exclusive embodiment, the guided filter can be expressed as follows:

$$\text{mean}_I = f_{mean}(I). \quad \text{Equation (28)}$$

$$\text{mean}_p = f_{mean}(p). \quad \text{Equation (29)}$$

$$\text{corr}_I = f_{mean}(I \cdot *I). \quad \text{Equation (30)}$$

$$\text{corr}_{Ip} = f_{mean}(I \cdot *p). \quad \text{Equation (31)}$$

$$\text{var}_I = \text{corr}_I - \text{mean}_I * \text{mean}_I. \quad \text{Equation (32)}$$

$$\text{cov}_{Ip} = \text{corr}_{Ip} - \text{mean}_I * \text{mean}_p. \quad \text{Equation (33)}$$

$$a = \text{cov}_{Ip}/(\text{var}_I + \varepsilon) \quad \text{Equation (34)}$$

$$b = \text{mean}_p - a * \text{mean}_I. \quad \text{Equation (35)}$$

$$\text{mean}_a = f_{mean}(a). \quad \text{Equation (36)}$$

$$\text{mean}_b = f_{mean}(b). \quad \text{Equation (37)}$$

$$q = \text{mean}_a \cdot *I + \text{mean}_b \quad \text{Equation (38)}.$$

In these equations, (i) "p" is the filtering input image, (ii) "I" is the guidance image, (iii) "r" is the radius, (iv) "$f_{mean}$" is plain average over a square window and it denotes averaging filter that computes the mean over some window with radius r, and (v) "$\varepsilon$" is the regularization. A suitable guided filter is described in K. He, J. Sun, X. Tang: Guided Image Filtering, IEEE Trans. PAMI, vol. 35 no. 6, pp. 1397-1409, June 2013 (updated version of a paper published at ECCV 2010), the contents of which are incorporated herein by reference, as far as permitted.

It should be noted that the algorithms provided herein can be used on an entire image or just portions thereof. Often, very large images are processed, and these images can possibly have spatially variant PSFs. In these cases, the image can be broken into smaller image regions, and apply the algorithm provided herein to each image region separately. Alternatively, the algorithm provide herein can be used for some of the image regions, while another algorithm can be used for other image regions. For example, to make optics blur removal faster, this algorithm can be used for some image regions (those that do contain clipped highlights and do require special treatment), while another, simpler, faster algorithm can be used for other regions (e.g. those without clipped highlights) in the image.

Figure 7:
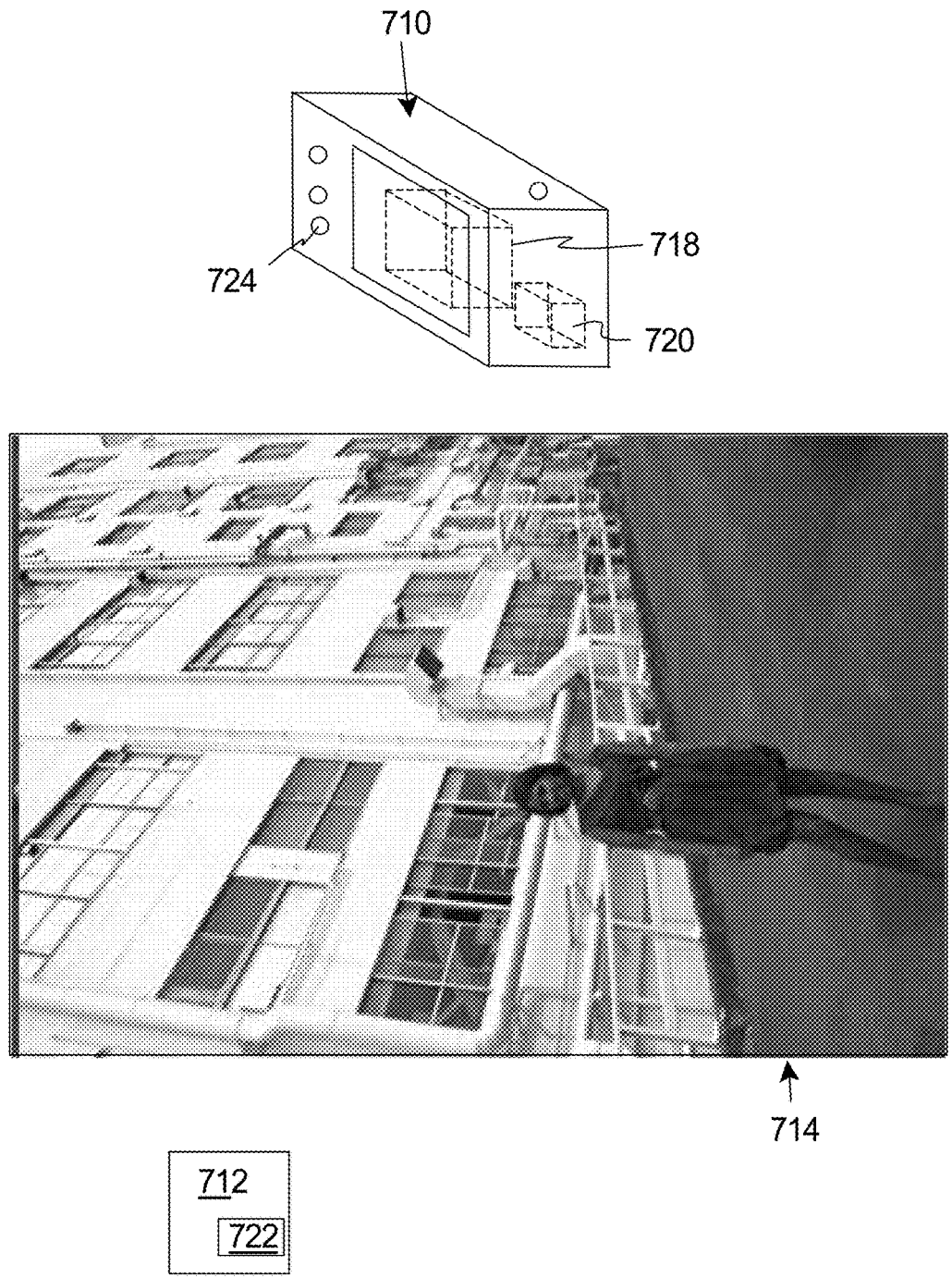
FIG. 7 is a simplified illustration of another embodiment of an image apparatus having features of the present invention, a computer having features of the present invention, and a captured image.

FIG. 7 is a simplified illustration of another embodiment of an image apparatus 710 (e.g. a digital camera), a computer 712 (illustrated as a box), and a blurred, captured image 714 (also referred to as a photograph). The present invention is also directed to one or more unique algorithms that are used to identify and detect one or more image regions 816A, 816B (illustrated in FIGS. 8A and 8B) in the image 714 that are best suited for the estimation of a point spread function for the image 714. Stated in another fashion, the new methods provided herein allow for the identification of one or more image regions 816A, 816B in the image 714 that are best suited for accurate PSF estimation. As a result thereof, the point spread function will likely be more accurate, and the resulting deblurred image will likely be improved.

As provided herein, the image apparatus 710 can include a capturing system 718 (e.g. an image sensor, such as a semiconductor device that records light electronically and a Bayer filter) that captures the image 714, and a control system 720 that uses one or more of the algorithms for evaluating one or more of the image regions 816A, 816B of the image 714 for PSF estimation. Alternatively, the computer 712 can include a control system 722 that uses one or more of the algorithms for evaluating one or more of the image regions 816A, 816B of the image 714 for PSF estimation. In either event, the control system 720, 722 can identify one or more image regions 816A, 816B that are good for PSF estimation or one or more image regions 816A, 816B that are bad for PSF estimation. The identified good image regions 816A, 816B can subsequently be used to estimate the PSF for the image 714 or a portion thereof. By identifying the image regions 816A, 816B that are good for PSF estimation, the accuracy and speed of estimating the point spread function is improved.

Subsequently, after estimating a Point Spread Function for a portion or all of the blurred image 714, the control system 720, 722 can generate a latent sharp image from the blurred image 714.

Further, the image apparatus 710 can include one or more control switches 724 that allow for the control and operation of the image apparatus 710.

Each control system 720, 722 can include one or more processors (e.g. a CPU) and circuits. Further, either of the control systems 720, 722 can include software that utilizes one or more methods and formulas provided herein. Additionally, each control system 720, 722 can include a digital data storage (not shown) to store data.

Figure 8A:
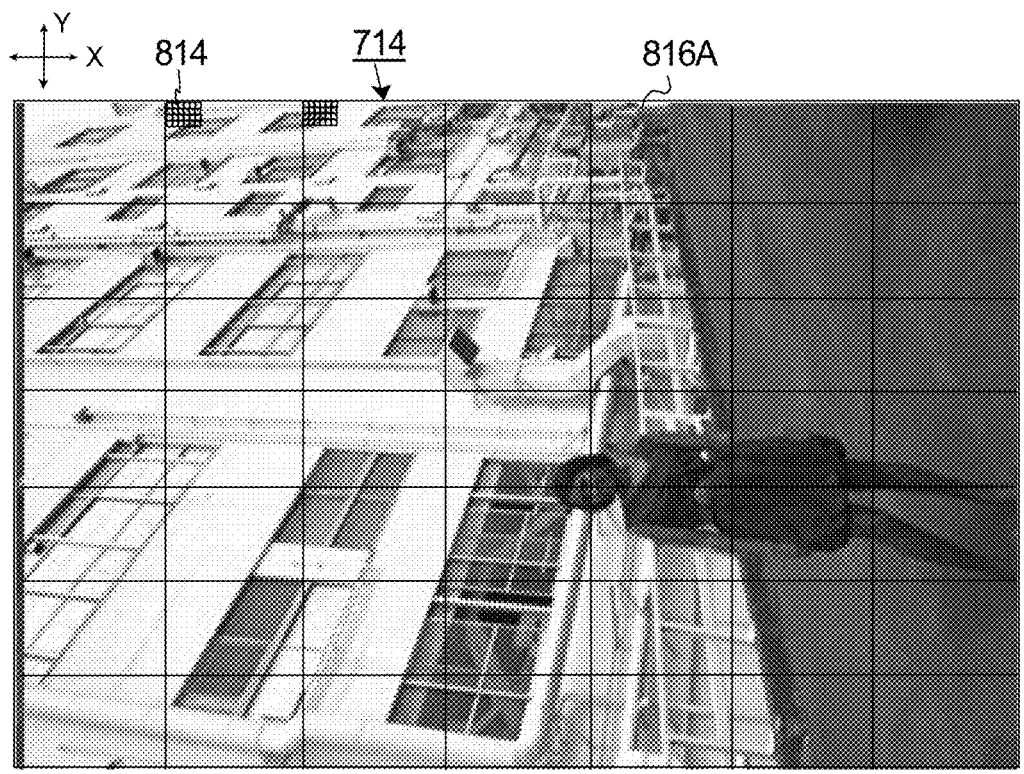
FIG. 8A illustrates the captured image of FIG. 7 divided into a plurality of image regions.
Figure 8B:
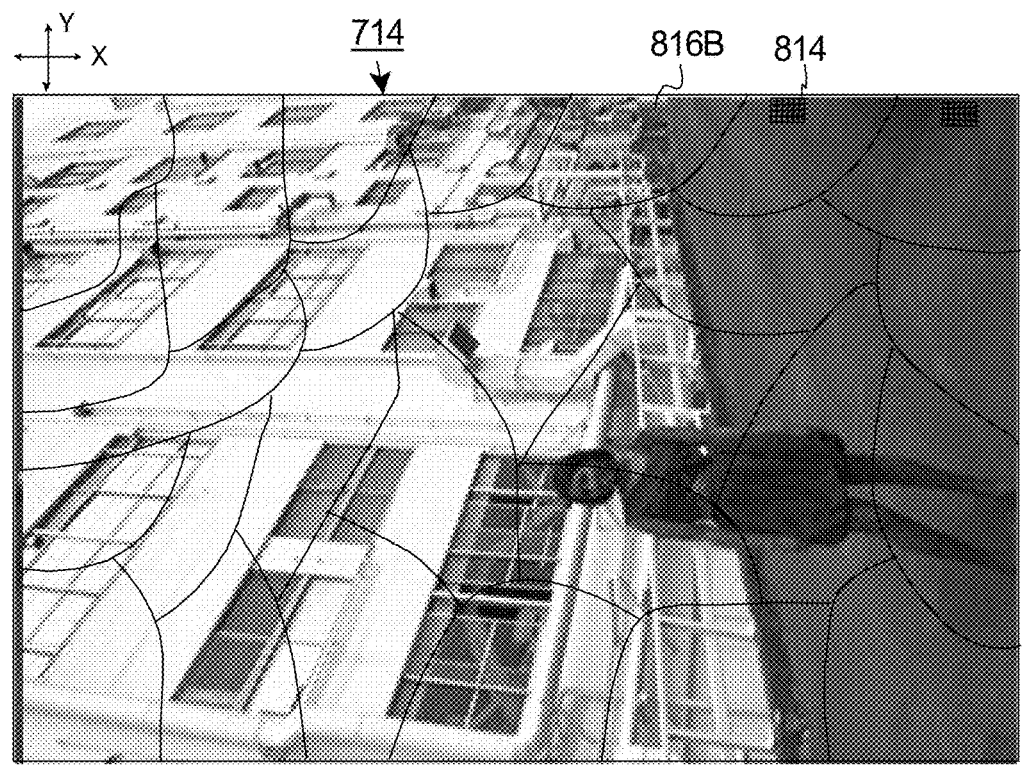
FIG. 8B illustrates the captured image of FIG. 7 divided into a different, plurality of image regions.

Referring to FIGS. 8A and 8B, the size, shape and number of the image regions 816A, 816B can be varied. For example, in FIG. 8A, each image region 816A is generally rectangular shaped and the image 714 is divided into a seven by seven grid that includes forty-nine, equally sized, block shaped image regions 816A. Alternatively, the shape and/or number image regions 816A can be different than that illustrated in FIG. 8A. For example, the image 714 can be divided into a five by five or a nine by nine grid. Still alternatively, the image regions 816A can include portions or all of multiple image blocks. Further still, as illustrated in FIG. 8B, the image 714 can be divided into a number of irregularly shaped image regions 816B.

It should be noted that each image region 816A, 816B is made up of a plurality of pixels 814 (only a few are illustrated in FIGS. 8A and 8B). As non-exclusive examples, each image region 816A, 816B can include hundreds or thousands of adjacent, connected, and neighboring pixels 814.

In also be noted that any of the image regions 816A, 816B can be referred to as a first image region, a second image region, a third image region, etc. Additionally, some of the image regions 816A, 816B have good texture, some of the image regions 816A, 816B have very little texture, and/or some of the image regions 816A, 816B have many strong edges in certain directions.

As provided above, the present invention is directed to one or more methods for evaluating one or more of the image regions 816A, 816B to identify which of the image regions 816A, 816B are suitable for PSF estimation and/or which of the image regions 816A, 816B are unsuitable for PSF estimation. In certain embodiments, the present invention evaluates one or more of the image regions 816A, 818B, and assigns a region score to the one or more image regions 816A, 816B using parametric models of low-level, image features that are tied to PSF estimation accuracy.

Subsequently, the present invention can estimate the point spread function for one or more of the image regions 816A, 816B having the best region score(s), while ignoring the image regions 816A, 816B with the worst region score(s).

Further, the one or more image regions 816A, 816B with the best region score(s) can be used to determine (i) the point spread function for just the image regions 816A, 816B with the best region score(s); (ii) the point spread function for a portion of the image that includes one or more image regions 816A, 816B with the best region score(s); or (iii) the point spread function for the entire image 714.

Figure 9:
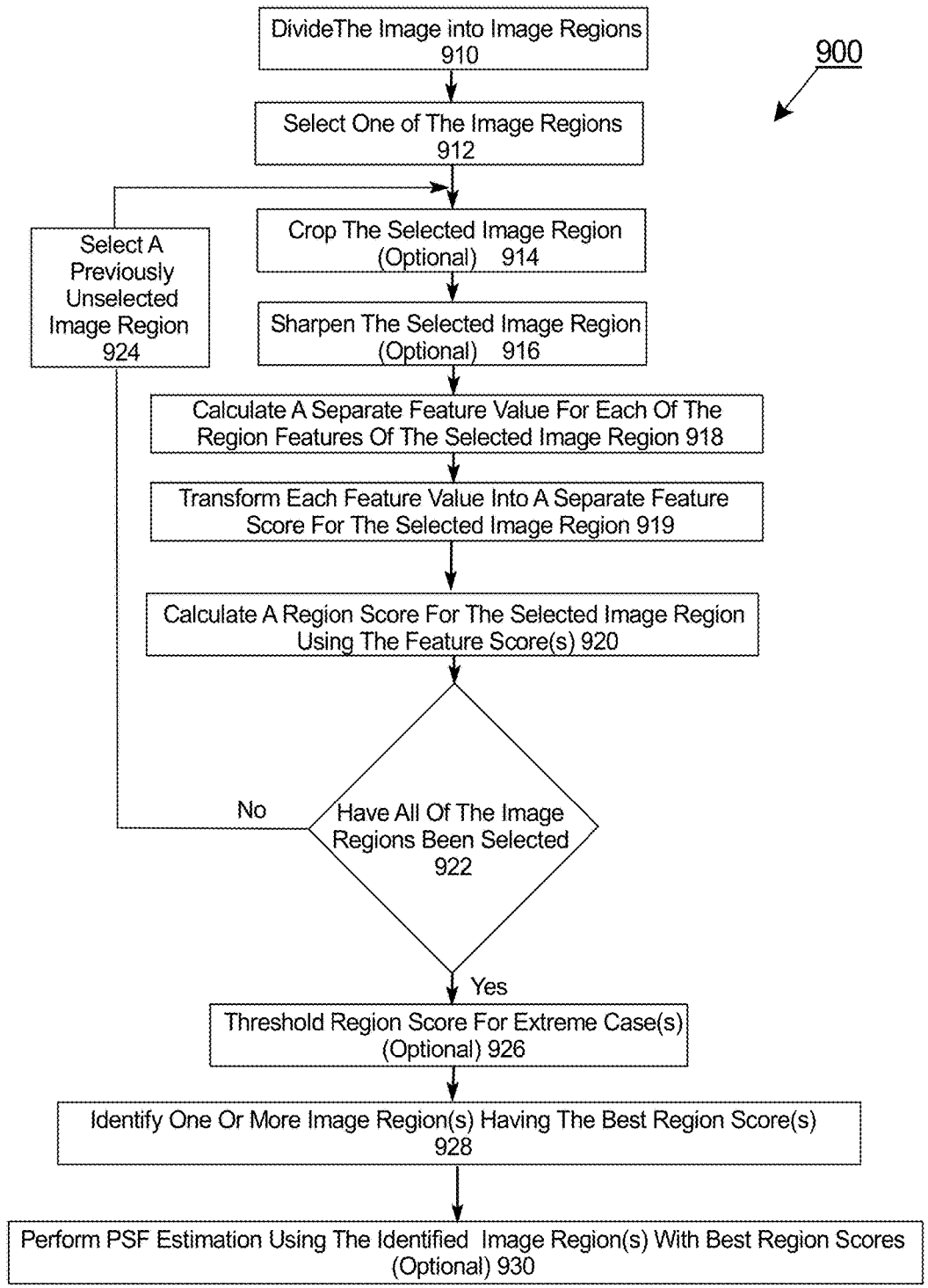
FIG. 9 is flow chart that outlines a method for identifying one or more regions of an image for PSF estimation.

FIG. 9 is flow chart that outlines one non-exclusive method 900 for evaluating an image to identify one or more image regions that are best suited for PSF estimation using one of the control systems 720, 722 (illustrated in FIG. 7). Starting at block 910, the image is divided into a plurality of image regions with the control system 720, 722. Each image region includes a plurality of adjacent, connected pixels. Non-exclusive examples of how an image can be divided are described above and illustrated in FIGS. 8A and 8B.

Next, at block 912, one of the image regions is selected for evaluation by the control system 720, 722. Subsequently, at block 914, the selected image region can optionally be cropped by the control system 720, 722. Next, at block 916, the selected image region can optionally be sharpened by the control system 720, 722. For example, the sharpening can be performed to enhance the edges in a very blurry image. As non-exclusive examples, an unsharp mask filter, or another type of sharpening filter can be used to sharpen the image.

Next, at block 918, a separate feature value can be computed for one or more region feature(s) of the selected image region with the control system 720, 722. The type of region features and the method used to determine the feature value can vary. Generally speaking, for the selected image region, (i) a good feature value for a region feature is an indication that this selected image region more likely good for PSF estimation (result in a more accurate PSF estimation); and (ii) a bad feature value for a region feature is an indication that this selected image region more likely bad for PSF estimation (result in a less accurate PSF estimation).

As provided herein, each region feature is a low-level feature (property at the pixel level) that is tied to or related to the accuracy of PSF estimation. Stated in another fashion, the region features are tied to the properties of the image region that are believed to influence the accuracy of the PSF estimation. A non-exclusive example of suitable region features includes (i) an edge direction histogram skewness region feature ("skewness region feature"); (ii) a relative amount of edges region feature ("edges region feature"); (iii) a dynamic range of gradient magnitude region feature ("gradient magnitude region feature"); (iv) relative amount of strong highlights region feature ("highlights region feature"); and (v) an average intensity region feature ("intensity region feature").

A non-exclusive example of how to calculation the separate feature value for each of the one or more region features for the selected image region is provided below in reference to FIG. 10.

Next, at block 919, each feature value is transformed into a separate feature score for the selected image region with the control system 720, 722. With this transformation, each of the feature scores will have the same possible range. Further, with this transformation, each feature score will better represent the probability that the selected image region will be good for PSF estimation. Non-exclusive examples of the transformation of the feature value(s) to feature score(s) are provided below in reference to FIGS. 10-13.

Subsequently, at block 920, a single, region score is computed by the control system 720, 722 for the selected image region using one or more feature score(s). One non-exclusive example of the calculation of the region score for the selected image region using its feature score(s) is provided below in reference to FIG. 10.

Next, at block 922, the image regions are evaluated with the control system 720, 722 to determine if all of the desired image regions have been evaluated and given a region score. If not, at block 924, a previously unselected image region is selected and blocks 914-924 are repeated until all of the image regions desired to be evaluated are, and a separate region score is assigned to each of these image regions.

When the answer is yes at block 922, each of the selected image regions will have (i) one or more feature value(s); (ii) one or more feature score(s) (one for each feature value); and (iii) a single, unique region score that was determined using the separate feature score(s). It should be noted that (i) any of the region features can be referred to as a first, second, third, fourth, or etc. region feature; (ii) any of the feature values can be referred to as a first, second, third, fourth, or etc. feature value; and (iii) any of the feature scores can be referred to as a first, second, third, fourth, or etc. feature score.

Optionally, after all of the desired image regions have been evaluated and assigned a separate region score, at block 926, one or more of the region scores can be additionally thresholded with the control system 720, 722 to exclude extreme regions.

Next, at block 928, the region scores are evaluated and/or compared, and one or more of the image region(s) with the best region score(s) are identified and selected with the control system 720, 722.

Finally, at block 930, PSF estimation can optionally be performed by the control system 720, 722 using one or more of the image region(s) with the best region score(s). In another embodiment, PSF estimation is only performed using the image regions having a region score that is equal to or greater than a predetermined threshold.

The method utilized for PSF estimation can vary. As a non-exclusive example, the method described in international publication number WO 2015/047538, having an international filing date of Jul. 31, 2014, can be used to estimate the PSF using one or more of the image regions. As far as permitted, the contents of WO 2015/047538 are incorporated herein by reference.

Optionally, the blurred image can be deblurred by the control system 720, 722 using the estimated PSF. Any suitable method for deblurring an image can be utilized.

Figure 10:
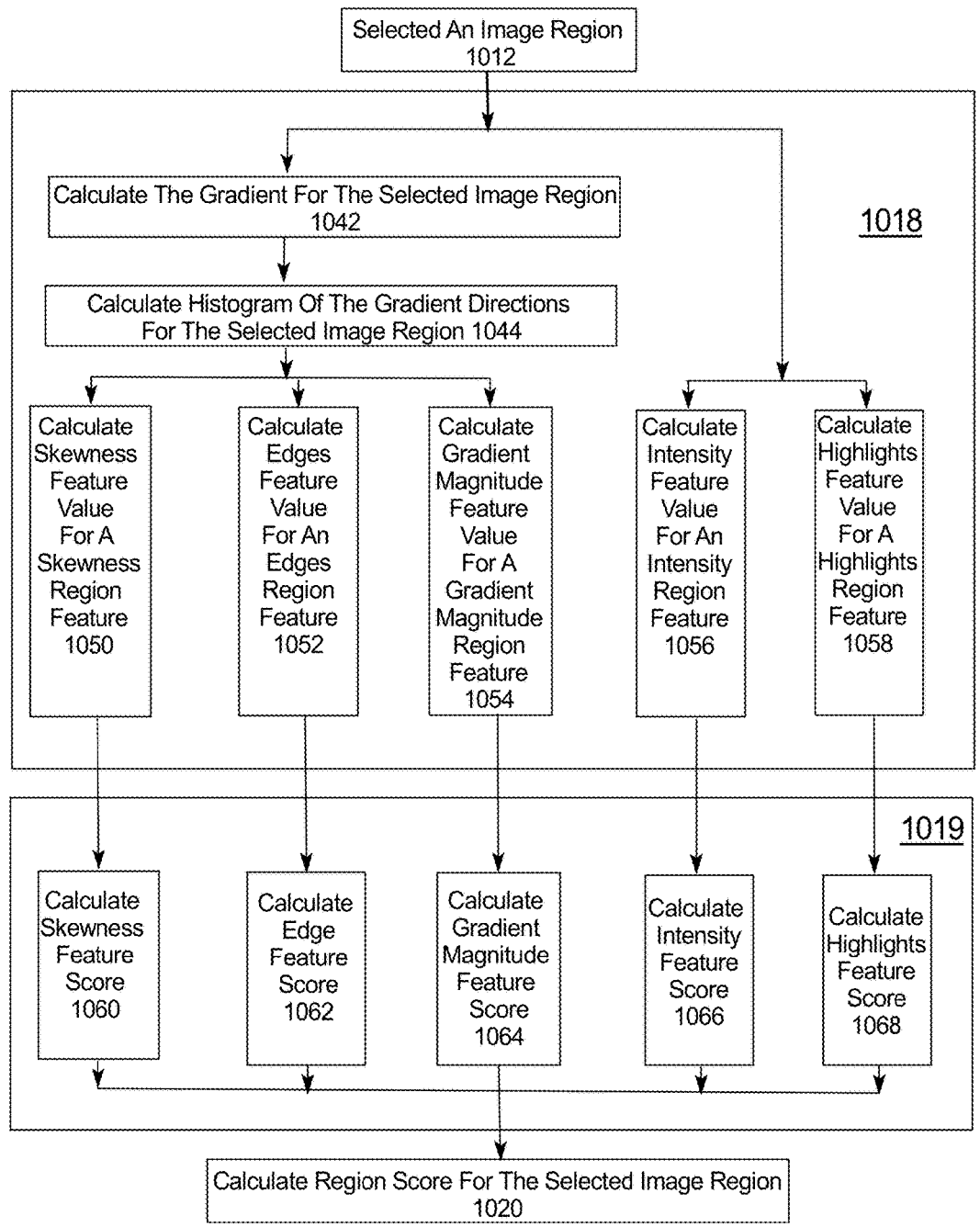
FIG. 10 is flow chart that outlines a method for calculating a region score for a selected image region.

FIG. 10 is a flow chart that outlines one non-exclusive method for calculating a region score for a selected image region. It should be noted that this method can be repeated for each image region to compute a separate region score for each image regions. Additionally, it should be noted that other methods can be used to calculate the region score for each image region.

In FIG. 10, at block 1012, the image region is selected by the control system 720, 722.

Next, at block 1018, a separate feature value is computed for one or more region feature(s) of the selected image region with the control system 720, 722. The number and type of region features and the method used to determine the feature values can vary. In the embodiment, illustrated in FIG. 10, five separate feature values are calculated for each selected image region. Alternatively, more than five or fewer than five feature values can be utilized.

In certain embodiment, one or more of the feature values can be calculated utilizing the gradient of the selected image region. Stated in another fashion, one or more feature values can be based upon and/or are determined using the gradient in the image region. Accordingly, at block 1042, the control system 720, 722 calculates the gradient for the selected image region. To calculate the gradient, each pixel in the image region can be compared to its neighboring pixels to determine a directional change in the intensity or color for the pixels in that image region. In one non-exclusive example, the gradient is a vector comprising derivatives in the X (horizontal) and Y (vertical) direction. Alternatively, the directional derivatives used for the gradient can be calculated in more than two or one direction.

Optionally, in order to eliminate the effects of spurious edges and noise, a threshold can be applied to clean up the gradient with the control system 720, 722. In this step, a gradient mask can be created based on the dynamic range of the gradient magnitudes. Subsequently, the gradient mask can be applied to the gradient to threshold the gradient for the selected image region.

Further, at block 1044, a histogram of the gradient directions can be created. In certain embodiments, only the pixels where the gradient magnitude is sufficiently big are included in the histogram, because when the gradient magnitude is small, gradient direction can be unreliable and irrelevant.

Alternatively, in the frequency domain, the spectrum can be analyzed and used for one or more region features, particularly the relative amount of texture or various features evaluating the properties of the image region spectrum, especially the amount and the distribution of high frequencies.

In the non-exclusive example in FIG. 10, three of the feature values are calculated utilizing the gradient, while the other two feature values are calculated without utilizing the gradient of the image region information.

More specifically, at block 1050, the control system 720, 722 calculates an edge direction histogram skewness feature value ("skewness feature value") based on the edge direction histogram skewness ("skewness region feature") of the selected image region. Skewness can be calculated from the histogram of the gradient directions. For example, a Pearson Coefficient (or other type of skewness measure) can be used to determine the edge direction histogram skewness. If the selected image region is approximately isotropic (has similar amount of edges in all directions), the computed skewness feature value will be good. Generally, when the selected image region is approximately isotropic, it is good for PSF estimation. Thus, when the selected image region is approximately isotropic, a relatively good skewness feature value is assigned.

Alternatively, if the image region is smooth (with no edges) or has a lot of edges with most edges in only one direction, the computed skewness feature value will be bad. Generally, when the image region is smooth (with no edges) or has a lot of edges with most edges in only one direction, it is not good for PSF estimation. Thus, when the selected image region is smooth (with no edges) or has a lot of edges with most edges in only one direction, a relatively bad skewness feature value is assigned.

In summary, for the selected image region, the skewness feature value will vary depending on the distribution of the gradient directions and the particular measure of skewness that is used. In this example, the control system 720, 722 will assign the skewness feature value based on the characteristics of the histogram of the gradients, with isotropic image regions being assigned the best feature value.

The range of skewness feature values for the edge direction histogram skewness region feature can vary. For example, the skewness feature value can vary between zero and 0.5 (0-0.5); with zero representing very good edge direction histogram skewness (and that this image region may be good for PSF estimation); and with 0.5 representing very bad edge direction histogram skewness (and that this image region may not be good for PSF estimation).

However, other ranges are possible. In this example, the skewness feature value has a numerical value. Alternatively, the skewness feature value (or other feature values) can have another type of grade or scale. For example, instead of a range, one or more of the feature value(s) could be binary. As a specific example, (i) zero can be assigned to the skewness feature value when there is good edge direction histogram skewness, and (ii) one can be assigned to the skewness feature value when there is bad edge direction histogram skewness.

Next, at block 1052, the control system 720, 722 calculates a relative amount of edges feature value ("edges feature value") for the selected image region. The edges feature value can be determined based on the relative amount (or quantity) of edges ("edges region feature") in the selected image region. The control system 720, 722 can use an edge detector to detect edges (or edge pixels) in the selected image region. Alternatively, if other gradient based features are used, a relatively simple way of detecting edges is selecting the pixels where the gradient magnitude exceeds a certain threshold. In either case, in one, non-exclusive embodiment, the edges feature value can be computed as the ratio of the number of edge pixels in the selected image region to the overall number of pixels in the selected image region (edge feature value=(number of edge pixels)/(total number of pixels)). In this example, the edges feature value can range from zero to one (or, alternatively, from 0% to 100%).

If there are no edges (which is bad for PSF estimation), the edges feature value will be zero. In this case, the edges feature value of zero is an indicator that the selected image region is not good for PSF estimation). Alternatively, if there are many edges in the selected image region, the edges feature value will be higher (theoretically up to 1), and the higher edges feature value indicates that the image region is better suited for PSF estimation. It should be noted that the edges feature value will be equal to one if all of the pixels in the selected image region are classified as edge pixels. This typically does not happen with real image edges, but only in certain degenerate cases (like large smooth gradation in combination with too low gradient magnitude threshold). Thus, in certain instances, an edges feature value of one or close to one can actually be bad. Accordingly, some additional processing by the control system 720, 722 (e.g. thresholding) may be necessary to exclude such extreme/degenerate cases when the edges feature value is one or very close to one.

Alternatively, the edges feature value can have another type of grade or scale. For example, instead of a range, the edges feature value could be binary, with (i) zero being assigned to the edges feature value when the number of edge pixels in the selected image region is below a certain threshold, and (ii) one being assigned to the edges feature value when the number of edge pixels in the selected image region is above a certain threshold.

Subsequently, at block 1054, the control system 720, 722 calculates a dynamic range of gradient magnitude feature value ("gradient magnitude feature value") for the selected image region. The gradient magnitude feature value can be determined from the dynamic range of gradient magnitude ("gradient magnitude region feature") of the selected image region. This can be done by computing the difference between the highest gradient magnitude and the lowest gradient magnitude within the selected image region. In one embodiment, the gradient magnitude feature value will depend on the amount of difference between the highest gradient magnitude and the lowest gradient magnitude within the selected image region. In the case when the dynamic range of gradient magnitude is small, a low gradient magnitude feature value can be assigned that indicates that there are no strong edges in this image region, which is bad for PSF estimation. Alternatively, when the dynamic range of gradient magnitude is large, a high gradient magnitude feature value can be assigned that indicates that there are strong edges in this image region. It should be noted that the strong edges by themselves is not sufficient to guarantee that this image region will be good for PSF estimation performance. That is why, in certain embodiments, that feature values are transformed into feature scores, and multiple feature scores can be used to calculate the region score for each image region.

The range of the gradient magnitude feature value can vary. For example, the dynamic range of the gradient magnitude feature value can vary between zero and one hundred percent (0-100 percent), with zero representing a very bad dynamic range of gradient magnitude (bad for PSF estimation), and one hundred representing a very good dynamic range of gradient magnitude (good for PSF estimation). However, other ranges are possible. Further, the gradient magnitude feature value can be scaled and/or normalized.

In one embodiment, the gradient magnitude feature value is equal to the dynamic range of gradient magnitude for the selected image region divided by the theoretical maximum, dynamic range of gradient magnitude (gradient magnitude feature value=(dynamic range of gradient magnitude)/(theoretical maximum, dynamic range of gradient magnitude)). For example, an 8-bit image would have a theoretical maximum, dynamic range of 0-255, and a 12-bit image would have a theoretical maximum, dynamic range of with values 0-4095). In this embodiment, for an 8-bit image, if the dynamic range of gradient magnitude for the selected image region is determined to be 200, then its gradient magnitude feature value would be 0.78 (0.78=200/255). In this example, the gradient magnitude feature value has a range of zero to one, with zero representing a very bad dynamic range of gradient magnitude (bad for PSF estimation), and one representing a very good dynamic range of gradient magnitude (good for PSF estimation).

Next, at block 1056, the control system 720, 722 calculates an average intensity feature value ("intensity feature value") for the selected image region. The intensity feature value for the selected image region can be computed by computing the average or mean value of intensity ("intensity region feature") of all pixels within the selected image region. A logical range for the intensity feature value is zero to a maximum intensity value (which depends on how the image is scaled). Alternatively, the intensity feature value can be equal to the average or mean value of intensity of all pixels within the selected image region divided by the maximum intensity value. In this example, the range of the intensity feature value will have a range of zero to one (or 0 to 100%). It should be noted that the intensity feature value can be calculated without the gradient information.

In certain embodiments, the intensity feature value can be used to exclude the image regions that are two dark and do not contain sufficient detail. Such image regions will have a relatively low average or mean value of intensity of all pixels. Thus, the control system 720, 722 will assign a low (bad in this example) intensity feature value which indicates a bad image region for PSF estimation. Alternatively, the control system 720, 722 will assign a high (good in this example) intensity feature value if the selected image region has a good average or mean value of intensity. This will indicate a potential good image region for PSF estimation.

Subsequently, at block 1058, the control system 720, 722 calculates a relative amount of strong highlights feature value ("highlights feature value") for the selected image region. The highlights feature value can be determined by evaluating the relative amount (or quantity) of strong (saturated or nearly saturated) highlights ("highlights region feature") in the selected image region. The strong highlight pixels are the pixels in the selected image region having an intensity exceeding a certain threshold that is near to the maximum possible intensity. For example, the highlights feature value can be equal to the number of strong highlight pixels divided by the total number of pixels for the selected image region (highlights feature value=(number of strong highlight pixels)/(total number of pixels)). Stated in another fashion, the highlights feature value can be equal to the ratio of strong highlight pixels to the total number of pixels for the selected image region. In this example, the highlights feature value will have a range of zero to one (or 0 to 100%). As a specific example, if the selected image region has five hundred pixels and three hundred of the pixels are strong highlight pixels, the highlights feature value is 0.6 (0.6=300/500).

Since the presence of saturated highlights is one of the main reasons why PSF estimation may fail, a very small highlights feature value is desirable and a larger highlights feature value indicates that the selected image region is unlikely to produce good PSF estimate. For example, the highlights feature value of zero is very good, while the highlights feature value of one is bad. In this example, the image regions having many strong highlight pixels will be assigned a bad highlights feature value, while image regions having very few strong highlight pixels will be assigned a good highlights feature value. Further, the highlights feature value will depend upon the number of strong highlight pixels in the selected image region. It should be noted that the highlights feature value can be calculated without the gradient information.

After all of the feature values have been calculated, with reference to block 1019, each of the feature values can be transformed to a separate feature score. From the discussion above, it should be noted that one or more of (i) the skewness feature value, (ii) the edges feature value, (iii) the gradient magnitude feature value, (iv) the intensity feature value, and (v) the highlights feature value had a different range. Further, in certain examples, a small feature value was good, while in other examples, the small feature value was bad. Additionally, if one particular feature value is good, it does not always guarantee that the image region will be good for PSF estimation. Thus, one or more of feature values can be converted and transformed to provide a corresponding feature score that better represents the probability of how bad (or good) the selected image region is for PSF estimation. Further, the transformation can result in each of the feature scores having the same range. This allows for the feature scores to be combined to generate a region score that represents the probability of how good the selected image region is for PSF estimation.

More specifically, for each selected image region, with reference to blocks 1060, 1062, 1064, 1066, and 1068, the control system 720, 722 can transform (i) the skewness feature value to a skewness feature score, (ii) the edges feature value to an edge feature score, (iii) the gradient magnitude feature value to a gradient magnitude feature score, (iv) the intensity feature value to an intensity feature score, and (v) the highlights feature value to a highlights feature score. The method utilized to convert and transform each feature value to a feature score can vary. In most cases, the transformation is non-linear.

In one non-exclusive embodiment, the individual feature scores will have a range of between zero to one, where the low score (closer to zero) indicates the selected image region is bad for PSF estimation, and the high score (closer to one) indicates the selected image region might be good for PSF estimation. Alternatively, other ranges for the feature score can be utilized.

Figure 11:
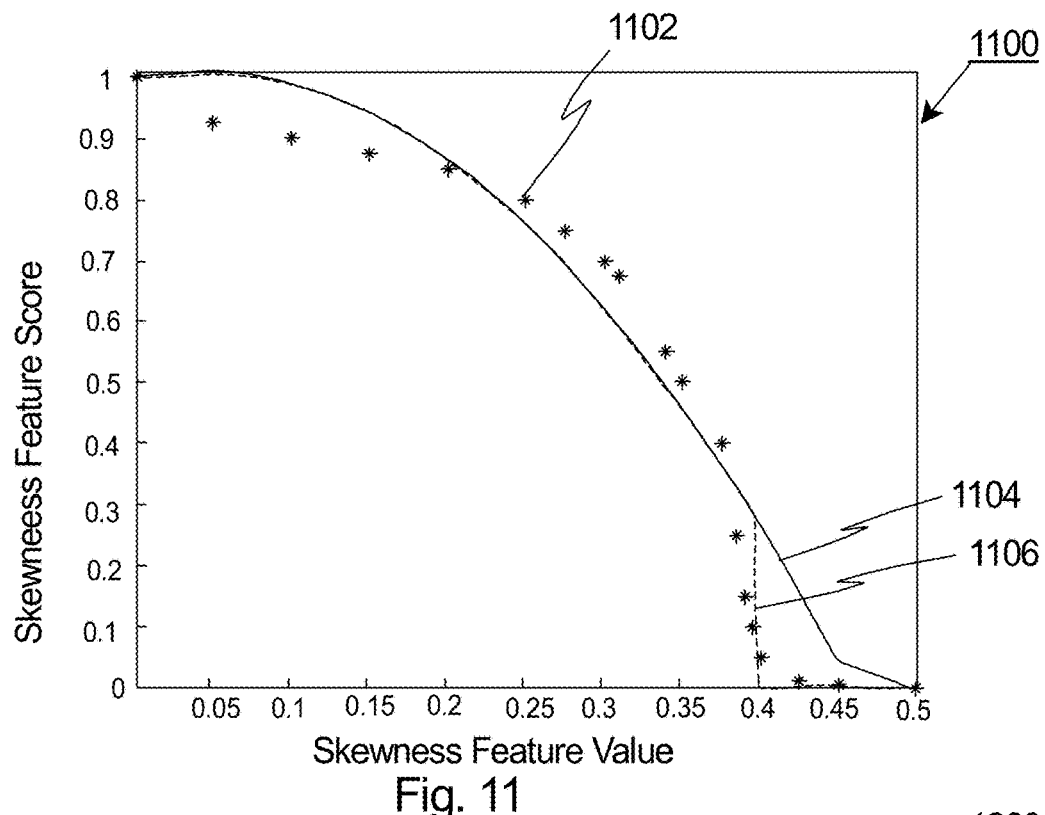
FIG. 11 is a graph that illustrates a weight based on edge distribution skewness measure.

At block 1060, the skewness feature value is transformed to a skewness feature score of the selected image region. FIG. 11 is a non-exclusive graph 1100 that illustrates how skewness feature value can be mapped to a skewness feature score. Stated in another fashion, FIG. 11 illustrates how a feature value can be mapped to a particular feature score (weight) that expresses how bad the selected image region is likely to be for PSF estimation. In FIG. 11, the graph 1100 includes (i) a plurality of data points 1102 (illustrated with stars) determined from training images; (ii) a fitted curve 1104 (illustrated with a solid line) fitted to the data points 1104 (e.g. using a Quadratic fit $a_1*x^2+a_2*x+a_3$); and (iii) a fitted curve plus hard thresholding 1106 (illustrated with a dashed line). In this example, the hard thresholding 1106 occurs at about 0.4. Thus, any skewness feature value greater than about 0.4 will result in a skewness feature score of zero (because PSF estimation was determined to be near impossible through experimental testing). It should be noted that the shape and characteristics of the curves 1104, 1106 can be varied from those illustrated in FIG. 11 with further testing and research. It should also be noted that the shape of the curves 1104, 1106 can be adjusted to adjust the relative weight of the skewness feature score in the resulting overall region score (computed in block 1020).

With this example, if the gradient direction distribution is too skewed, (meaning that most or all of the edges have the same direction) then skewness feature value will be high, and the skewness feature score will be low. Similarly, if the skewness feature value is low (indicating that there is a similar amount of edges in all directions), the skewness feature score will be high. For example, if it is determined in block 1050 that the skewness feature value is 0.3, then, referring to FIG. 11, the skewness feature score will be about 0.6. Alternatively, if skewness feature value is 0.2, then, referring to FIG. 11, the skewness feature score will be about 0.9.

Figure 12:
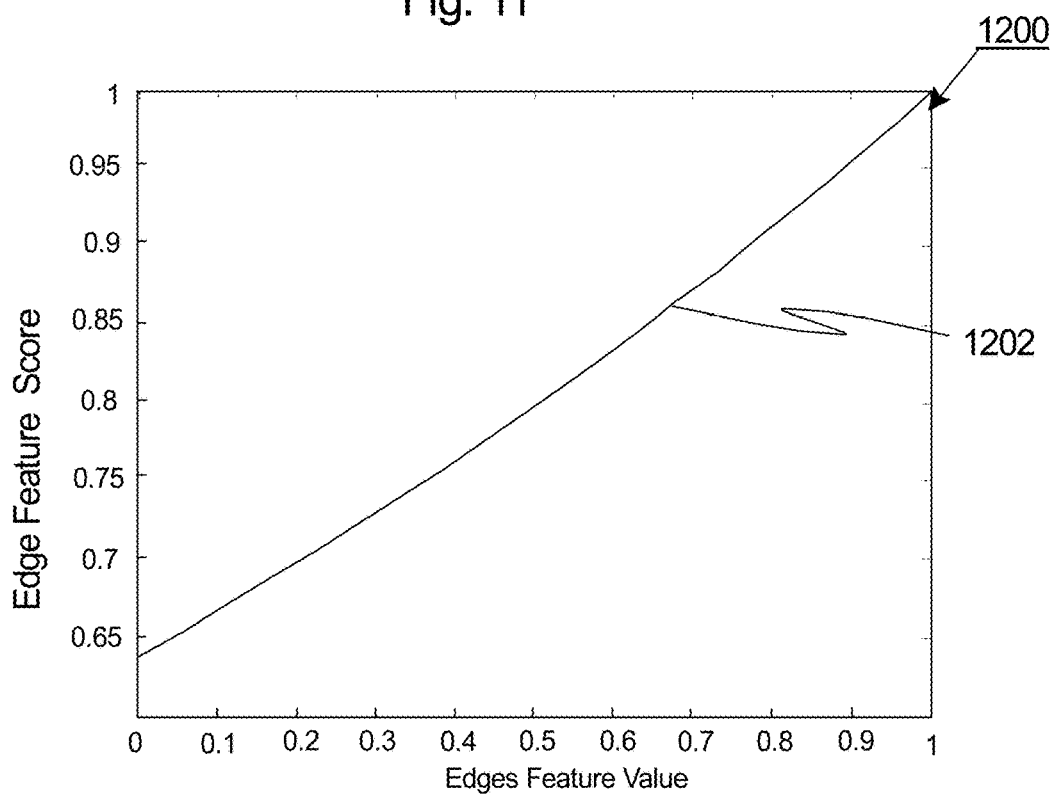
FIG. 12 is a graph that illustrates a weight based on number of edges within the image region.

Referring back to FIG. 10, at block 1062, the edges feature value is transformed to an edge feature score of the image region. FIG. 12 is a non-exclusive graph 1200 that illustrates how the edges feature value can be mapped to an edge feature score. In FIG. 12, the graph 1200 includes a curve 1202 (illustrated with a solid line). It should be noted that the shape and characteristics of the curve 1202 can be varied from that illustrated in FIG. 12 with further testing and research. It should also be noted that the shape of the curve 1202 can be adjusted to adjust the relative weight of the edge feature score in the overall region score (computed in block 1020).

As provided above, if the image region contains a lot of edges, then the edges feature value will be high. Similarly, if there are not many edges, the edges feature value will be low. For example, if it is determined in block 1052 that the edge feature value is 0.7, then, referring to FIG. 12, the edge feature score will be about 0.83.

Figure 13:
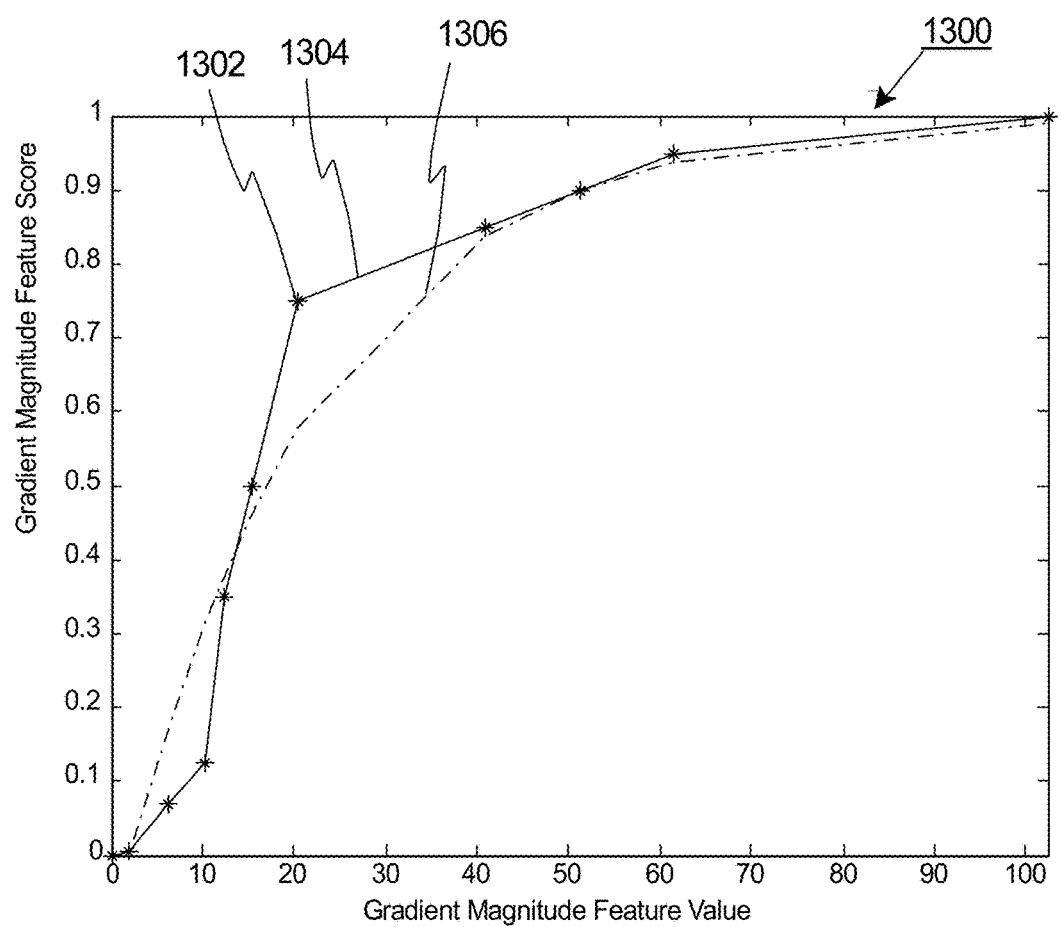
FIG. 13 is a graph that illustrates a weight based on gradient magnitude.

Referring back to FIG. 10, at block 1064, the gradient magnitude feature value is transformed to a gradient magnitude feature score. FIG. 13 is a non-exclusive graph 1300 that illustrates how gradient magnitude feature value can be mapped to the gradient magnitude feature score. In FIG. 13, the graph 1300 includes (i) a plurality of data points 1302 (illustrated with stars) determined from training images; (ii) a data plot 1304 (illustrated with a solid line) that extends between the date points 1302; and (iii) an exponential-fit ($c_1 * \exp(-c_2 * x)$) curve 1306 (illustrated with a dashed line). It should be noted that the shape and characteristics of the curves 1304, 1306 can be varied from that illustrated in FIG. 13 with further testing and research. It should also be noted that the shape of the curves 1304, 1306 can be adjusted to adjust the relative weight of the gradient magnitude feature score in the resulting overall region score (obtained in block 1020).

As provided above, if the gradient magnitude feature value is low for the selected image region, then the gradient magnitude feature score will be low. Similarly, if the gradient magnitude feature value is high for the selected image region, then the gradient magnitude feature score will be high. For example, if it is determined in block 1054 that the gradient magnitude feature value for the selected image region is seventy units (brightness levels), then, referring to FIG. 13, the gradient magnitude feature score will be about 0.95. Alternatively, if gradient magnitude feature value is twenty, then, referring to FIG. 13, the gradient magnitude feature score will be about 0.75.

Referring back to FIG. 10, at block 1066, the intensity feature value is transformed to an intensity feature score. In one embodiment, an exponential function can be used to map the intensity feature value to the intensity feature score. A non-exclusive example of a suitable function is image feature score=exp (−10*intensity feature value). In this example, the higher the intensity feature value, the lower the intensity feature score (lower is good). Alternatively, the relationship between the intensity feature value and the intensity feature score can be mapped using test data. Further, the shape of the curve can be adjusted to adjust the relative weight of the intensity feature score in the resulting overall region score (obtained in block 1020).

At block 1068, the highlights feature value is transformed to a highlights feature score. The basic idea is to give a bad score to image regions with lots of highlights (bad score to blocks having a high ratio of number of highlight pixels/ number of block pixels), good score to blocks with less (few) highlights (good score to blocks having a low ratio of number of highlight pixels/number of block pixels). In one embodiment, the relationship between the highlights feature value and the highlights feature score can be mapped using test data. Further, the shape of the curve can be adjusted to adjust the relative weight of the highlights feature score in the resulting overall region score (obtained in block 1020).

Next, one or more of these feature scores can be used to compute the region score for the selected image region. It should also be noted that a good individual feature score does not necessarily mean that the image region is good, as it may be difficult to accurately estimate PSF using this image region for some other reason, which would be reflected by a low feature score for some other image feature.

At block 1020, after the individual feature scores are determined for the selected image region, these feature scores can be used to calculate the overall region score for that image region. In one embodiment, the individual feature scores are multiplied together to get the overall region score for that image region. In this example, if the skewness feature score is 0.8, the edge feature score is 0.55, the gradient magnitude feature score is 0.68, the intensity feature score is 0.72, and the highlight feature score is 0.62, the overall region score is 0.134 (0.8×0.55×0.68×0.72×0.62=0.134).

Alternatively, the individual feature scores can be added together to get the overall region score for that image region. Still alternatively, one or more of the individual feature scores can be modified or ignored when combining the individual feature scores to get the overall region score for that image region.

As provided herein, the overall region score can be used to indicate whether or not the image region is suitable for PSF estimation. Stated in another fashion, the region score can be used to determine how good or how bad the selected image region is for PSF estimation. In one embodiment, a selected image region is considered good for PSF estimation if its region score is better (e.g. greater) than (or equal to) a predetermined score threshold, and the selected image region is considered bad for PSF estimation if its region score is worse (e.g. less) than a predetermined score threshold. In this example, PSF estimation can be performed using only the image regions having a region score that is equal to or greater than a predetermined score threshold.

Alternatively, the region scores for the image regions can be evaluated and compared. For example, in this embodiment, a predetermined number of image regions with the best region scores can be used for PSF estimation.

Figure 14:
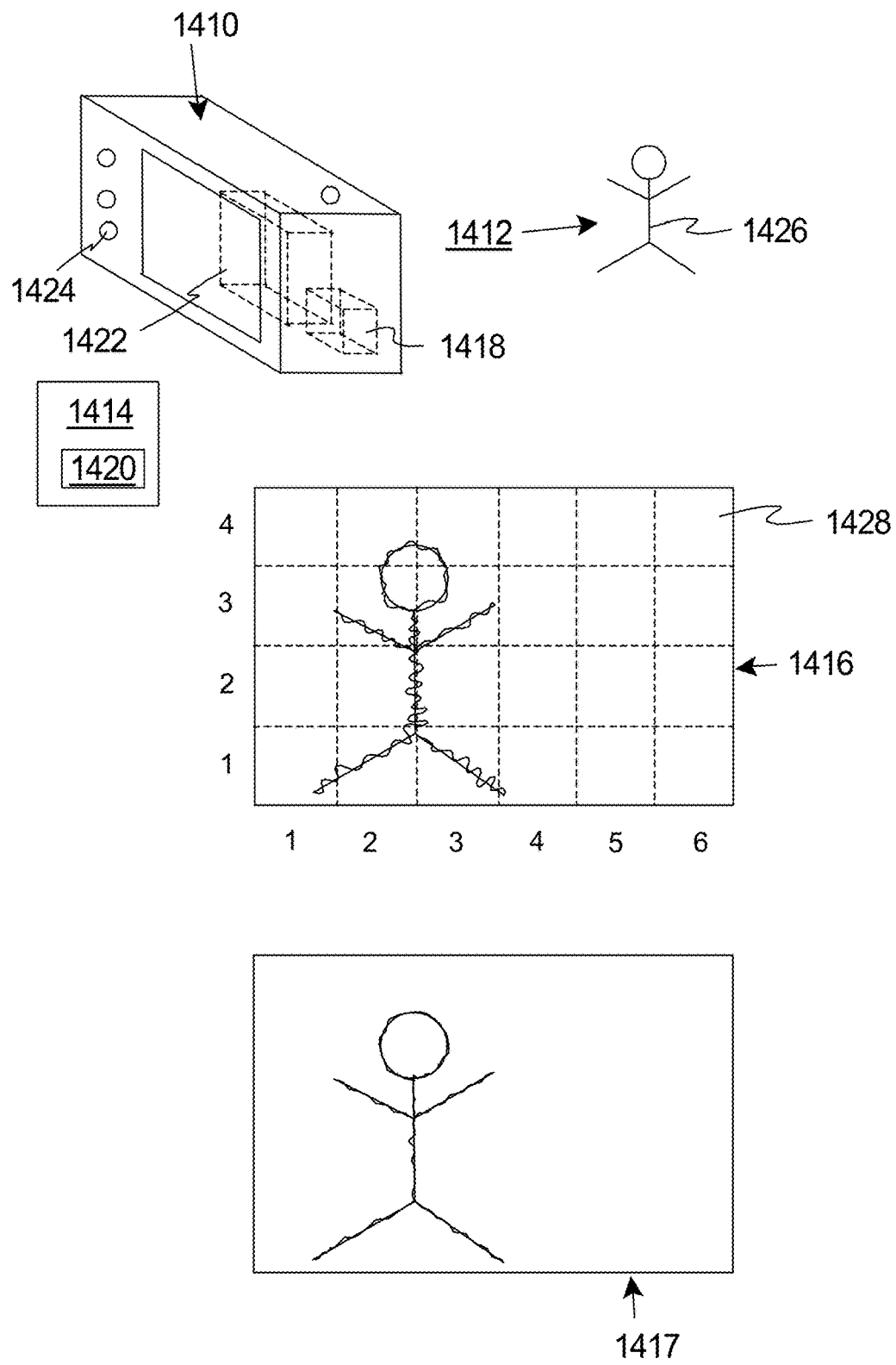
FIG. 14 is a simplified view of a scene, a computer having features of the present invention, an image apparatus, a captured image of the scene, and a deblurred image.

FIG. 14 is a simplified perspective view of still another image apparatus 1410 (e.g. a digital camera), a scene 1412, and a computer 1414 (illustrated as a box). FIG. 14 also illustrates a captured image 1416, and a deblurred image 1417. In FIG. 14, the captured image 1416 is blurry (represented as wavy lines). Movement of the image apparatus 1410 (sometimes referred to as "camera shake") during the capturing of the blurred image 1416 will cause motion blur in the blurred image 1416, and the entire blurred image 1416 will undergo a global change. Additionally, it should be noted that certain areas of the blurred image 1416 can also include (i) defocus blur, and/or (ii) motion blur of one or more of the objects in the scene 1412 if the objects were moving during the capturing of the image 1416. Thus, a blurry image 1416 can include (i) one or more regions having mainly motion blur, (ii) one or more regions having mainly defocus blur, and/or (iii) one or more regions having a combination of motion blur and defocus blur. Motion blur due to camera movement will impact all image regions. However, for areas with large defocus blur, when combined with motion blur, the dominant blur is defocus blur. Further, when a small defocus blur area is combined with motion blur, the dominant blur is a mix of motion and defocus blur.

As an overview, in certain embodiments, the present invention is also directed a system and method for analyzing one or more shape characteristics of one or more point spread functions obtained from the captured image 1416. Subsequently, for example, the shape characteristics can be used to classify the one or more point spread function(s) as representing (i) motion blur, (ii) defocus blur, or (iii) mixed motion blur and defocus blur. Stated in another fashion, the present invention provides a system and method for classifying regions in the captured image 1416 having motion blur; defocus blur; or a mixture of motion blur and defocus blur with improved accuracy.

In certain, non-exclusive embodiments, the present invention removes motion blur from the blurry image 1416 while ignoring defocus blur. Thus, it is important to identify the point spread functions that are influenced by (i) primarily motion blur, (ii) primarily defocus blur, or (iii) mixed motion blur and defocus blur. With this design, in certain embodiments, the point spread function(s) that represent motion blur can be used with the point spread function(s) that represent mixed motion and defocus (with a reduced reliability score) to estimate a globally dominant point spread function or a spatially varying point spread function estimation for the captured image 1416. Thus, the improved classification will (i) improve the estimate for the globally dominant point spread function related to motion blur, or (ii) improve the estimate for the spatially varying point spread function related to motion blur. Subsequently, an improved deblurred image 1417 can be obtained because of the improved globally dominant point spread function estimation or the improved spatially varying point spread function.

In one embodiment, as provided herein, the image apparatus 1410 can include a control system 1418 that uses one or more of the algorithms for performing the steps provided herein. Alternatively, the computer 1414 can include a control system 1420 that uses one or more of the algorithms provided herein. As alternative examples, the computer 1414 can access the algorithms for performing the classification and deblurring from its memory or from a website. Each control system 1418, 1420 can include one or more processors and circuits. Further, each of the control systems 1418, 1420 can include software that utilizes one or more methods provided herein. It should be noted that the present algorithms used herein can be efficiently solved. This will speed up the deblurring of images and will allow for image deblurring with less powerful processors (e.g. in camera processing with camera control system 1418).

Additionally, the image apparatus 1410 can include a capturing system 1422 (e.g. a semiconductor device that records light electronically such as a charge-couple device) that captures the image 1416, and one or more control switches 1424 that allow for the control and operation of the image apparatus 1410. For example, one or more of the control switches 1424 can be used to selectively switch the image apparatus 1410 to the image processing (e.g. classification and/or deblurring) disclosed herein.

The type of scene 1412 captured by the image apparatus 1410 can vary. For simplicity, in FIG. 14, the scene 1412 is illustrated as including one object 1426, e.g. a simplified stick figure of a person. Typically, however, the scene 1412 will include multiple objects.

As provided herein, the entire captured image 1416 can be classified and processed as a single unit. Alternatively, the captured image 1416 can be divided into a plurality of image regions 1428 (illustrated with dashed lines), with a separate region point spread function 1630 (illustrated in FIG. 16) being estimated for one or more of the image regions 1428. With this design, different levels of deblurring can subsequently be performed on one or more of the image regions 1428. In FIG. 14, each image region 1428 is generally rectangular shaped and the image 1416 is divided into a four by six grid that includes twenty-four, equally sized, block shaped image regions 1428. Alternatively, the shape and/or number image regions 1428 can be different than that illustrated in FIG. 14. For example, the entire image 1416 can be one image region, or the image 16 can be divided into a five by five, a seven by seven, or a nine by nine grid. Still alternatively, the image 1416 can be divided into a number of irregularly shaped image regions.

It should be noted that the four rows of the image regions 1428 have been labeled 1-4 (moving from bottom to top) and the six columns of the image regions 1428 have been labeled 1-6 (moving from left to right) for ease of identification of specific image regions 1428. Any of the image regions 1428 can be referred to as a first image region, a second image region, a third image region, etc.

Figure 15:
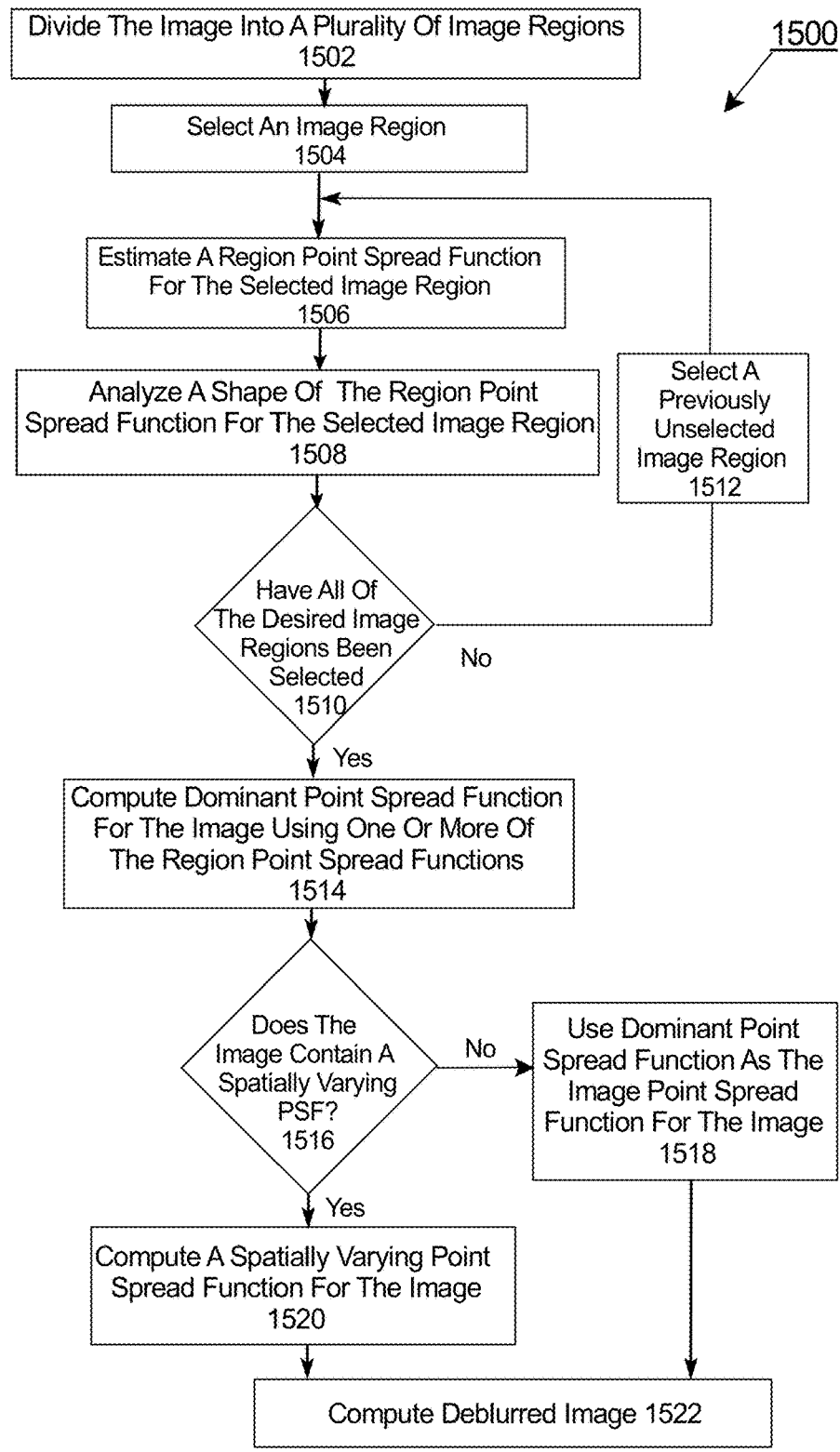
FIG. 15 is simplified flow chart that illustrates one embodiment of a method for deblurring a blurry image.

FIG. 15 is a simplified flow chart of one, non-exclusive embodiment of an image processing method 1500 having features of the present invention. Each of the steps in FIG. 15 can be performed by one of the control systems 1418, 1420 (illustrated in FIG. 14).

In FIG. 15, at step 1502, the image is divided into a plurality of image regions. As provided above, the size, shape and number of the image regions 1428 (illustrated in FIG. 14) in the image 1416 (illustrated in FIG. 14) can be varied.

Next, at step 1504, one of the image regions 1428 is selected for processing. The selection of one of the image regions 1428 is described in more detail in reference to step 1510 below.

Subsequently, at step 1506, a region point spread function 1630 (illustrated in FIG. 16) is estimated for the selected image region 1428. Any standard point spread function estimation method can be used to estimate the region point spread function 1630 for the selected image region 1428. One common approach to solving a PSF estimation problem includes reformulating it as an optimization problem in which a suitable PSF cost function and a suitable latent sharp image cost function are minimized. These algorithms are iterative and usually they alternate, improving the current estimates of the PSF and the latent sharp image. The steps of improving the current estimates of the PSF and the current estimate of the latent sharp image are typically in the form of solving an optimization problem. A relatively common type of a cost function is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparsity.

In addition to alternating minimization of the latent sharp image estimation cost function, and the PSF estimation cost function, it is also common to use a multi-resolution approach, where first, low resolution versions of the latent sharp image L and the PSF kernel K are estimated using a heavily downsampled blurry image region, and then these estimates are refined at higher and higher resolution, until the region point spread function 1630 at the full resolution of the given blurred image region is estimated.

Subsequently, at step 1508, the shape characteristics of the region point spread function 1630 of the selected image region 1428 is evaluated to estimate if the selected image region 1428 has (i) mainly motion blur, (ii) mainly defocus blur, and/or (iii) a combination of motion blur and defocus blur. One non-exclusive method used to evaluate the shape of the region point spread function is described in more detail below with reference to FIG. 17. Additionally, as a non-exclusive example for when motion blur PSF is being evaluated, (i) image region(s) 1428 having mainly motion blur can be labeled as "good"; (ii) image region(s) 1428 having mainly defocus blur can be labeled as "bad"; and (iii) image region(s) 1428 having a mixture of motion and defocus blur can be labeled as "ok".

Next, at block 1510, the image regions 1428 are reviewed to determine if all of the desired image regions 1428 have been evaluated to estimate a region point spread function. If not, at block 1512, a previously unselected image region is selected, and blocks 1506-1510 are repeated until all of the image regions desired to be evaluated are, and a separate region point spread function is estimated for each of these image regions 1428.

In the embodiments in which the image 1416 is divided into a plurality of image regions 1428, a separate region point spread function can be calculated for each of the image regions 1428. Alternatively, a separate region point spread function can be calculated for just a predetermined number (less than all) of image regions 1428 that can be randomly selected, or selected based on a predetermined pattern. Still alternatively, a separate region point spread function can be calculated for a plurality of selected image regions 1428, which are selected based on one or more characteristics of the image regions 1428. For example, a preliminary test can be performed to estimate the image regions 1428 of the image 1416 that are best suited for an accurate point spread function estimation, e.g. the image regions 1428 that have good texture, contrast or edges. This can be done by evaluating the gradient directions in each of image regions 1428. Suitable image regions 1428 have sufficient contrast, a sufficient number (greater than a predetermined number) of different gradient directions, and/or edges, while unsuitable image regions 1428 have very little contrast, are too structured or are saturated. Subsequently, the image regions 1428 that have gradients in multiple directions can be labeled as suitable image regions. In this embodiment, a separate region point spread function can be calculated for each of the suitable image regions.

If the answer at block 1510 is yes (all the desired image regions 1428 have been selected), then, at step 1514, a globally dominant (sometimes referred to as "group") point spread function for the image (or portion thereof) is computed using one or more of the region point spread functions. The method used to estimate the globally dominant point spread function can vary utilizing the teachings provided herein.

In one embodiment, the region point spread function for each "bad" image region(s) 1428 (mainly defocus blur) is not utilized in the calculation of the globally dominant point spread function. Instead, the region point spread function for each "good" image region(s) 1428 (mainly motion blur) can be used in the calculation of the globally dominant point spread function along with the region point spread function for each "ok" image region(s) 1428 (mainly motion blur). In this embodiment, the "good" and "ok" region point spread functions 1630 can be synthesized to generate the globally dominant point spread function.

It should be noted that the region point spread function for each "ok" image region(s) 1428 can have a reduced reliability score (lower weight) in the calculation of the globally dominant point spread function. Further, the weight can be varied according to the trail width. Thus, the dominant point spread function will get less contribution from region point spread functions having lower reliability scores. Stated in another fashion, the present invention can adjust the contribution of each region point spread function according to the reliability assessment made on that region point spread function. With the present invention, the shape characteristics of each region point spread function is analyzed as a reliability measure to help improve the dominant point spread function estimation accuracy. Thus, in certain embodiments, each region point spread function contributes to the globally dominant point spread function according to its reliability.

In one, non-exclusive embodiment, a confidence score is assigned to each regional point spread function used in the calculation of the globally dominant point spread function. For example, both the "good" and "ok" region point spread functions 1630 can be synthesized to generate the globally dominant point spread function.

In one embodiment, the initial reliability ("confidence") score is based on information of the PSF convergence speed and region block texture information. The trail characteristic(s) (e.g. trail width and/or trail length) information is then used to adjust the PSF reliability score. Generally speaking, the PSF reliability score is increased for region point spread functions with smaller trail widths, and the PSF reliability score is decreased for region point spread functions with greater trail widths. As a non-exclusive example, (i) when the trail width is above a certain threshold (for example, greater than six (TW>6)), the reliability score can be reset to be zero or a very low number; (ii) when the trail width in between five and six (5 and 6), the new reliability score is equal to the original reliability score multiplied by (six minus the trail width) (New Reliability Score=original reliability score*(6−trail width)); and (iii) where the trail width is less than five (<50), the reliability score is not adjusted (keep the original reliability score).

Alternatively, if there is a sufficient number of good region point spread functions 1630, only the "good" region point spread functions 330 (mainly motion blur) are used in the calculation of the globally dominant point spread function. With this design, only the region point spread functions that directly attribute to motion blur are used for the calculation of the globally dominant point spread function.

Next, at step 1516, the region point spread functions are evaluated to determine if the image 1416 contains a spatially varying point spread function. In one embodiment, the control system evaluates all of the region point spread function for each "good" image region(s) 1428 (mainly motion blur) to determine if they are relatively similar/consistent (e.g. in shape and/or size). If they are relatively similar/consistent in shape and/or size (spatially invariant), then there is likely a single globally dominant point spread function (and no spatially varying point spread function). Alternatively, if they are not relatively similar/consistent in shape and/or size (spatially variant), and they vary from image region 1428 to image region 1428, then there is likely a spatially varying point spread function.

If the image is not found to contain a spatially varying point spread function, at step 1518, the single, dominant point spread function is selected as the image point spread function for the image or a portion thereof. The globally dominant point spread function is subsequently used at step 1522 to deblur the captured image 1416 to compute the deblurred image 1417 (illustrated in FIG. 14).

Alternatively, if the image is found to contain a spatially varying point spread function, at step 1520, a spatially varying point spread function is computed using one or more of the region point spread functions. The method used to estimate the spatially varying point spread function can vary utilizing the teachings provided herein.

In one embodiment, a transformed point spread function is calculated for each of the image regions. Subsequently, the transformed point spread functions can be used to calculate the spatially varying point spread function. In certain embodiments, the region point spread function for each "bad" image region(s) 1428 (mainly defocus blur) is not utilized in the calculation of the transformed point spread function. If the image region was labeled "good", then its region point spread function can be used as its transformed point spread function. Alternatively, if the image region was labeled "bad" or "ok", then, (i) the globally dominant point spread function, (ii) any neighboring "good" region point spread function(s), and (iii) any neighboring "ok" region point spread function(s) can be used to interpolate its transformed point spread function. It should be noted that the "ok" region point spread function(s) will have a reduced reliability score (lower weight) in the calculation. In this embodiment, for each "ok" or "bad" image region, the transformed point spread function can be an interpolation of (i) the globally dominant point spread function, (ii) any neighboring "good" region point spread function(s), and (iii) any neighboring "ok" region point spread function(s) using a reduced reliability score.

In an alternative embodiment, only the globally dominant point spread function, and the "good" region point spread function(s) are used in the calculation of the transformed point spread function. In this embodiment, for each "bad" or "ok" image region, the transformed point spread function can be an interpolation of the globally dominant point spread function, and any neighboring "good" region point spread function(s).

After the spatially varying point spread function is estimated, it can subsequently be used at step 1522 to deblur the captured image 1416 to estimate calculate the deblurred image 1417 (illustrated in FIG. 14).

It should be noted that one or more of the steps illustrated in FIG. 15 and described above may be optional or performed in a different order. For example, a separate region point spread function can be calculated for all of the desired image region(s) prior to evaluating and classifying the shape of each respective region point spread function(s).

Further, the globally dominant point spread function and/or the spatially variant point spread function can be used for various post processing algorithms such as image restoration, optical artifact correction, resolution enhancement, depth map generation etc.

Figure 16:
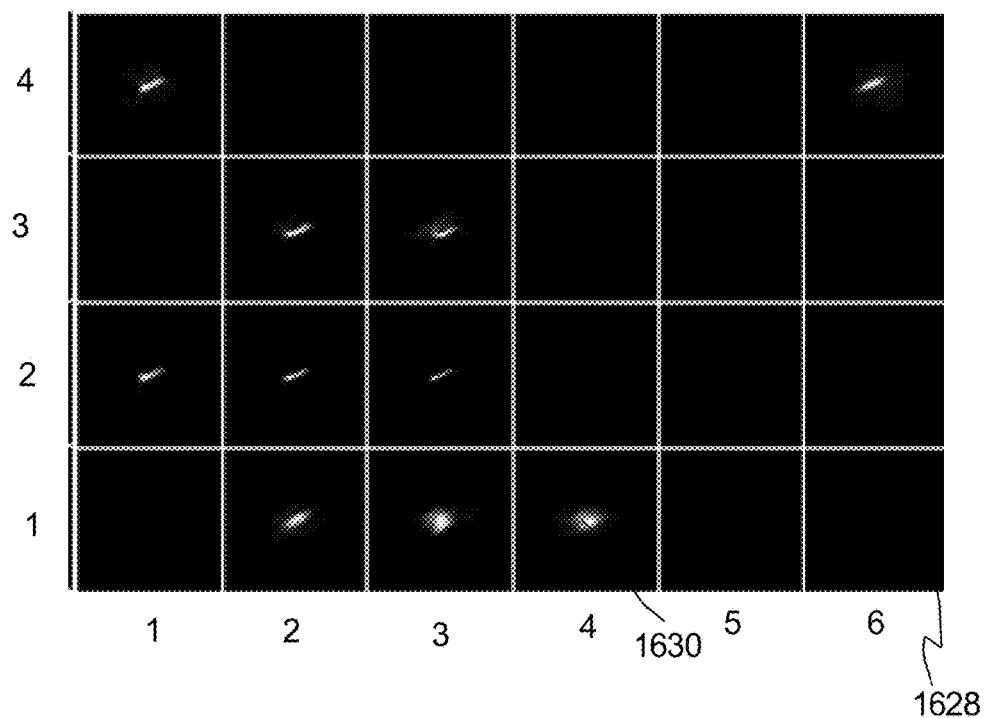
FIG. 16 is simplified illustration of a region point spread function estimated for a plurality of image regions of the captured image of FIG. 14.

FIG. 16 illustrates that a separate region point spread function 1630 has been calculated for ten of the twenty-four image regions 1628. It should be noted that shape of each separate region point spread function 1630 can be slightly or drastically different from the other separate region point spread functions 1630.

In the example of FIG. 16, a separate region point spread function was not calculated for fourteen of the image regions 1628. For example, the fourteen image regions 16628 may have lacked sufficient texture or gradients. In certain embodiments, to save computational resources, the present invention does not calculate a region point spread function for image regions 1628 that lack sufficient texture or gradients.

It should be noted that in FIG. 16, each estimated region point spread function 1630 is in gray scale, with (i) pixels having a value of zero being illustrated in black, and (ii) pixels having a value of between zero and one being represented in different shapes of gray. In certain embodiments, for mathematical purposes, all the PSFs can be normalized, i.e. sum of all pixel values is one. The rows and columns of image regions 1628 in FIG. 16 have been labeled for ease of discussion. In this example, the pixels having a value of zero (in black) can collectively be referred to as PSF background, and the pixels having a non-zero value (in gray) can collectively be referred to the blur trail or PSF shape.

In FIG. 16, for ease of subsequent discussion, (i) the region point spread function at row one, column three can be referred to as a first region point spread function, (ii) the region point spread function at row two, column three can be referred to as a second region point spread function, and (iii) the region point spread function at row three, column three can be referred to as a third region point spread function.

Figure 17:
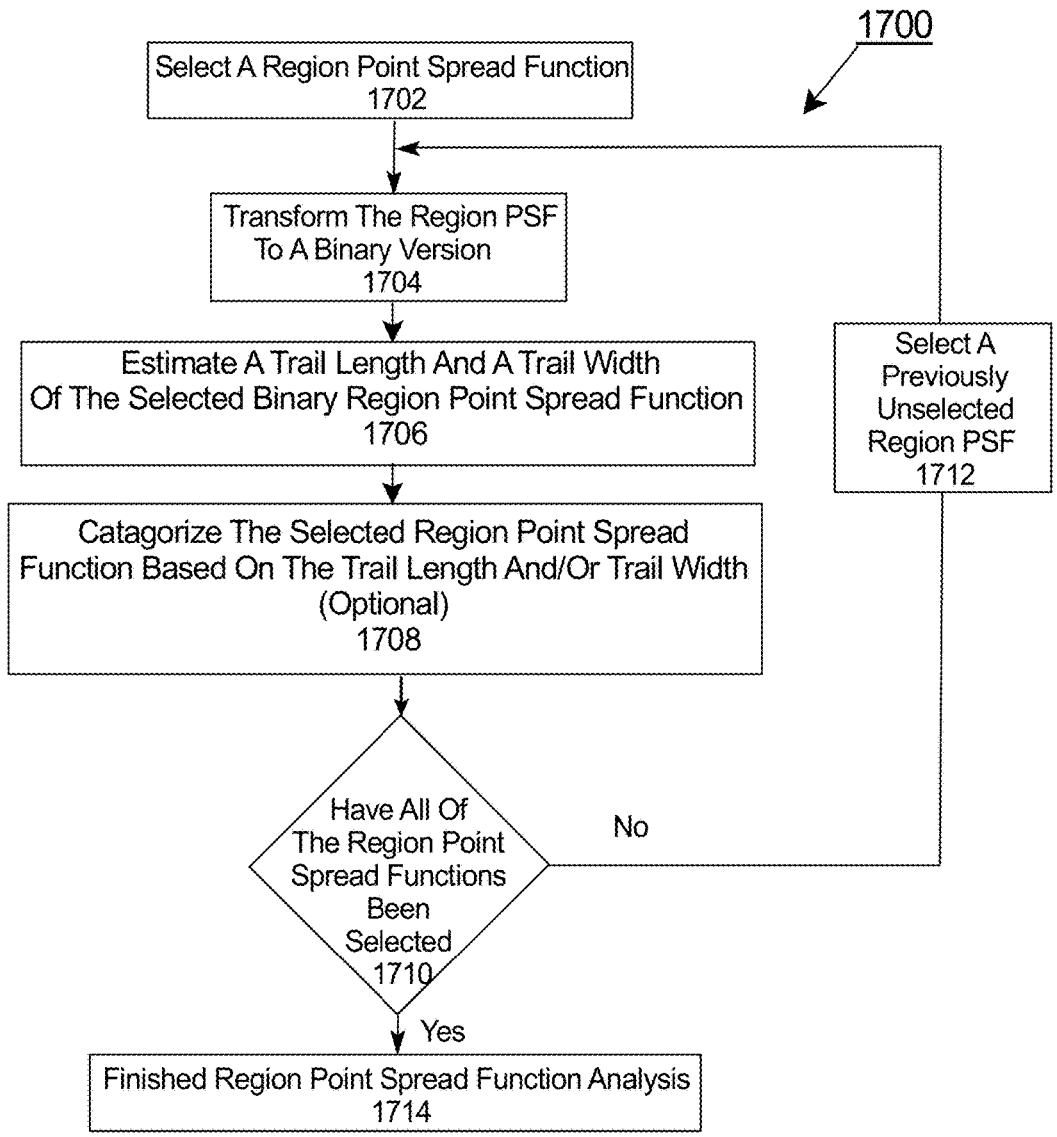
FIG. 17 is simplified flow chart that illustrates one embodiment of a method for categorizing the region point spread functions of FIG. 3.

FIG. 17 is a simplified flow chart of one, non-exclusive method 1700 for evaluating the shape of the region point spread function(s) 1630 (illustrated in FIG. 16), and optionally classifying the region point spread function(s) 1630. For example, the shape of each blur trail can be evaluated using the method provided herein. Each of the steps in FIG. 17 can be performed by one of the control systems 1418, 1420 of FIG. 14.

In FIG. 17, at step 1702, one of the region point spread function(s) 1630 is selected for processing. Subsequently, at step 1704, the selected region point spread function 1630 is converted to a binary format to create a binary point spread function. For example, the selected region point spread function 1630 can be thresholded for the binary conversion. More specifically, the pixels of the region point spread function 1630 having a value of less than a predetermined threshold can be set to zero, while the pixels of the region point spread function 1630 having a value of greater than or equal to the predetermined threshold can be set to one. As alternative, non-exclusive examples, the predetermined threshold can be approximately twenty-five percent (25%) of the maximum value in the region point spread function, twenty percent (20%) of the maximum value in the region point spread function, fifteen percent (15%) of the maximum value in the region point spread function, or ten percent (10%) of the maximum value in region point spread function.

Figure 18A:
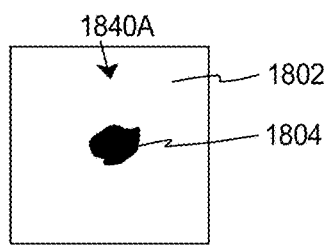
FIGS. 18A, 18B, 18C, 18D illustrate different binary versions of regions point spread functions.
Figure 18B:
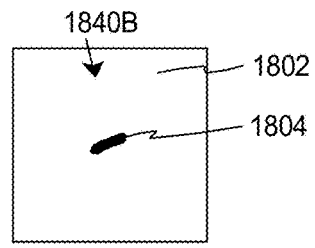
Figure 18C:
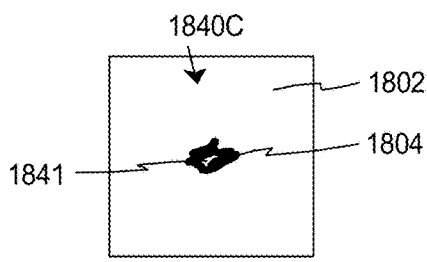

FIGS. 18A, 18B, and 18C illustrate three alternative, binary region point spread functions 1840A, 1840B, 1840C. Namely, (i) FIG. 18A illustrates a first binary region point spread function 1840A that corresponds to the first region point spread function in row one, column three of FIG. 16; (ii) FIG. 18B illustrates a second binary region point spread function 1840B that corresponds to the second region point spread function in row two, column three of FIG. 16; and (iii) FIG. 18C illustrates a third binary region point spread function 1840C that corresponds to the third region point spread function in row three, column three of FIG. 16.

Figure 18D:
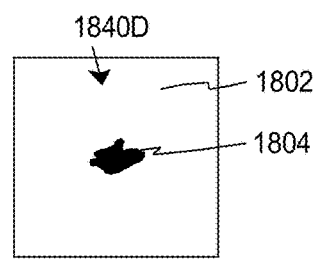

Sometimes, the binary region point spread function can include one or more hole(s) or gap(s). For example, the third binary region point spread function 1840C illustrated in FIG. 18C includes a hole 1841. In certain embodiments, the one or more hole(s) 1841 in the binary region point spread function 1840C can adversely influence subsequent processing. Thus, optionally, in certain embodiments, the hole(s) 1841 of the binary region point spread function 1840C can be filled in to generate an adjusted region point spread function. More specifically, FIG. 18D illustrates an adjusted, third region point spread function 1840D that results from filling the hole(s) 1841 of the binary region point spread function 1840C of FIG. 18C.

It should be noted that in the examples of FIGS. 18A, 18B, 18C, and 18D, (i) pixels having a value of zero are illustrated in white, and (ii) pixels having a value of one are illustrated in black. In this embodiment, each binary region point spread function 1840A, 1840B, 1840C, 1840D includes a binary background 1802 and a binary blur trail 1804. In this embodiment, the binary background 1802 is represented in white with pixels having a value of zero, and the binary blur trail 1804 is represented in black with pixels having a value of one. Stated in another fashion, in this example, the pixels having a value of zero (in white) can collectively be referred to as the binary background 1802, and the pixels having a value of one (in black) can collectively be referred to the binary blur trail 1804 ("or binary PSF shape"). With this design, the binary blur trail 1804 represents the pixels in the region point spread function which have a value which is greater than the predetermined threshold. Thus, the binary blur trail 1804 represents the pixels in the region point spread function which have the largest values.

It should be noted that alternatively, the binary background 1802 can be represented in black, and the binary blur trail 1804 can be represented in white.

Additionally, it should be noted that (i) the first binary region point spread function 1840A has a first binary blur trail area that corresponds to the total number of pixels in the binary blur trail 1804 of the first binary region point spread function 1840A; (ii) the second binary region point spread function 1840B has a second binary blur trail area that corresponds to the total number of pixels in the binary blur trail 1804 of the second binary region point spread function 1840B; and (iii) the adjusted, third binary region point spread function 1840D has a third binary blur trail area that corresponds to the total number of pixels in the binary blur trail 1804 of the adjusted third binary region point spread function 1840D.

Further, (i) the binary blur trail 1804 of the first binary region point spread function 1840A has a first perimeter that corresponds to the number of pixels in the path that surrounds the shape of the binary blur trail 1804 of the first binary region point spread function 1840A; (ii) the binary blur trail 1804 of the second binary region point spread function 1840B has a second perimeter that corresponds to the number of pixels in the path that surrounds the shape of the binary blur trail 1804 of the second binary region point spread function 1840B; and (iii) the binary blur trail 1804 of the adjusted, third binary region point spread function 1840D has a third perimeter that corresponds to the number of pixels in the path that surrounds the shape of the binary blur trail 1804 of the adjusted third binary region point spread function 1840D.

Referring back to FIG. 17, at step 1706, the shape characteristics (e.g. a trail length and trail width) of the binary blur trail 1804 of the selected binary region point spread function 1840A, 1840B, 1840C is estimated. As non-exclusive examples, the trail characteristics can be a trail length and/or trail width of the respective binary blur trail 1804. In one embodiment, the "trail length" is equal to a length (number of pixels) of the path (along a long dimension of the binary blur trail 1804) connecting a beginning to an ending in the binary blur trail 1804. Further, in one embodiment, the "trail width" is equal to an average width (number of pixels perpendicular to the trail path) in the binary blur trail 1804. Alternatively, the trail characteristic can be another feature of the binary blur trail 1804, such as the area, perimeter, and/or shape.

The term trail width is also sometimes referred to herein as trail thickness. A plurality of alternative methods are provided herein for estimating the respective trail length and trail thickness. The methods can be used independently or redundantly to improve accuracy.

In one embodiment, a skeleton or morphological operation is performed on the selected binary region point spread function 1840A, 1840B, 1840C. During a skeleton operation, a thin version of the shape of the binary region point spread function 1840A, 1840B, 1840C is created that is substantially equidistant to its boundaries. The skeleton operation can emphasize geometrical and topological properties of the shape, including the length and width. Basically, the morphological skeleton operation removes pixels on the boundaries of objects but keep the objects connected (not break apart). After removing boundaries, the remaining pixels are the object skeleton.

Figure 19A:
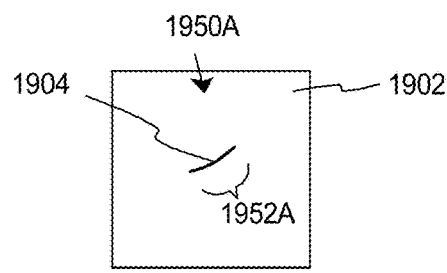
FIGS. 19A, 19B, 19C, 19D illustrate different skeletonized regions point spread functions.
Figure 19B:
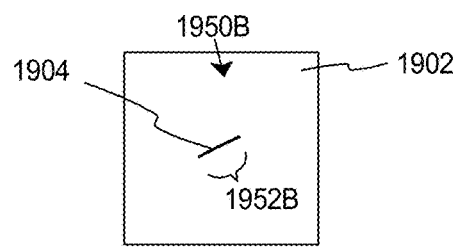
Figure 19C:
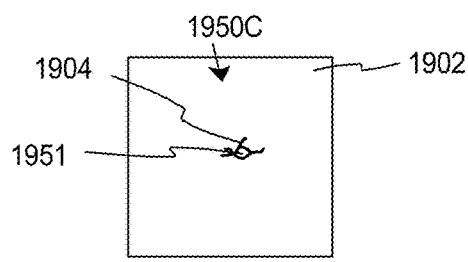
Figure 19D:
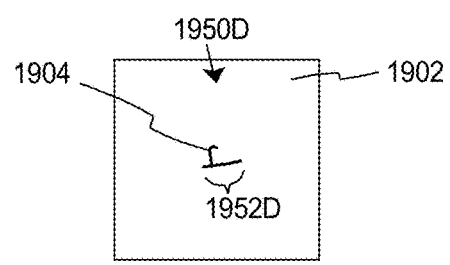

FIGS. 19A, 19B, 19C, and 19D illustrate four alternative, skeletonized region point spread functions 1950A, 1950B, 1950C, 1950D. Namely, (i) FIG. 19A illustrates a first skeletonized region point spread function 1950A that is generated from a morphological skeleton operation performed on the first binary region point spread function 1840A of FIG. 18A; (ii) FIG. 19B illustrates a second skeletonized region point spread function 1950B that is generated from a morphological skeleton operation performed on the second binary region point spread function 1840B of FIG. 18B; (iii) FIG. 19C illustrates a third skeletonized region point spread function 1950C that is generated from a morphological skeleton operation performed on the third binary region point spread function 1840C of FIG. 18C; and (iv) FIG. 19D illustrates an adjusted third skeletonized region point spread function 1950D that is generated from a morphological skeleton operation performed on the adjusted third binary region point spread function 1840D of FIG. 18D. It should be noted that the third skeletonized region point spread function 1950C of FIG. 19C includes a hole 1951 because of the hole 1841 in the third binary region point spread function 1840C.

In the examples of FIGS. 19A, 19B, 19C, and 19D, (i) pixels having a value of zero are illustrated in white, and (ii) pixels having a value of one are illustrated in black. In this embodiment, each skeleton region point spread function 1950A, 1950B, 1950C, 1950D includes a skeleton background 1902 and a skeleton blur trail 1904. In this embodiment, the skeleton background 1902 is represented in white with pixels having a value of zero, and the skeleton blur trail 1904 is represented in black with pixels having a value of one. Stated in another fashion, in this example, the pixels having a value of zero (in white) can collectively be referred to as the skeleton background 1902, and the pixels having a value of one (in black) can collectively be referred to the skeleton blur trail 1904 ("or skeleton PSF shape"). With this design, the pixels of the skeleton blur trail 1904 represent the skeleton PSF shape after the skeleton operation performed on the respective binary point spread function 1840A, 1840B, 1840C, 1840D.

FIG. 19A also illustrates that the first skeletonized region point spread function 1950A has a first trail length 1952A that is equal to the number of pixels in the first skeletonized region point spread function 1950A, FIG. 19B also illustrates that the second skeletonized region point spread function 1950B has a second trail length 1952B that is equal to the number of pixels in the second skeletonized region point spread function 1950B, and FIG. 19D illustrates that the adjusted third skeletonized region point spread function 1950D has a third trail length 1952D that is equal to the number of pixels in the adjusted third skeletonized region point spread function 1950D. Because, the third skeletonized region point spread function 1950C of FIG. 19C includes a hole 1951, the trail length is not illustrated because it may be inaccurate.

In this example, the "trail length" is set to be equal to a length (number of pixels) of the path (along a long dimension of the skeletonized blur trail 1904) connecting a beginning to an ending in the skeletonized blur trail 1904.

In this embodiment, for each region point spread function, the trail width can be determined by dividing the area of the binary blur trail 1804 by its respective trail length. More specifically, in this example, (i) a first trail width of the binary blur trail 1804 of the first binary region point spread function 1840A is equal to the first binary blur trail area divided by the first trail length 1952A; (ii) a second trail width of the binary blur trail 1804 of the second binary region point spread function 1840B is equal to the second binary blur trail area divided by the second trail length 1952B; and (iii) a third trail width of the binary blur trail 1804 of the third binary region point spread function 1840C is equal to the third binary blur trail area divided by the third trail length 1952D.

Alternatively, the trail length and trail width for each region point spread function 1630 can be determined in other ways. As another, non-exclusive example, in another embodiment, referring to FIGS. 20A, 20B, and 20C, an ellipse can be drawn that fully and closely encircles the binary blur trail 1804 of the respective binary region point spread function 1840A, 1840B, 1840C. As is known, ellipses have two mutually perpendicular axes about which the ellipse is symmetric, and these axes intersect at the center of the ellipse. The larger of the axes is the major axis, and the shorter of the axes is the minor axis. In this embodiment, the trail length approximated to be equal to the length of the major axis, and the trail width is approximated to be equal to the length of the minor axis.

Figures 20A, 20B, 20C:
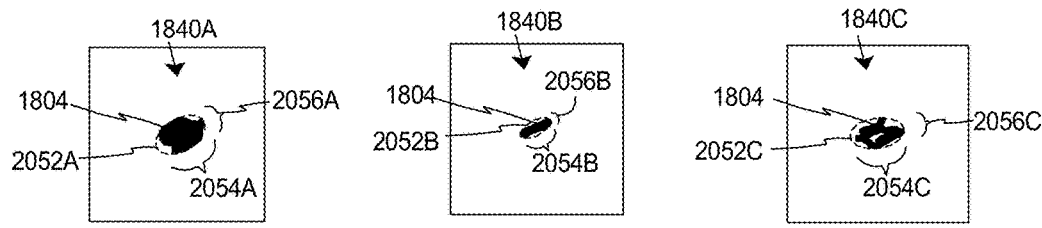

In this embodiment, (i) FIG. 20A illustrates a first ellipse 2052A (illustrated with a dashed line) that encircles the binary blur trail 1804 of the first binary region point spread function 1840A; (ii) FIG. 20B illustrates a second ellipse 2052B (illustrated with a dashed line) that encircles the binary blur trail 1804 of the second binary region point spread function 1840B; and (iii) FIG. 20C illustrates a third ellipse 2052C (illustrated with a dashed line) that encircles the binary blur trail 1804 of the third binary region point spread function 1840C. In this example, the trail length 2054A that is equal to the major axis length of the first ellipse 2052A and the trail width 2056A is equal to the minor axis length of the first ellipse 2052A. Similarly, FIG. 20B also illustrates the trail length 2054B that is equal to the major axis length of the second ellipse 2052B and the trail width 2056B that is equal to the minor axis length of the second ellipse 2052B. Further, FIG. 20C also illustrates the trail length 2054C that is equal to the major axis length of the third ellipse 2052C and the trail width 2056C that is equal to the minor axis length of the third ellipse 2052C.

In an alternative version of this embodiment, the trail width can be set to be equal to the area of the respective binary blur trail divided by the trail length.

Still alternatively, the trail length and trail width for each region point spread function can be determined in other ways. For example, the size of the perimeter for each of the respective region point spread functions is estimated as provided above. As is known, a perimeter ("P") of a rectangle is equal to two times the length ("L") plus the width ("W") (P=2*(L+W)). Thus, if the selected region point spread function is assumed to have a rectangular shape, then an upper bound of its trail length (assuming a width of zero) is its perimeter divided by two (L=P/2). Thus, in this example, the trail length is set to be equal to the perimeter of the selected region point spread function divided by two. Subsequently, the lower boundary of the trail width can be the area of the selected region point spread function divided by the trail length. With this design, for each region point spread function, the trail width can be estimated using its perimeter and area.

Table 1 below is chart that illustrates one non-exclusive example of the trail widths that calculated for some of the region point spread functions of FIG. 16 using one of the methods described herein. In Table 1, any zero represents that the trail width was not calculated for that image region.

TABLE 1

| | Column 1 | Column 2 | Column 3 | Column 4 | Column 5 | Column 6 |
|---|---|---|---|---|---|---|
| Row 4 | 5.78 | 0 | 0 | 0 | 0 | 6.33 |
| Row 3 | 0 | 5.22 | 6.15 | 0 | 0 | 0 |
| Row 2 | 5.14 | 3.94 | 2.82 | 0 | 0 | 0 |
| Row 1 | 0 | 7.85 | 10.31 | 9.89 | 0 | 0 |

Next, referring back to FIG. 17, optionally, at step 1708, the selected region point spread function is categorized based on one or more trail characteristics, e.g. the trail length and/or the trail width. For example, the selected region point spread function can be evaluated to determine if the selected image region has (i) motion blur, (ii) defocus blur, and/or (iii) a mixture of motion blur and defocus blur. The point spread function of a motion blurred image is generally sparse, while the point spread function of a defocus blurred image is generally circular. Thus, as provided herein, (i) if the trail width is relatively large, then the point spread function is classified as defocus blur; (ii) if the trail width is somewhat big, then the point spread function is classified as a mixed motion/defocus blur; and (iii) if the trail width is relatively small, then the point spread function is classified as motion blur.

In one embodiment, (i) if the trail width is larger (greater) than a first width threshold, then the point spread function is classified as defocus blur; (ii) if the trail width is smaller (less) than the first width threshold, but greater than a second width threshold, then the point spread function is classified as mixed motion/defocus blur; and (iii) if the trail width is smaller (less) than the second width threshold, then the point spread function is classified as motion blur. In this embodiment, second width threshold is less than the first width threshold.

It should be noted that the values of the width thresholds can be varied to suit the classification requirements. For example, the width thresholds can be higher if it is desired to reduce the possibility of using point spread functions with significant defocus blur. In alternative, non-exclusive embodiments, the first width threshold can be approximately 8, 7, or 6, and the second width threshold can be approximately 5.8, 5.5, or 5.

In one non-exclusive embodiment, the first width threshold can be set to be six (6), and the second width threshold can be set to be five (5). With reference to Table 1, in this embodiment, image regions at (i) row 1, column 2 (trail width=7.85); (ii) row 1, column 3 (trail width=10.31); (iii) row 3, column 3 (trail width=6.15); (iv) row 1, column 4 (trail width=9.89); and (v) row 4, column 6 (6.33) have trail widths greater than six and thus are classified as defocus blur or "bad". Further, image regions at (i) at row 2, column 1 (trail width=5.14); row 4, column 1 (trail width=5.78); and row 3, column 2 (trail width=6.15) have trail widths between five and six, and thus are classified as mixed motion/defocus or "ok". Moreover, image regions at (i) at row 2, column 2 (trail width=3.94); and row 2, column 3 (trail width=2.82) have trail widths less than five, and thus are classified as motion blur or "good".

Thus, the present invention is able to identify and properly weigh candidate region point spread functions that are used to generate the globally dominant or spatially variant point spread function.

After classification, at block 1710, the region point spread functions 1630 are evaluated to determine if all of the desired region point spread functions 1630 have been evaluated to estimate the shape characteristics and categorization.

If not, at block 1712, a previously unselected region point spread function is selected and blocks 1704-1710 are repeated until all of the region point spread functions are evaluated.

If the answer at block 1710 is yes (all the desired region point spread functions have been selected), then, at step 1714, the shape analysis is finished.

It should be noted that one or more steps of in FIG. 17 and described above may be optional or performed in a different order. For example, the shape characteristics can be determined without the binary step provided above. Further, the shape characteristics can be calculated for all for the desired image region(s) prior to classifying the shape of each respective region point spread function(s).

Figure 21:
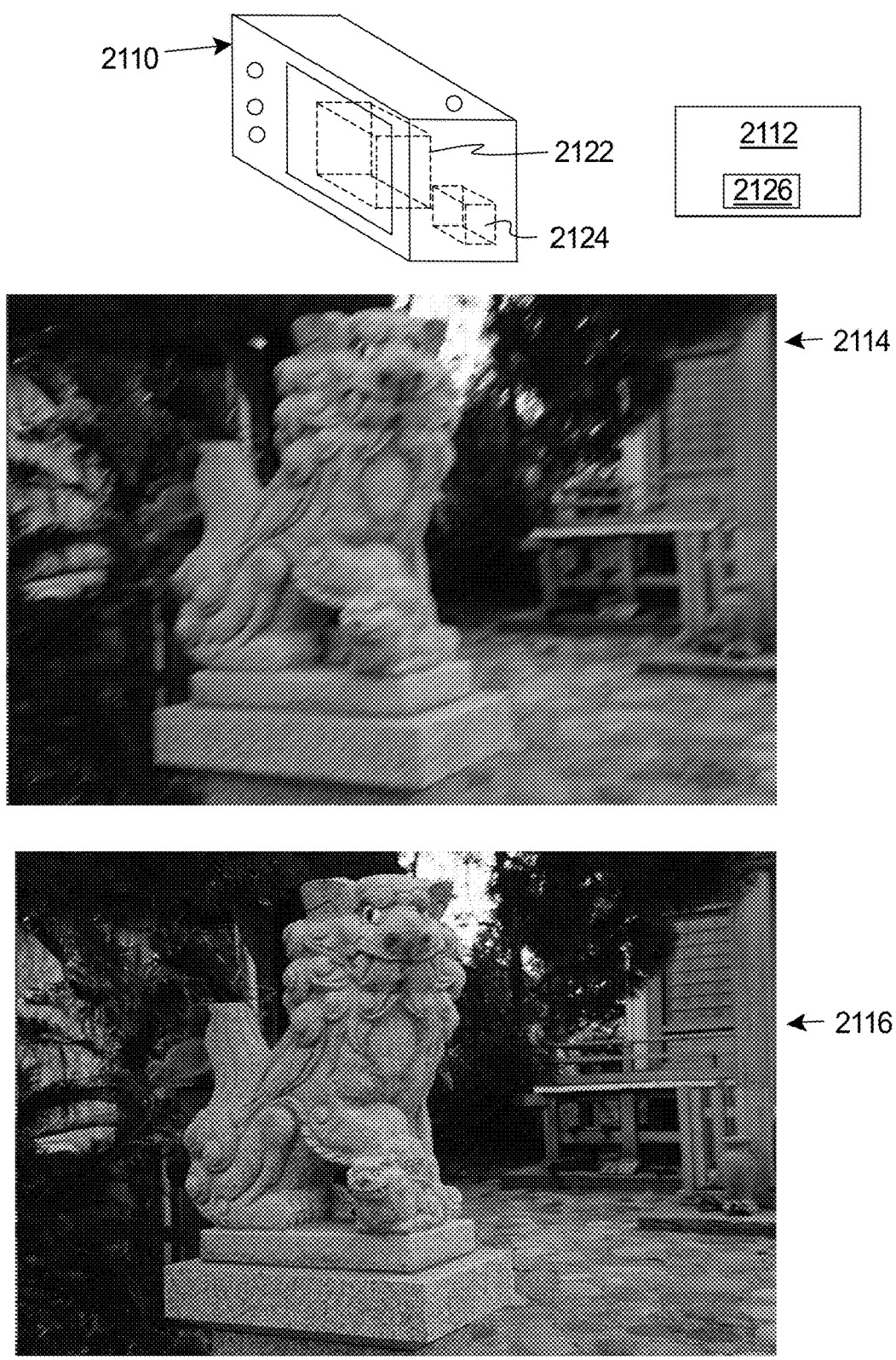
FIG. 21 is a simplified illustration of an image apparatus, a computer having features of the present invention, a captured blurry image, and a deblurred image.

FIG. 21 is a simplified illustration of an image apparatus 10 (e.g. a digital camera), a computer 2112 (illustrated as a box), a blurred, captured image 2114, and a deblurred image 2116. The present invention is also directed to one or more unique algorithms that can be used to estimate an area point spread function ("area PSF") for an image area (e.g. the image 2114 or a portion thereof) with improved accuracy. If the area PSF is more accurate, the resulting deblurred image 2116 will be improved. Moreover, the method provided herein can be solved relatively easily. This will speed up the deblurring process and will allow for image deblurring with less powerful processors (e.g. in camera processing).

As provided herein, the image apparatus 2110 can include a capturing system 2122 (e.g. a semiconductor device that records light electronically) that captures the image 2114, and a control system 2124 that uses one or more of the algorithms provided herein for estimating the area PSF for in camera processing. Alternatively, the computer 2112 can include a control system 2126 that uses one or more of the algorithms provided herein for estimating the area PSF. In either event, the control system 2124, 2126 can provide the area PSF and/or the deblurred latent sharp image 2116 from the blurred image 2114. Each control system 2124, 2126 can include one or more processors (e.g. a CPU) and circuits. Further, either of the control systems 2124, 2126 can include software that utilizes one or more methods and formulas provided herein. Additionally, the image apparatus 2110 can include a digital data storage device (not shown) to store data.

As an overview, as provided herein, a plurality of patch images 2430 (illustrated in FIG. 24A) can be generated from a downsampled version of the blurred image 2114. Subsequently, a separate seed point spread function ("seed PSF") 2432 (illustrated in FIG. 24D) can be estimated for each patch image 2430. Next, these seed PSFs 2432 can be used to start a refinement process that is used determine the area PSF of the blurred image 2114 or a portion thereof. Stated in another fashion, the problem of robustly estimating the area PSF of the image area is solved by using an artificially created image to estimate multiple seed PSFs 2432, and then performing PSF accuracy refinement within a multi resolution frame work.

Figure 22:
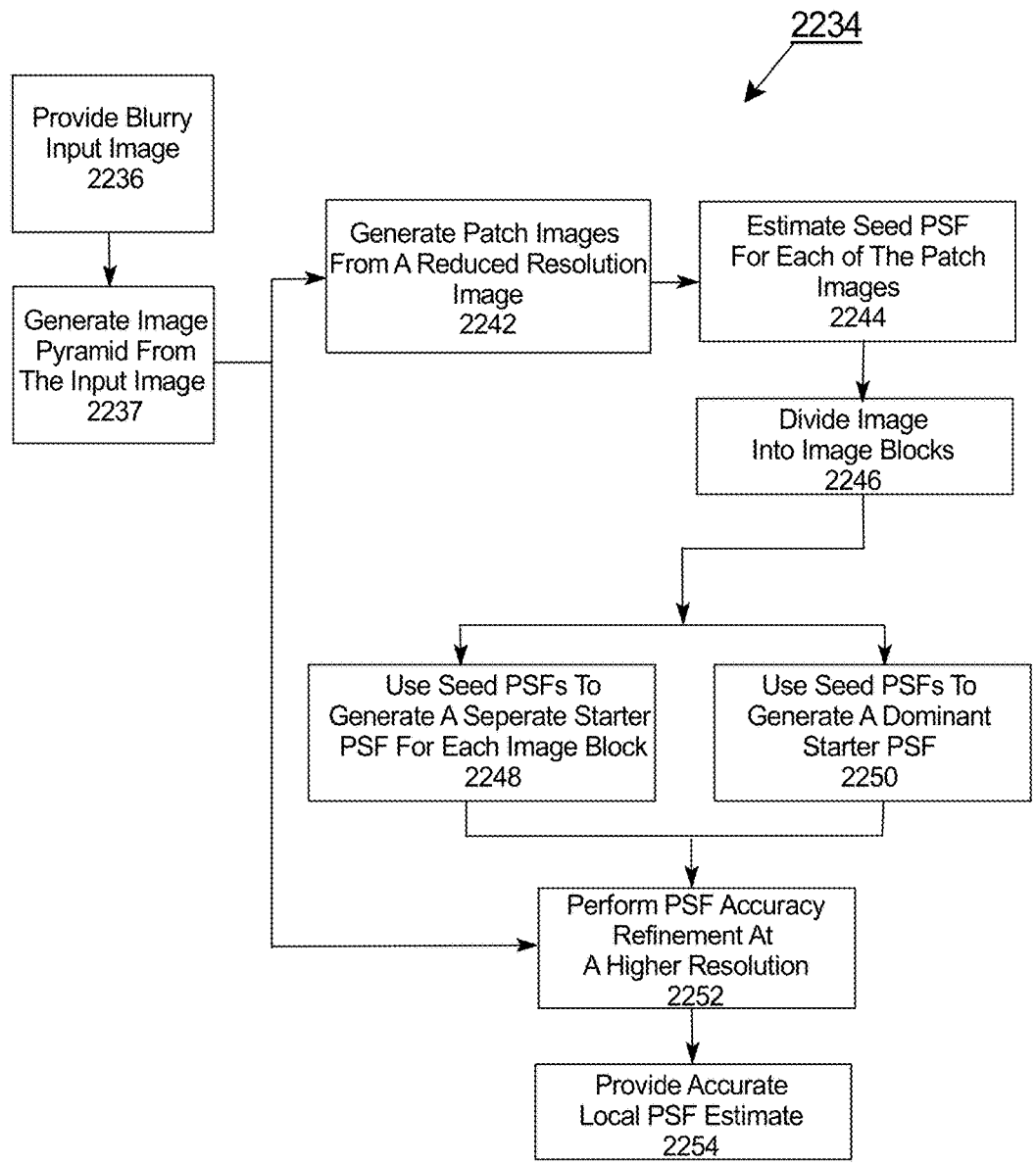
FIG. 22 is a flow chart that outlines one embodiment of a method for estimating a local point spread function having features of the present invention.

FIG. 22 is flow chart that outlines one non-exclusive method 2234 for estimating the area PSF of the blurred image 2114 (illustrated in FIG. 21). It should be noted that the steps in FIG. 22 and the other Figures are performed by one of the control systems 2124, 2126 of FIG. 21.

Starting at step 2236, the blurred image 2114 is received by the control system. Next, at step 2237, an image pyramid is generated from the input image 2114. This can be done by downsampling the input image 2114 at different resolutions to create the image pyramid.

Figure 23A:
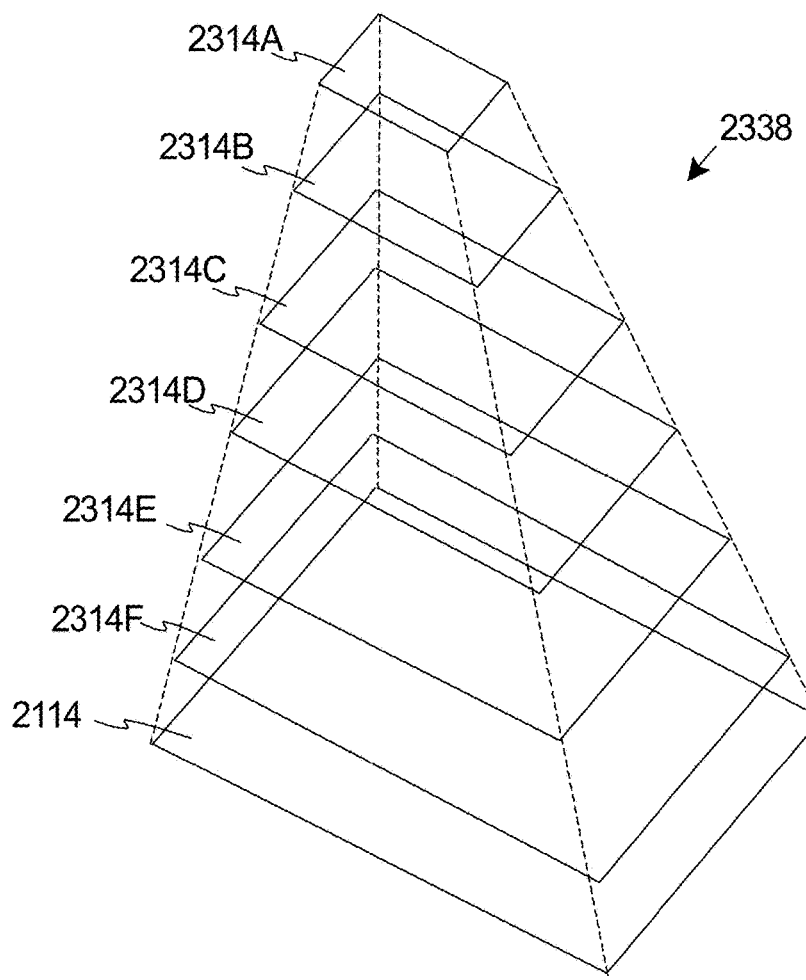
FIG. 23A is a simplified illustration of an image pyramid for the captured blurry image of FIG. 21.

FIG. 23A is a simplified illustration of one, non-exclusive example of an image pyramid 2338 that can be created from the blurred image 2114. In this example, the image pyramid 2338 includes the blurry image 2114 (illustrated as a box) and a plurality of sequentially lower resolution versions (illustrated as boxes) of the blurry image 2114 organized as a pyramid 2338. In this design, the resolution decreases in the image pyramid 2338 moving from the bottom to the top. Thus, the highest resolution is at the bottom while the lowest resolution is at the top.

The number of image resolutions in the image pyramid 2338 can be varied. In the non-exclusive embodiment illustrated in FIG. 23A, the image pyramid 2338 includes seven alternative resolutions. Alternatively, the image pyramid 2338 can include more than seven or fewer than seven alternative resolutions.

In FIG. 23A, the image pyramid includes (i) the original captured blurry image 2114 (can also be referred to as image N); (ii) a lowest resolution image 2314A (can also be referred to as image k); (iii) a second lowest resolution image 2314B (can also be referred to as image k+1); (iv) a third lowest resolution image 2314C (can also be referred to as image k+2); (v) a fourth lowest resolution image 2314D (can also be referred to as image k+3); (vi) a fifth lowest resolution image 2314E (can also be referred to as image k+4); and (vii) a sixth lowest resolution image 2314F (can also be referred to as image k+5).

In this embodiment, (i) the captured blurred image 2114 is at the bottom of the pyramid 2338; (ii) the captured blurred image 2114 is downsampled to create a first downsampled image 2314F that is positioned above the blurred image 2114 in the pyramid 2338; (iii) the first downsampled image 2314F is downsampled to create a second downsampled image 2314E that is positioned above the first downsampled image 2314F in the pyramid 2338; (iv) the second downsampled image 2314E is downsampled to create a third downsampled image 2314D that is positioned above the second downsampled image 2314E in the pyramid 2338; (v) the third downsampled image 2314D is downsampled to create a fourth downsampled image 2314C that is positioned above the third downsampled image 2314D in the pyramid 2338; (vi) the fourth downsampled image 2314C is downsampled to create a fifth downsampled image 2314B that is positioned above the fourth downsampled image 2314C in the pyramid 2338; and (vii) the fifth downsampled image 2314B is downsampled to create a sixth downsampled image 2314A that is positioned above the fifth downsampled image 2314B at the top of the pyramid 2338.

The amount of downsampling between each successive image in the image pyramid 2338 can vary. As non-exclusive examples, the amount of downsampling between each successive image can be approximately $1/16$, $1/12$, $1/8$, $1/6$, $1/4$, $1/3$, or $1/2$.

Figure 23B:
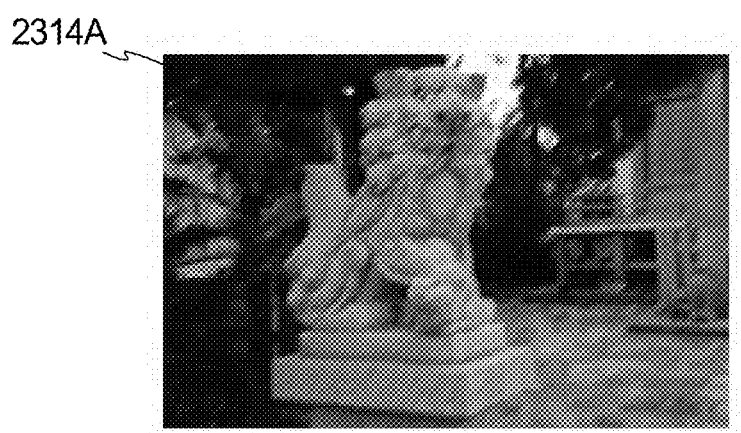
FIG. 23B is a downsampled version for the captured blurry image of FIG. 21.

FIG. 23B is illustrates the lowest resolution image 2314A from the image pyramid 2338 of FIG. 23A.

Referring back to FIG. 22, at step 2242, at a specific low resolution image, a few patch images are generated. The selected resolution image can vary. In one non-exclusive embodiment, the patch images can be taken from the lowest resolution image of the image pyramid 2338 (illustrated in FIG. 23A), e.g the sixth downsampled image 2314A illustrated in FIGS. 23A and 23B. Alternatively, the patch images can be taken from another one of the low resolution images (e.g. fifth downsampled image 2314B) in the image pyramid 2338.

Figure 24A:
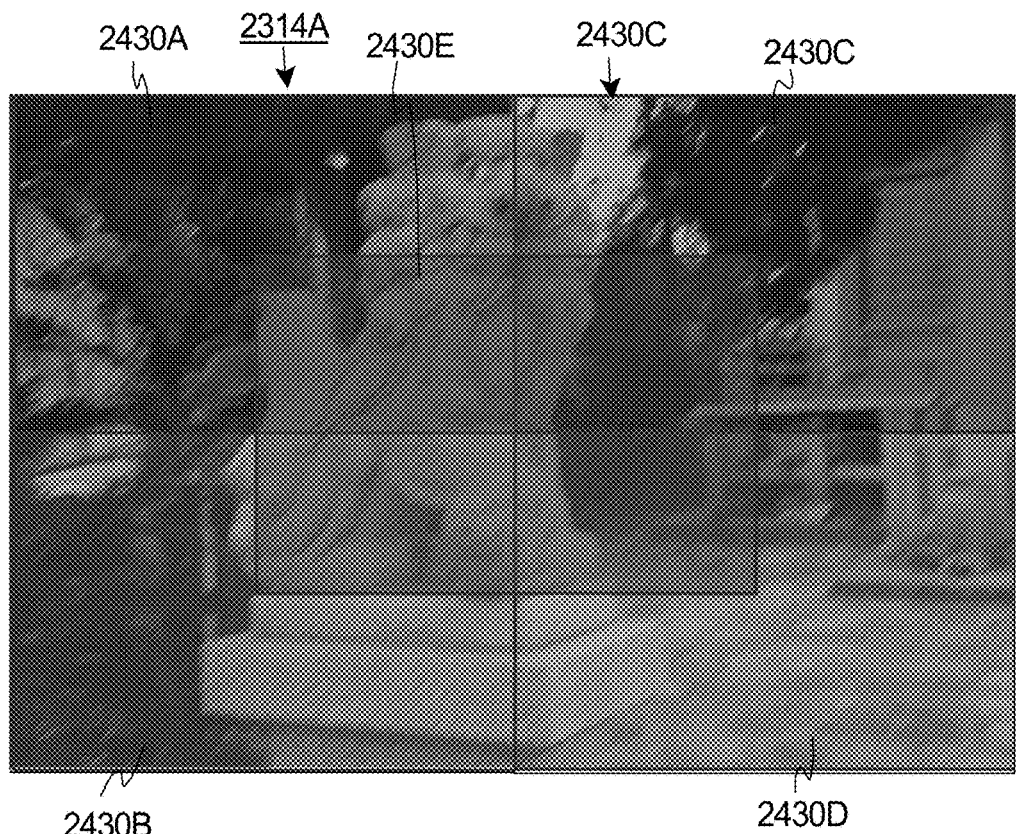
FIG. 24A is a simplified illustration of a downsampled image divided into a plurality of image patches.

The number, shape, size, and location of the patch images in the low resolution image 2314A can vary. For example, FIG. 24A illustrates that five patch images 2430 can be taken from the low resolution image 2314A. In this embodiment, the patch images 2430 can be labeled (i) a first patch image 2430A located in the upper left corner of the image 2314A; (ii) a second patch image 2430B located in the lower left corner of the image 2314A; (iii) a third patch image 2430C located in the upper right corner of the image 2314A; (iv) a fourth patch image 2430D located in the lower right corner of the image 2314A; and (v) a fifth patch image 2430E located in the center of the image 2314A. In this embodiment, (i) each of the patch images 2430A-2430E is generally rectangular shaped, and (ii) the fifth patch image 2430E partly overlaps the other patch images 2430A-2430D. Alternatively, the shape, number, and/or size of the patch images 2430A-2430E can be different than that illustrated in FIG. 24A. For example, the present invention can utilize more than five or fewer than five patch images 2430A-2430E.

In FIG. 24A, each patch image 2430A-2430E is approximately one quarter of the downsampled image 2314A. Alternatively, as non-exclusive examples, one or more of the patch images 2430A-2430E can be approximately one half, one third, one fifth, one sixth, one seventh, one eighth, one ninth or one tenth of the image 2314A. In the FIG. 24A, one quarter is the general guidance for a five patch example. This can be varied by a certain amount, for example ⅓, which means these blocks will overlap each other. Generally, if the patch number is increased, the patch size can be decreased accordingly.

Figure 24B:
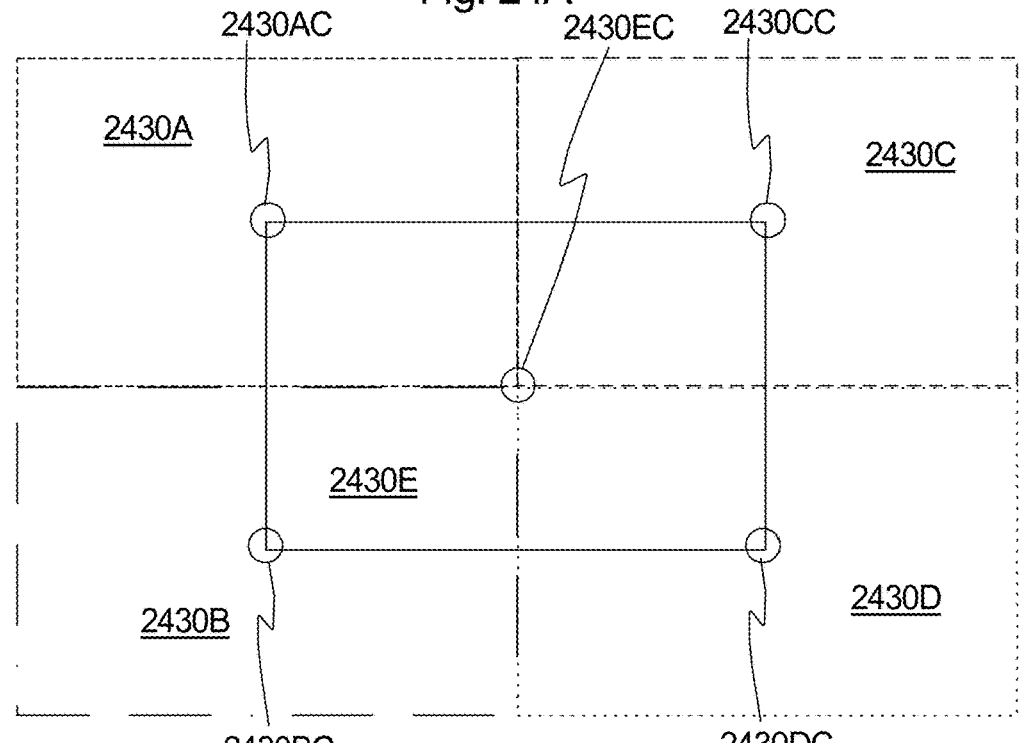
FIG. 24B is a simplified illustration of the outline of the image patches from FIG. 24A without the downsampled image.

FIG. 24B illustrates the outline of the five, equally sized, rectangular shaped patch images 2430A-2430E from FIG. 24A without the low resolution image. A center 2430AC of the first patch image 2430A, a center 2430BC of the second patch image 2430B, a center 2430CC of the third patch image 2430C, a center 2430DC of the fourth patch image 2430D, and a center 2430EC of the fifth patch image 2430E are each illustrated with a separate circle in FIG. 24B.

Figure 24C:
FIG. 24C is a simplified illustration of the image patches of FIG. 24A.

Further, FIG. 24C illustrates the five patch images 2430A-2430E from FIG. 24A in a slightly spaced apart arrangement for clarity.

Referring back to FIG. 22, at step 2244, a separate point spread function (hereinafter the "seed PSF") is estimated for each of the patch images 2430A-2430E (illustrated in FIGS. 24A-24C). Any standard point spread function estimation method can be used to estimate the seed PSFs. One common approach to solving a PSF estimation problem includes reformulating it as an optimization problem in which a PSF cost function and a latent sharp image cost function are minimized. These algorithms are iterative and usually they alternate, improving the current estimates of the PSF and the latent sharp image. The steps of improving the current estimates of the PSF and the current estimate of the latent sharp image are typically in the form of solving an optimization problem.

A relatively common type of a cost function is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness.

A non-exclusive example of such a suitable latent sharp image cost function has the following form:

$$c(L) = \|K*L - B\|_2^2 + p(\|D_x*L\|_2^2 + \|D_y*L\|_2^2).\quad \text{Equation (39)}$$

In Equation 39, the term $\|K*L - B\|_2^2$ is considered a fidelity term that makes the latent sharp image L conform to the model in Equation (1) with the noise as small as possible. Further, in Equation 39, the term $(\|D_x*L\|_2^2 + \|D_y*L\|_2^2)$ is considered a regularization term that helps to deal with the ill-conditioned nature of the problem and noise magnification. The regularization term can be also interpreted as a form of infusing prior information about the image. As $(\|D_x*L\|_2^2 + \|D_y*L\|_2^2)$ is made small, the gradient of latent sharp image L is forced to be sparse, with most elements being zero or close to zero, which is one of the common properties exhibited by natural images.

Additionally, in Equation 39 and elsewhere in this document, (i) c(L) is the cost function for the latent sharp image, (ii) L is the latent sharp image, (iii) K is a PSF kernel, (iv) B is a blurry image, (v) Dx and Dy are the first order partial derivative operators and parameters, and (vi) p is a weight parameter that helps to set proper balance between the fidelity and the regularization term so as to achieve the best compromise between the sharpness of recovered latent sharp image and the noise and other artifacts present in the reconstructed image.

Further, a non-exclusive example of a suitable PSF cost function has the following form:

$$c(K) = \|K*D_x*L - D_x*B\|_2^2 + \|K*D_y*L - D_y*B\|_2^2 + \theta\|K\|_2^2.\quad \text{Equation (40)}$$

In Equation 40, the term $\|K*D_x*L - D_x*B\|_2^2$ and $\|K*D_y*L - D_y*B\|_2^2$ are considered fidelity terms that make the latent sharp image L conform to the model in Equation (1) with the noise as small as possible. Further, in Equation 3, the term $\|K\|_2^2$ is considered a regularization term that helps to deal with ill-conditioned nature of the problem and noise magnification.

Moreover, in Equation 40, (i) c(K) is the cost function for the PSF kernel, and (ii) θ is a weight parameter that helps to set a proper balance between the fidelity and the regularization term so as to achieve the best compromise between the sharpness of recovered latent sharp image and the noise and other artifacts present in the reconstructed image. The regularization term can be also interpreted as a form of infusing prior information about the image to deal with ill-conditioned nature of the problem and noise magnification. Including $\|K\|_2^2$ in the cost function of c(K) that is minimized to find a new estimate of PSF kernel K forces most elements of K to be very small. It thus gives preference to sparse PSF kernels that have most elements equal to 0, which is desirable in the cases of blur such as motion blur when the non-zero elements in PSF form a curve corresponding to motion trajectory.

Figure 24D:
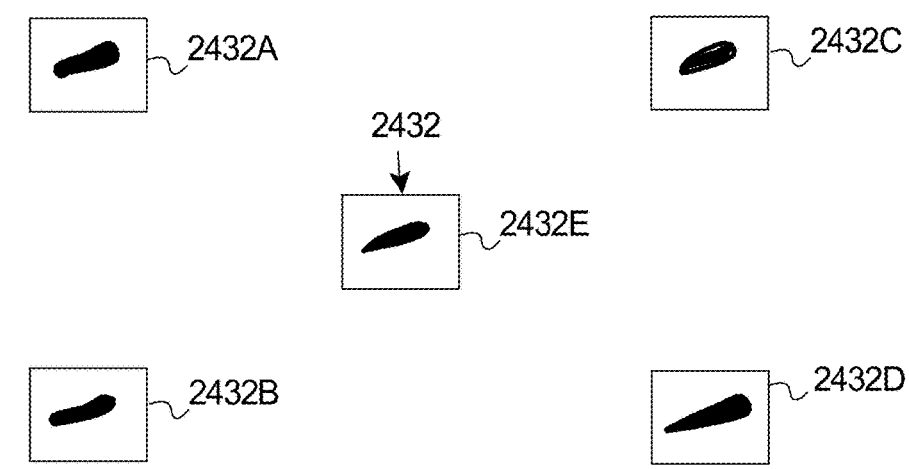
FIG. 24D is a simplified illustration of a separate seed PSF calculated for each of the image patches of FIG. 24C.

Referring to FIG. 24D, a separate seed PSF 2432 has been estimated for each of the patch images 2430A-2430E (illustrated in FIGS. 24A-24C). More specifically, (i) a first seed PSF 2432A has been estimated for the first patch image 2430A; (ii) a second seed PSF 4232B has been estimated for the second patch image 2430B; (iii) a third seed PSF 2432C has been estimated for the third patch image 2430C; (iv) a fourth seed PSF 2432D has been estimated for the fourth patch image 2430D; and (v) a fifth seed PSF 2432E has been estimated for the fifth patch image 2430E.

Referring back to FIG. 22, next, at step 2246, the image to be processed can optionally be divided into a plurality of image blocks 2560 for processing.

FIG. 25A illustrates the second lowest resolution image 2314B from the image pyramid 2338 of FIG. 23A. In this embodiment, the downsampled image 2314B has been divided into the plurality of image blocks 2560. The size, shape and number of the image blocks 2560 can be varied.

For example, in FIG. 25A, each image block 2560 is generally rectangular shaped and the downsampled image 2314B has been divided into a four (high) by six (wide) grid that includes twenty-four, equally sized, block shaped image blocks 2560. Beginning at the left lower corner, these image blocks 2560 have been labelled B1-B24 for ease of discussion. It should be noted that any of the image blocks 2560 can be referred to as a first image block, a second image block, a third image block, or etc.

Alternatively, the shape and/or number image blocks 2560 can be different than that illustrated in FIG. 25A. For example, the image 2314B can be divided into a five by five or a seven by seven grid. Further still, the downsampled image 2314B can be divided into a number of irregularly shaped image blocks 2560.

Each image block 2560 includes a block center 2560C (illustrated with a +) with is the center of the respective image block 2560. The block center 2560C of only image block B15 is shown in FIG. 25A.

Figure 25:
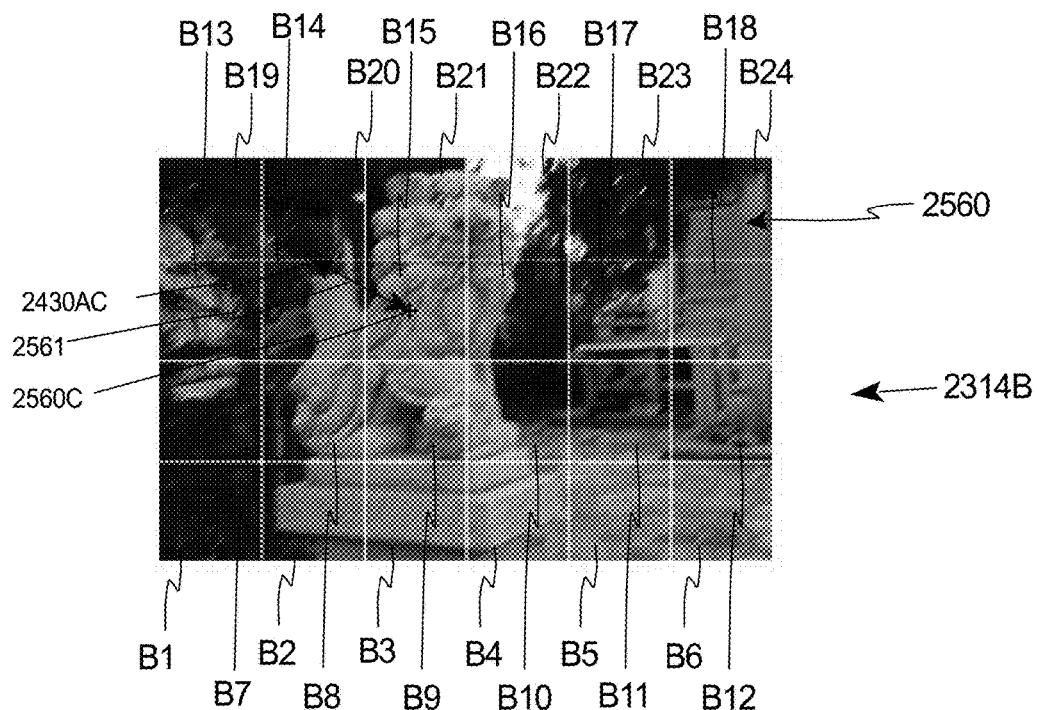
FIG. 25 is a simplified illustration of a downsampled image divided into a plurality of image blocks.

It should be noted comparing FIGS. 24A and 25, each image patch 2430 is larger than each image block 2560, and each image patch 2430 (of the five image patches 2430) includes approximately six image blocks 2560 (organized in a two by three array). Alternatively, each image patch 2430 can include more than six or fewer than six image blocks 2560. As provided herein, the number of image blocks 2560 per image patch 2430 will depend on the number of patches 2430 and the number of image blocks 2560.

Alternatively, for example, if the downsampled image 2314B has been divided into ninety-six image blocks 2560 (e.g. an eight by twelve array), each image patch 2430 can include twenty-four image blocks 2560 (e.g. a four by six array). Typically, increasing the number of image blocks 2560 will increase computational cost.

Referring back to FIG. 22, next, the information from one or more of the seed PSFs 2430A-2430E (illustrated in FIG. 24D) can be used to determine a starter point spread function ("starter PSF") that is used to start the refinement process on the subsequent resolution images in the image pyramid 2338. Two, non-exclusive methods are provided herein to estimate the starter PSF from the seed PSFs 2430A-2430E.

In one method, at step 2248, the multiple seed PSFs 2430A-2430E can be used to estimate a separate starter point spread function ("starter PSF") for each image block 2560 (illustrated in FIG. 25). In this embodiment, each image block 2560 will have a slightly different starter PSF based on the location of the image block 2560. For example, in one embodiment, the starter PSF can be estimated for each image block 2560 using a weighted sum method which uses all of the seed PSFs 2430A-2430E, but provides more weight to the seed PSFs 2430A-2430E which are closest to the image block 2560 of interest.

Figure 26A:
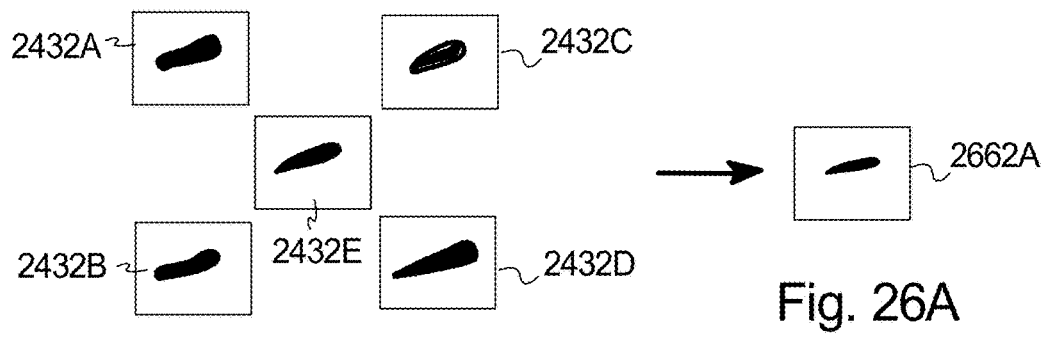
FIG. 26A is a simplified illustration of the seed PSFs and one embodiment of a starter PSF.

More specifically, FIG. 26A illustrates the five seed PSFs 2430A-2430E from FIG. 24D, and the resulting starter PSF 2662A that was determined for one of the image blocks 2560, e.g. image block B15 (illustrated in FIG. 25). In this example, the five seed PSFs 2430A-2430E are synthesized together to generate the starter PSF 2662A for image block B15. In one embodiment, the starter PSF is equal to the sum of (i) a first weight ("w1") times the first seed PSF 2432A, (ii) a second weight ("w2") times the second seed PSF 2432B, (iii) a third weight ("w3") times the third seed PSF 2432C, (iv) a fourth weight ("w4") times the fourth seed PSF 2432D, and (v) a fifth weight ("w5") times the fifth seed PSF 2432E. This can be expressed as follows:

$$\text{Starter PSF} = \Sigma w1(\text{first seed PSF}) + w2(\text{second seed PSF}) + w3(\text{third seed PSF}) + w4(\text{fourth seed PSF}) + w5(\text{fifth seed PSF}).$$

Equation (41)

As provided herein, the weight given to each seed PSFs 2430A-2430E can be based on a separation distance of the respective center 2430AC-2430EC of the patch images 2430A-2430E to the block center 2560C of the respective image block 2560. Referring to FIG. 25, a separation distance 2561 between the center 2430AC of the first patch image 2430A (illustrated in FIG. 24B) and the block center 2560C of the block B15 is illustrated for reference.

Continuing with this example, for the image block B15, (i) the first weight is based on the separation distance 2561 between the center 2430AC of the first patch image 2430A and the block center 2560C of image block B15; (ii) the second weight is based on the separation distance between the center 2430BC of the second patch image 2430B and the block center 2560C of image block B15; (iii) the third weight is based on the separation distance between the center 2430CC of the third patch image 2430C and the block center 2560C of image block B15; (iv) the fourth weight is based on the separation distance between the center 2430DC of the fourth patch image 2430D and the block center 2560C of image block B15; and (v) the fifth weight is based on the separation distance between the center 2430EC of the fifth patch image 2430E and the block center 2560C of image block B15.

Typically, greater weights will be given for shorter separation distances, while smaller weights will be given for longer separation distances. Thus, seed PSFs 2432A-2432F which are closer to the respective image block 2560 are given more weight than the seed PSFs 2432A-2432F which are farther away. In this example, the first seed PSF 2432A and the fifth seed PSF 2432F will be given the larger weights, while the second, third, and fourth seed PSFs 2432B-2432D will be given smaller weights.

Figure 26B:
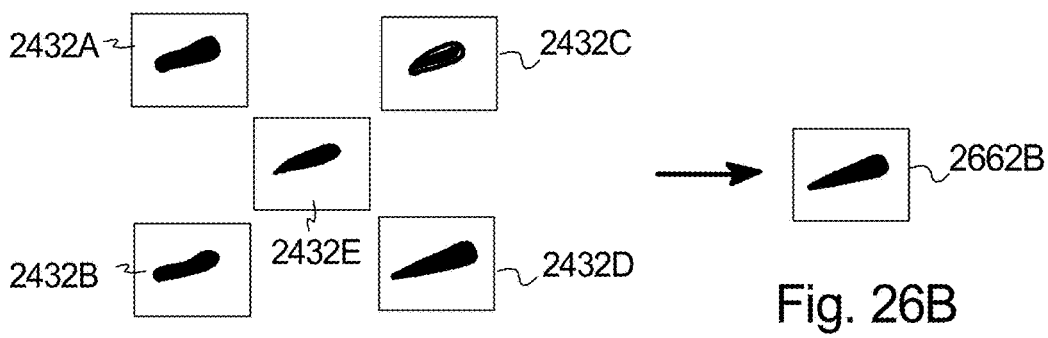
FIG. 26B is a simplified illustration of the seed PSFs and another embodiment of a starter PSF.

Somewhat similarly, FIG. 26B illustrates the five seed PSFs 2430A-2430E from FIG. 24D, and the resulting starter PSF 2662B that was determined for one of the image blocks 2560, e.g. image block B6 (illustrated in FIG. 25A). In this example, the five seed PSFs 2430A-2430E are synthesized together to generate the starter PSF 2562B for image block B6. In this embodiment, the starter PSF 2662B is again a weighted sum of the seed PSFs 2432A-2432E. Further, the weight given to each seed PSFs 2430A-4230E can again be based on a separation distance of the respective center 2430AC-2430EC of the patch images 2430A-2430E to the block center 2560C of image block B6. For example, for the image block B6, (i) the first weight is based on the separation distance between the center 2430AC of the first patch image 2430A and the block center 2560C of image block B6; (ii) the second weight is based on the separation distance between the center 2430BC of the second patch image 2430B and the block center 2560C of image block B6; (iii) the third weight is based on the separation distance between the center 2430CC of the third patch image 2430C and the block center 2560C of image block B6; (iv) the fourth weight is based on the separation distance between the center 2430DC of the fourth patch image 2430D and the block center 2560C of image block B6; and (v) the fifth weight is based on the separation distance between the center 2430EC of the fifth patch image 2430E and the block center 2560C of image block B6. In this example, the fourth seed PSF 2432D will be given the largest weight, while the first seed PSF 2432A will be given the smallest weight.

Following this procedure, a separate starter PSF can be calculated from the seed PSFs 2432A-2432E for each of the image blocks 2560.

It should be noted that it may not be necessary to use all of the seed PSFs 2432A-2432E to calculate the separate starter PSF for each of the image blocks 2560. For example, one or more of the seed PSFs 2432A-2432E may be determined to be unreliable, and thus not used in the calculation.

Referring back to FIG. 22, in an alternative embodiment, at step 2250, the seed PSFs 2432A-2432E can be used to determine a globally dominant point spread function ("dominant PSF") that can be used as the starter PSF for each of the image blocks 2560. As provided herein, in certain instances, the blurred image 2114 was subjected to a global change. Further, this global change is captured partially by the seed PSFs 2430A-2430E estimates local. Stated in another fashion, if the blurred image 2114 has a dominant global blur, most of the seed PSFs 2430A-2430E will include the dominant global blur.

Figure 26C:
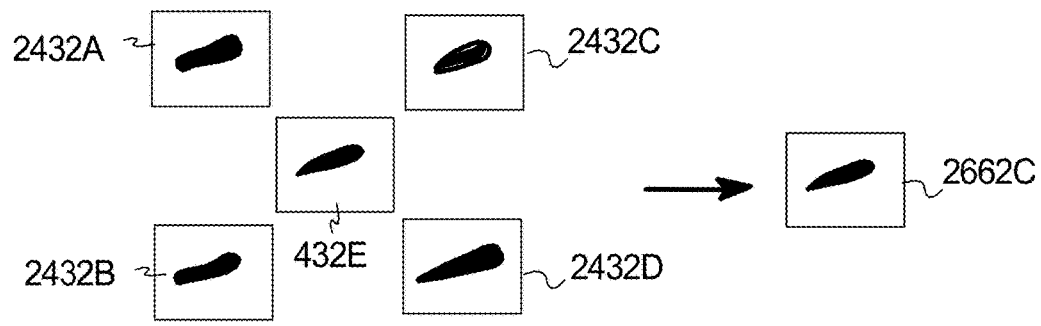
FIG. 26C is a simplified illustration of the seed PSFs and a dominant PSF used as the starting PSF.

FIG. 26C illustrates the five seed PSFs 2430A-2430E from FIG. 24D, and the resulting starter PSF 2662C that is the globally dominant PSF that will be used for all of the image blocks 2560. As provided herein, the method utilized to synthesize the seed PSFs 2430A-2430E to generate the globally dominant starter PSF 2662C can vary. One method for synthesizing multiple PSFs is disclosed in PCT/US13/29655 filed on Mar. 7, 2013 and entitled "Globally Dominant Point Spread Function Estimation". As far as permitted the content of PCT/US13/29655 are incorporated herein by reference.

Next, referring back to FIG. 22, at step 2252, for each image block, PSF refinement is performed at higher and higher resolutions until a local block PSF estimate is provided at step 2254. Stated in another fashion, a block point spread function ("block PSF") is calculated for each image block 2560 using the starter PSF to begin the point spread function estimation within a multi-resolution frame work. Thus, the seed PSFs are used to calculate a full resolution point spread function for each image block 2560.

Referring back to FIG. 25, after the starter PSF has been calculated for each of the image blocks 2560, the starter PSF is used to begin the point spread function estimation for each image block 2560 of the second lowest resolution image 2314B. Once the point spread function is estimated for each image block of the second lowest resolution image 2314B, that respective point spread function is used to begin the point spread function estimation for each image block 2560 of the third lowest resolution image 2314C (illustrated in FIG. 23A). Next, after the point spread function is estimated for each image block of the third lowest resolution image 2314C, that respective point spread function is used to begin the point spread function estimation for each image block 2560 of the fourth lowest resolution image 2314D (illustrated in FIG. 23A). Subsequently, after the point spread function is estimated for each image block of the fourth lowest resolution image 2314D, that respective point spread function is used to begin the point spread function estimation for each image block 2560 of the fifth lowest resolution image 2314E (illustrated in FIG. 23A). Next, after the point spread function is estimated for each image block 2560 of the fifth lowest resolution image 2314E, that respective point spread function is used to begin the point spread function estimation for each image block 2560 of the sixth lowest resolution image 2314F (illustrated in FIG. 23A). Subsequently, after the point spread function is estimated for each image block 2560 of the sixth lowest resolution image 2314F, that respective point spread function is used to begin the point spread function estimation for each image block 2560 of the blurred image 2114 (illustrated in FIG. 23A). The resulting point spread function estimate for each image block 2560 of the blurred image 2114 is the output block PSF for each image block 2560.

As a specific example, for image block B15, after the starter PSF has been calculated for image block B15, the B15 starter PSF is used to begin the point spread function estimation for image block B15 of the second lowest resolution image 2314B. Once the point spread function is estimated for image block B15 of the second lowest resolution image 2314B, that respective point spread function is used to begin the point spread function estimation for image block B15 of the third lowest resolution image 2314C (illustrated in FIG. 23A). Next, after the point spread function is estimated for image block B15 of the third lowest resolution image 2314C, that respective point spread function is used to begin the point spread function estimation for image block B15 of the fourth lowest resolution image 2314D (illustrated in FIG. 23A). Subsequently, after the point spread function is estimated for image block B15 of the fourth lowest resolution image 2314D, that respective point spread function is used to begin the point spread function estimation for image block B15 of the fifth lowest resolution image 2314E (illustrated in FIG. 23A). Next, after the point spread function is estimated for image block B15 of the fifth lowest resolution image 314E, that respective point spread function is used to begin the point spread function estimation for each image block B15 of the sixth lowest resolution image 2314F (illustrated in FIG. 23A). Subsequently, after the point spread function is estimated for image block B15 of the sixth lowest resolution image 2314F, that respective point spread function is used to begin the point spread function estimation for image block B15 of the blurred image 2114 (illustrated in FIG. 23A). The resulting point spread function estimate for image block B15 of the blurred image 14 is the output block PSF for image block B15.

Any standard point spread function estimation method can be used in the steps. As provided above, one non-exclusive method includes reformulating it as an optimization problem in which a PSF cost function and a latent sharp image cost function are minimized.

Figure 27:
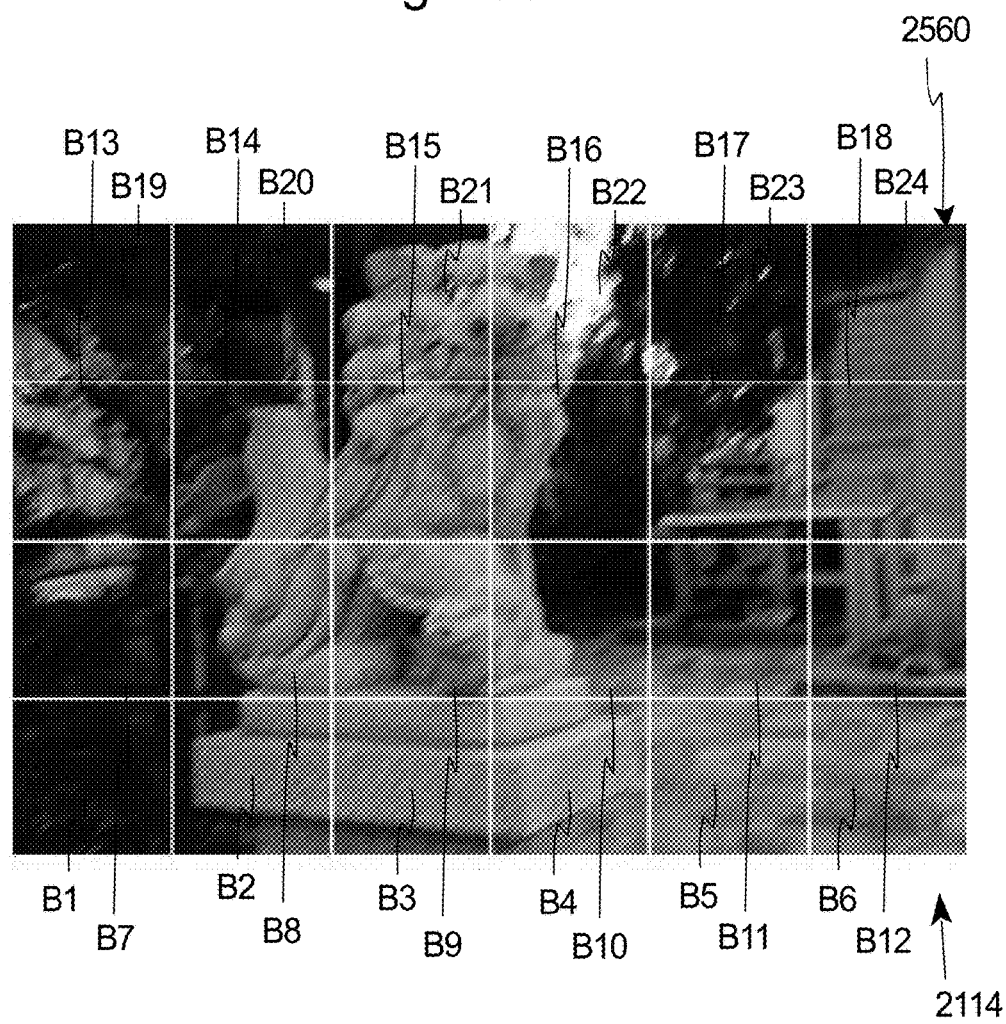
FIG. 27 is a simplified illustration of the blurry image of FIG. 1 divided into a plurality of image blocks.
Figure 28:
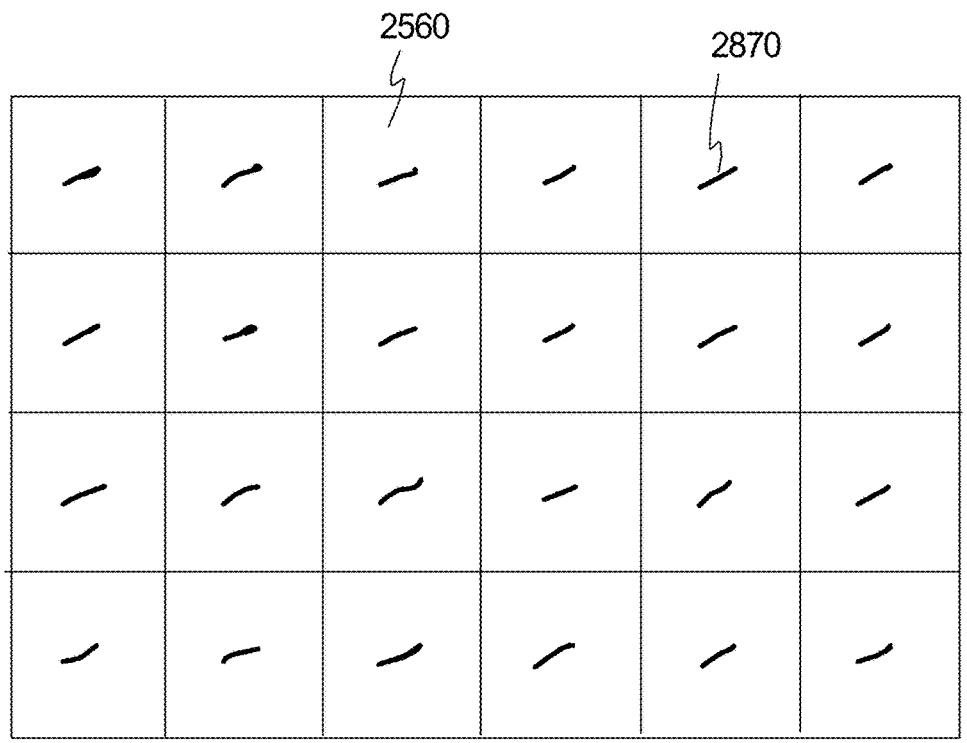
FIG. 28 is a simplified illustration of a plurality of block point spread functions calculated for the image blocks of the blurry image of FIG. 27.

FIG. 27 illustrates the blurred image 14 from FIG. 21 divided into the plurality of image blocks 2560, including block B1-B24. Further, FIG. 28 is a simplified illustration of the plurality of block point spread functions 2870 that were calculated for the image blocks 2560 of the blurry image 2114 (illustrated in FIG. 27). With the present design, in certain embodiments, a separate block PSF 2870 is calculated for each image block 2560.

Stated in another fashion, in the embodiment described above, the alternating minimization of the point spread function estimation cost function, and the latent sharp image estimation cost function is performed separately for each image block 2560. Further, the multi-resolution refinement is performed separately for each of the image blocks 2560, where first, the coarse versions of the latent sharp image L and the point spread function kernel K are estimated using a heavily downsampled blurry image, and then these estimates are refined at higher and higher resolution for each image block 2560, until the full resolution of the given blurred image is reached. The number of iterations for each resolution can be varied to achieve desired level of deblurring. The seed PSFs 2432 are used to determine the starter PSF that is used to start a refinement process. As provided herein, with the methods provided herein, the accuracy of the starter PSF is improved because of the use of data from multiple patch images 2430. This increases the overall PSF accuracy and speed of calculations.

As provided herein, one or more of the block point spread functions 2870 can be used to deblur the blurry image 2114 (or a portion thereof) to provide the deblurred image 2116 (illustrated in FIG. 21). For example, a plurality of block point spread functions 2870 can be synthesized into a combined image point spread function that represents the blur for a portion or the entire image 2114.

In one embodiment, the refinement of the PSF is based on dominant seed PSF (as a starting or initial PSF). In this embodiment, the dominant seed PSF property can be used to check the quality of PSF refinement and the refined PSF is not too much different from the dominant seed PSF.

Alternatively, in certain embodiments, during the refinement process, the seed PSF properties can be used to check the quality of refinement. For example, in certain embodiments, the refined PSF is allowed to vary from the seed PSF, however, the seed PSF can still be a rough guidance/constraint for the refined PSF. Basically, the variation should be reasonable, not dramatic. If during the PSF refinement, the intermediate PSF shows too much difference than the corresponding seed PSF, the refinement can be flagged as unreliable. With this kind of approach, it is necessary to be confident in the quality of the seed PSF. If the quality of the seed PSF is unknown, it is safer to use the dominant seed PSF instead of seed PSF as guidance.

Figure 29:
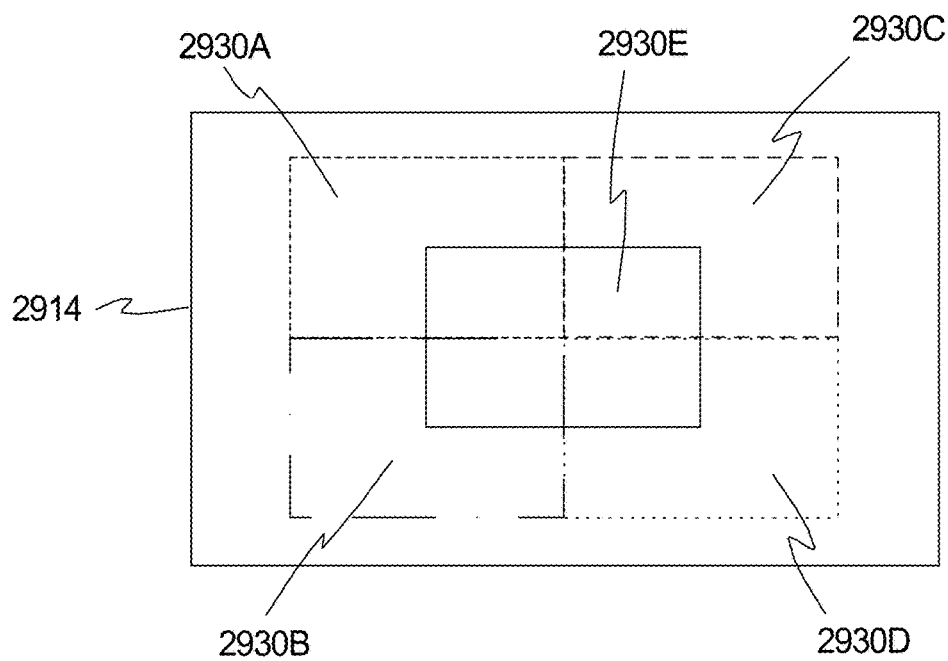
FIG. 29 is a simplified illustration of the outline of a downsampled image and another embodiment of the patch images.

FIG. 29 is a simplified illustration of the outline of a downsampled image 2914 and another, non-exclusive embodiment of the patch images 2930A-2930E. In this embodiment, the patch images 2930A-2930E are smaller than those illustrated in FIG. 24A. It should be noted that other sizes and shapes of the patch images 2930A-2930E are possible.

Figure 30:
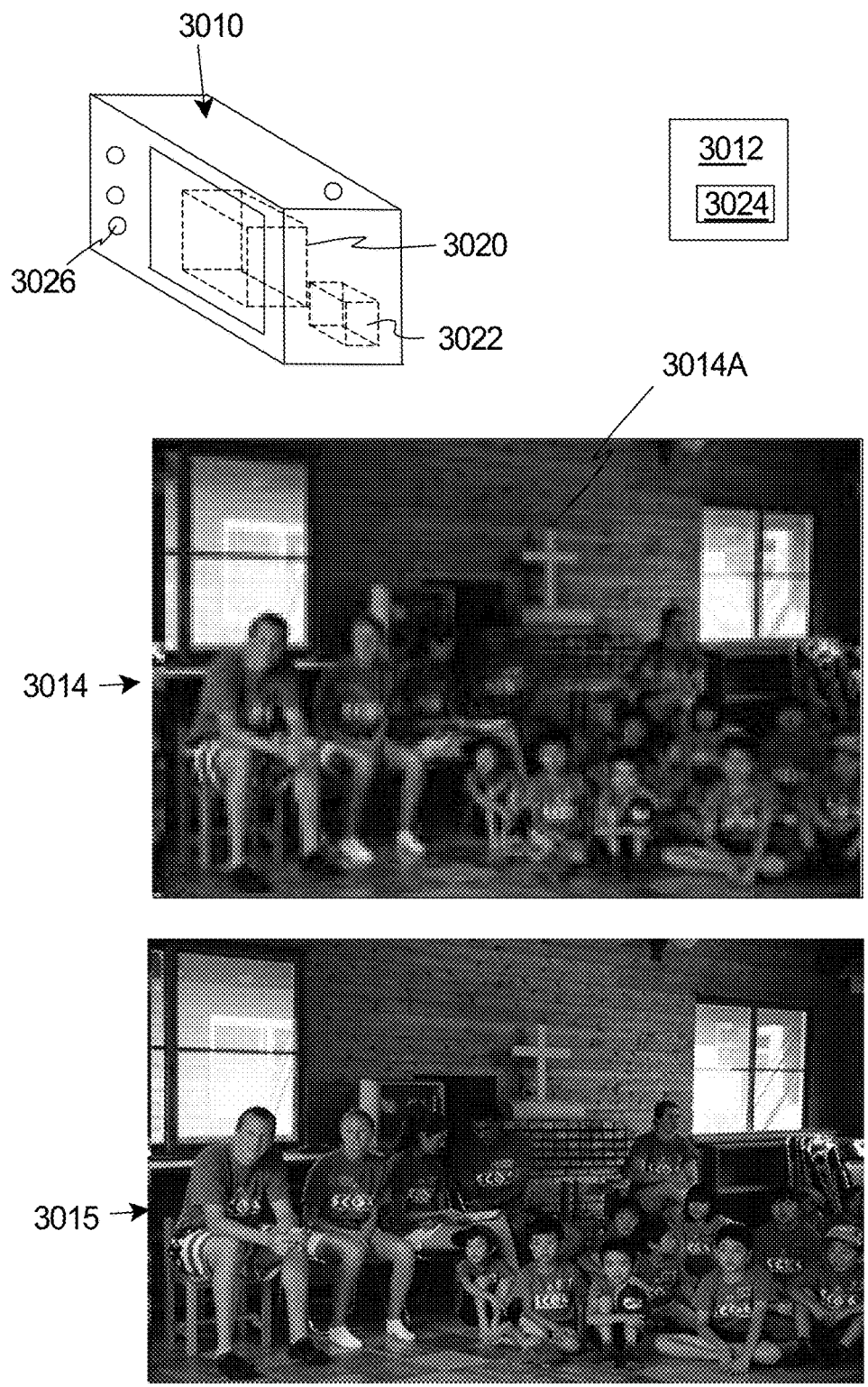
FIG. 30 is a simplified illustration of an image apparatus having features of the present invention, a computer having features of the present invention, a captured image, and a deblurred image.

FIG. 30 is a simplified illustration of yet another embodiment of an image apparatus 3010 (e.g. a digital camera), a computer 3012 (illustrated as a box), and a blurred, captured image 3014 (also referred to as a photograph). In certain embodiments, the present invention is also directed to one or more unique algorithms that are used to estimate a separate region point spread function 3316 (illustrated in FIG. 33B) for one or more image regions 3118 (illustrated in FIG. 31) of the image 3014 with improved accuracy. The accuracy of estimated region point spread function(s) 3316 are crucial to image restoration quality. As a result thereof, a resulting deblurred image 3015 generated using the improved region point spread functions 3316 will likely be improved.

As provided herein, the image apparatus 3010 can include a capturing system 3020 (e.g. a semiconductor device that records light electronically) that captures the image 3014, and a control system 3022 that uses one or more of the algorithms for computing a separate region point spread function 3316 for one or more of the image regions 3118 with increased accuracy. Alternatively, the computer 3012 can include a control system 3024 that uses one or more of the algorithms for computing a separate region point spread function 3316 for one or more of the image regions 3118 with increased accuracy. Subsequently, the control system 3022, 3024 can use one or more of the region point spread functions 3316 to generate the latent sharp image 3015 from the blurred image 3014.

Further, as illustrated in FIG. 30, the image apparatus 3010 can include one or more control switches 3026 that allow for the control and operation of the image apparatus 3010.

Each control system 3022, 3024 can include one or more processors and circuits. Further, either of the control systems 3022, 3024 can include software that utilizes one or more methods and formulas provided herein.

The type of scene captured in the image 3014 can vary. In many instances, the image 3014 can include one or more scene structures 3014A and/or noise that can adversely influence the estimation of the region point spread function 3316. For example, strong edges 3014A in the image 3014 can adversely influence the estimation of the point spread function. The methods disclosed herein can be used to estimate a region point spread function 3316 that is less influenced by scene structure bias and noise, and as a result thereof, has improved accuracy.

Figure 31:
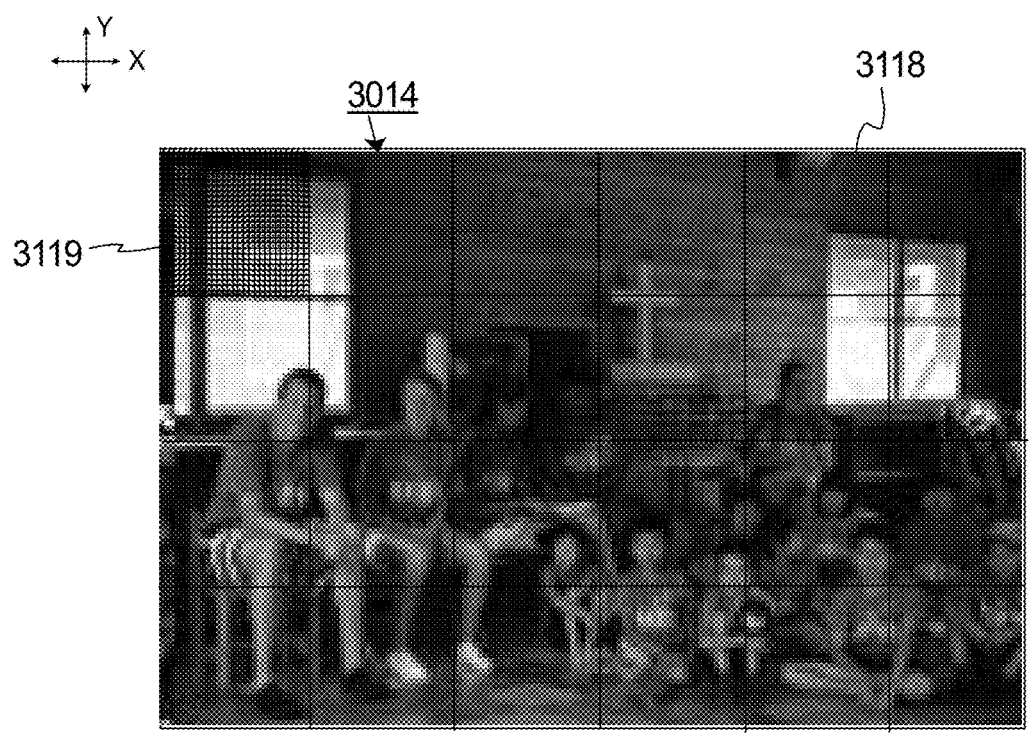
FIG. 31 illustrates the captured image of FIG. 30 divided into a plurality of image regions.

Referring to FIG. 31, the size, shape and number of the image regions 3118 in the image 3014 can be varied. For example, in FIG. 31, each image region 3118 is generally rectangular shaped and the image 3014 is divided into a four by six grid that includes twenty-four, equally sized, block shaped image regions 3118. Alternatively, the shape and/or number image regions 3118 can be different than that illustrated in FIG. 31. For example, the entire image 3014 can be one image region, or the image 3014 can be divided into a five by five, a seven by seven, or a nine by nine grid. Still alternatively, the image 3014 can be divided into a number of irregularly shaped image regions.

It should be noted that any of the image regions 3118 can be referred to as a first image region, a second image region, a third image region, etc. Additionally, depending upon the characteristics of the image 3014, it should be noted that some of the image regions 3118 may have good texture (texture in multiple directions), some of the image regions 3118 may have very little texture (smooth area), and some of the image regions 3118 may have many strong edges in only certain directions.

In the embodiments in which the image 3014 is divided into a plurality of image regions 3118, the methods provided herein can be used to calculate a separate region point spread function 3316 (illustrated in FIG. 33B) for (i) all of the image regions 3118, (ii) a predetermined number of image regions 3118 that can be randomly selected or selected based on a predetermined pattern, or (iii) just the image regions 3118 that are estimated to have good texture. For example, a preliminary test can be performed to estimate the image regions 3118 of the image 3014 that are best suited for an accurate point spread function estimation, e.g. the image regions 3118 that have good texture. For example, this can be done by evaluating the gradient directions in each of image regions 3118. Subsequently, the image regions 3118 have gradients in multiple directions can be labeled as good image regions. Further, a separate region point spread function can be calculated for each of the good image regions.

It should be noted that each of the image regions 3118 is made up of a plurality of pixels 3119 (only a few are illustrated in one of the image regions 3118). Further, some of these pixels 3119 are in areas of texture and are useful for point spread function estimation, while other pixels 3119 are in smooth areas and are not very useful for point spread function estimation.

Figure 32:
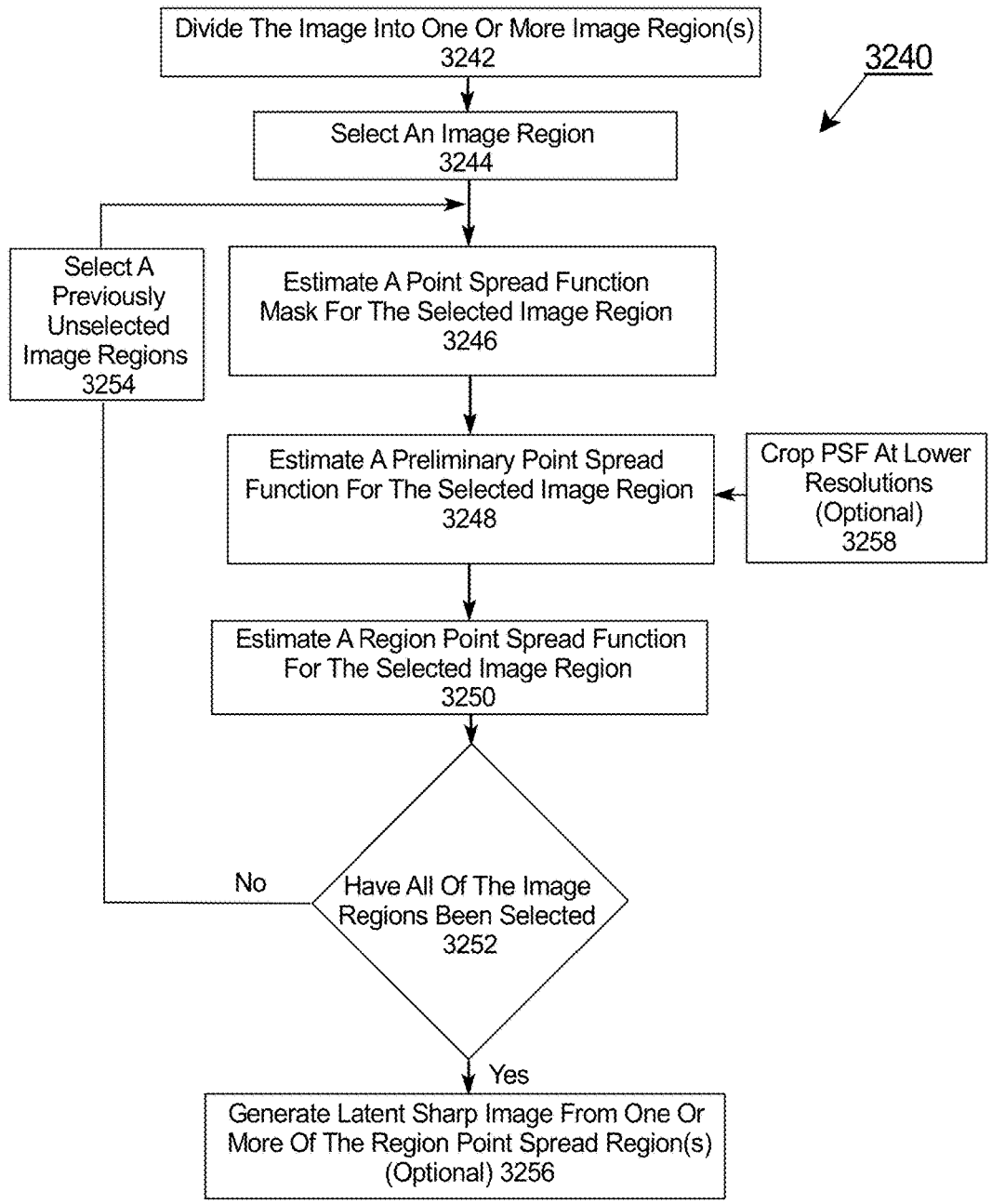
FIG. 32 is flow chart that outlines a first method having features of the present invention for estimating a region point spread function for one of the image regions.

FIG. 32 is a flow chart 3240 that illustrates one non-exclusive method used by the control system 3022, 3024 (illustrated in FIG. 1) to (i) estimate a separate region point spread function 3316 (illustrated in FIG. 33B) for one or more image regions 3118 (illustrated in FIG. 31) of the image 3014 (illustrated in FIG. 30), and (ii) provide the latent sharp image 3015 (illustrated in FIG. 30) using one or more of the estimated region point spread functions 3316. As an overview, in this embodiment, the problem of reducing artifacts in the region point spread function 3316 is solved by cropping a preliminary point spread function 3330 (illustrated in FIG. 33B) based on a reliable point spread function shape mask 3332 (illustrated in FIG. 33A). Stated in another fashion, the present invention is directed to a simple cropping algorithm to reduce artifacts in estimated region point spread function(s) 3316 to help improve the accuracy.

Starting at step 3242, the image is divided into a plurality of image regions. A non-exclusive example of how an image 3014 can be divided is illustrated in FIG. 31. Next, at step 3244, one of the image regions is selected for processing.

Subsequently, at step 3246, a point spread function mask 3332 is estimated for the selected image region. In one, non-exclusive embodiment, the point spread function mask 3332 is calculated by first estimating an initial ("downsampled") point spread function 3334 (illustrated in FIG. 33A) for a lower resolution ("downsampled") version of the selected image region. In alternative, non-exclusive embodiments, the lower resolution version is approximately one-sixth (1/6), one-fifth (1/5), one-fourth (1/4), one-third (1/3), or one-half (1/2) of the full resolution of image region 3118.

Any standard point spread function estimation method can be used to estimate the initial point spread function 3334 for the selected image region at the lower resolution. One common approach to solving a PSF estimation problem includes reformulating it as an optimization problem in which a suitable PSF cost function and a suitable latent sharp image cost function are minimized. These algorithms are iterative and usually they alternate, improving the current estimates of the PSF and the latent sharp image. The steps of improving the current estimates of the PSF and the current estimate of the latent sharp image are typically in the form of solving an optimization problem.

A relatively common type of a cost function is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness.

It should be noted that the point spread functions illustrated herein are in gray scale, with (i) pixels having a value of zero illustrated in black, and (ii) pixels having a value of between zero and one are represented in different shapes of gray. It should also be noted that the total (sum) value of all the pixels in the point spread function is equal to one. In one non-exclusive embodiment, each point spread function is illustrated with a fifty-one by fifty-one (51×51) pixel array.

After, the initial point spread function 3334 for the lower resolution version of the selected image region is calculated, it can be used to generate the point spread function mask 3332. In one embodiment, the initial point spread function 3334 is thresholded to remove pixels that have a value lower than a predetermined initial PSF threshold to provide an initial, thresholded, point spread function 3336 (illustrated in FIG. 33A). In this example, pixels in the initial point spread function 3334 having a value that is less than the predetermined initial PSF threshold are set to zero.

As non-exclusive examples, the predetermined initial PSF threshold can be approximately five (5), seven (7), ten (10), twelve (12), fifteen (15), eighteen (18), or twenty (20) percent of the maximum PSF value. However, other values can be used.

Subsequently, a morphological operation is performed on the initial, thresholded, point spread function 3336 to slightly expand the initial, thresholded, point spread function 3336 to create the point spread function mask 3332. In certain embodiments, the point spread function mask 3332 includes pixels that surround the initial, thresholded, point spread function 3336. Stated in another fashion, the point spread function mask 3332 is a slightly expanded version of the initial, thresholded, point spread function 3336. In this example, the point spread function mask 3332 forms an oval shape that encircles and is slightly larger than (slightly expanded from) the initial, thresholded, point spread function 3336.

The amount in which the size of the PSF mask 3332 is increased over the initial, thresholded, point spread function 3336 can be varied to achieve the desired results. If the increase is too small, there is a risk that the subsequent point spread function estimates will be over-cropped and data will be lost. Alternatively, if the increase is too large, there is a risk that the subsequent point spread function estimates will have too much edge bias. In alternative, non-exclusive embodiments, a perimeter of the initial, thresholded, point spread function 3336 is expanded approximately one, two, three, four, five, or six pixels in each direction to generate the PSF mask 3332.

It should be noted that in this example, the PSF mask 3332 is a binary mask in which the pixels that make up the oval and that are inside the oval are given a value of one, while the pixels outside the oval are given a value of zero.

Subsequently, at step 3248, a preliminary point spread function 3330 at full resolution for the selected image region is estimated. The preliminary point spread function 3330 (illustrated in FIG. 33B) at full resolution can be calculated using any standard point spread function estimation method, such as reformulating it as an optimization problem in which the PSF cost function and the latent sharp image cost function are minimized, as discussed above.

In addition to alternating minimization of the latent sharp image estimation cost function, and the PSF estimation cost function, it is also common to use a multi-resolution approach, where first, low resolution versions of the latent sharp image L and the PSF kernel K are estimated using a heavily downsampled blurry image region, and then these estimates are refined at higher and higher resolution, until the preliminary point spread function 3330 at the full resolution of the given blurred image region is estimated.

Next, at step 3250, the region point spread function 3316 for the selected image region 3118 can be determined. In one embodiment, first, the preliminary point spread function 3330 is compared to the point spread function mask 3332 to identify any outliers (pixels outside the PSF mask 3332). In this embodiment, the outliers of the preliminary point spread function 3330 are located outside the oval of the point spread function mask 3332.

In certain embodiments, a cropping threshold test is applied to determine if it is worthwhile to perform cropping. The cropping threshold test can include a number/size ratio test and an outlier number test. For the cropping threshold test, (i) the number of pixels that are outliers ("outlier number") can be calculated, and (ii) the size (number of pixels) of the point spread function mask 3332 can be calculated.

Subsequently, a ratio of the outlier number to the size of the point spread function mask 3332 ("number/size ratio" or "crop percentage") can be calculated. In certain embodiments, number/size ratio is compared to a predetermined ratio threshold. As non-exclusive examples, the predetermined ratio threshold can be approximately 0.1, 0.05, 0.02, or 0.01. However, other values for the ratio threshold can be used.

Further, in certain embodiments, the outlier number is compared to a predetermined outlier threshold. As non-exclusive examples, the predetermined outlier threshold can be approximately 16, 14, 12, 10, or 8.

In this example, (i) if the number/size ratio is lower than the predetermined ratio threshold, and (ii) the outlier number is below the predetermined outlier threshold, then the cropping threshold is not met, and the preliminary point spread function 3330 is set to be the region point spread function 3316. Thus, if the number/size ratio is small and the outlier number is small (e.g. very few outliers), then no cropping is performed.

Alternatively, (i) if the number/size ratio is higher than the predetermined ratio threshold (e.g. numerous outliers), and (ii) the outlier number is above the predetermined outlier threshold, then the cropping threshold is met, and a cropping operation is applied to remove outliers. In one embodiment, during the cropping operation, (i) all of outlier pixels the preliminary point spread function 3330 are set to have a value of 0, and (ii) the remaining pixels of the preliminary point spread function 3330 are renormalized to provide the region point spread function 3316. Prior to cropping, the total value of all the pixels in the preliminary point spread function 3330 is equal to one. After cropping, because the outlier values are set to zero, the total value for the region point spread function 3316 is now less than one. The renormalization step adjusts the values of the remaining non-zero pixels so that the total value for the region point spread function 3316 is equal to one. As non-exclusive examples, the normalization can be (i) a linear normalization in which the value for each of the remaining non-zero pixels increased linearly or proportional to its value, or (ii) a nonlinear normalization in which the value for the remaining non-zero pixels is increased nonlinearly, e.g. with high value pixels (bright pixels) being increased more than lower value pixels (dim pixels).

In an alternative embodiment, only one of the predetermined ratio threshold, or the predetermined outlier threshold has to be met to trigger cropping.

Next, at block 3252, the image regions are evaluated to determine if all of the desired image regions 3118 have been evaluated to estimate a region point spread function 3316. If not, at block 3254, a previously unselected image region is selected and blocks 3246-3250 are repeated until all of the image regions desired to be evaluated are, and a separate region point spread function 3316 is estimated for each of these image regions.

Finally, and optionally, at block 3256, a latent sharp image or portion thereof, can be generated using one or more of the region point spread functions 3316.

It should be noted that in the non-exclusive example described above, that cropping of the preliminary point spread function 3330 with the point spread function mask 3332 occurs only at full resolution (the final iteration) of the preliminary point spread function 3330. As discussed below, this provides good PSF improvement with relatively simple computation.

Optionally, as illustrated in FIG. 32, at step 3258, cropping of the preliminary point spread function can also be performed at one or more of the low resolution iterations of the preliminary point spread function. Stated in another fashion, during the multi-resolution approach used to estimate the full resolution, preliminary point spread function 3330, an estimated preliminary PSF kernel at each lower resolution can be cropped using the point spread function mask 3332.

More specifically, similar to the example described above, the less than full resolution preliminary PSF kernel is compared to the point spread function mask 3332 to identify any outliers. Subsequently, the number/size ratio is calculated and compared to the predetermined ratio threshold. If the number/size ratio is lower than the predetermined ratio threshold and the outlier number is below the predetermined outlier threshold, then the lower resolution preliminary point spread function is not cropped. Alternatively, if the number/size ratio is higher than the predetermined ratio threshold and the outlier number is above the predetermined outlier threshold, then the lower resolution preliminary point spread function is cropped and renormalized.

Figure 33A:
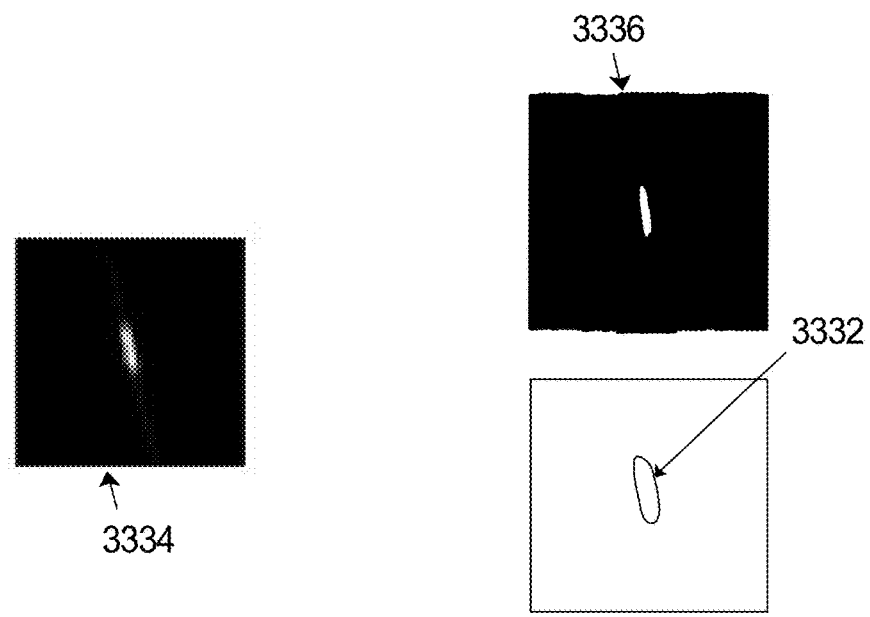
FIG. 33A is a simplified illustration of a low resolution initial point spread function; an initial, thresholded point spread function; and a point spread function mask calculated using one of the methods provided herein.

FIG. 33A is a simplified illustration of (i) the low resolution initial point spread function 3334 estimated for one of the image regions 3118 (illustrated in FIG. 31); (ii) the initial, thresholded point spread function 3336 calculated from the low resolution initial point spread function 3334; and (iii) the point spread function mask 3332 calculated from initial, thresholded point spread function 3336.

Figure 33B:
FIG. 33B is a simplified illustration of a preliminary point spread function; and a region point spread function calculated using one of the methods provided herein.

FIG. 33B is a simplified illustration of (i) the preliminary point spread function 3330 calculated for one of the image regions 3118; and (ii) the resulting region point spread function 3316 estimated after cropping of the preliminary point spread function 3330 using the point spread function mask 3332 (illustrated in FIG. 33A). The simple and fast point spread function cropping algorithm provided herein has effectively reduced the artifacts in region point spread function 3316. Experiment results demonstrate the strong ability of PSF cropping algorithm to improve the accuracy of the region point spread function 3316 for images with strong edge bias or images that lack of reliable edge/texture information.

Figure 33C:
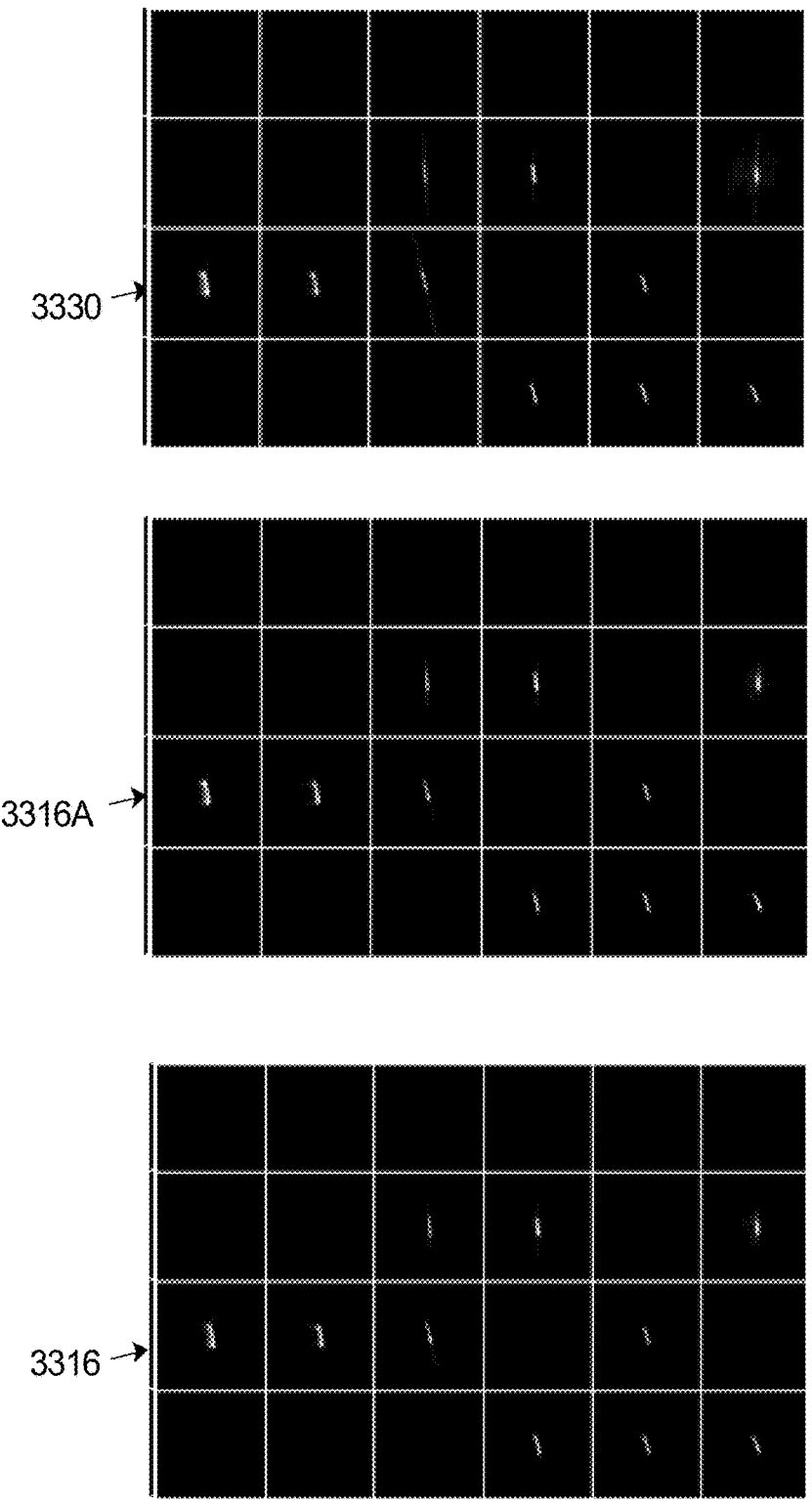
FIG. 33C is a simplified illustration of the preliminary point spread functions for a plurality of the image regions; a first example of the region point spread functions estimated for a plurality of the image regions; and a second example of the region point spread functions calculated for a plurality of the image regions.

FIG. 33C incldes (i) a simplified illustration of a separate, full resolution preliminary point spread function 3330 estimated for a plurality of the image regions; (ii) a simplified illustration of a separate, full resolution, region point spread function 3316A estimated for a plurality of the image regions, with cropping performed at each resolution of the preliminary point spread function; and (iii) a simplified illustration of a separate, full resolution, region point spread function 3316 estimated for a plurality of the image regions, with cropping performed at only the full resolution preliminary point spread function 3330.

In this example, the point spread functions 3330, 3316A, 3316 were estimated for only ten of the twenty-four image regions 3118. Alternatively, the point spread functions 3330, 3316A, 3316 can be estimated for more than ten or fewer than ten of the twenty-four image regions 3118.

Comparing the preliminary point spread functions 3330 to the region point spread functions 3316A, 3316 illustrate that cropping has occurred on many of the region point spread functions 3316A, 3316. As a result thereof, the region point spread functions 3316A, 3316 are believed to be more accurate and less influenced by strong edge bias or unreliable edge/texture information.

Further, it should be noted by comparing the region point spread functions 3316A, 3316, that cropping of the PSF only at the full resolution and cropping at each resolution of the PSF generate very similar results.

In summary, the simple and fast point spread function cropping algorithm provided herein reduces artifacts in estimated region point spread function. More specifically, experimental results demonstrate the strong ability of the point spread function cropping algorithm to improve the point spread function accuracy for scenes with strong edge bias, and/or scenes that lack reliable edge/texture information.

The cropping method disclosed in FIG. 32 is a post processing procedure that can be used to reduce the influence of strong edges and improve the characteristics of the region point spread function 3316.

The present invention is also directed to a pre-processing method that can be used to improve the characteristics of the region point spread function 3316 by reducing the influence of strong edges. In certain embodiments, in order to reduce computational costs, the present invention only uses a portion of the pixels 3119 in the selected image region 3118 to estimate the point spread function. In one embodiment, the present invention provides a method to select good pixels 3119 from the image region 3118 for the point spread function estimation while reducing the influence of strong edges. Stated in another fashion, the present invention is directed to a simple adaptive gradient pixel mask which is generated for each image region 3118, and which is used to estimate the best pixels 3119 to use for the PSF estimation process to help improve the accuracy.

Figure 34:
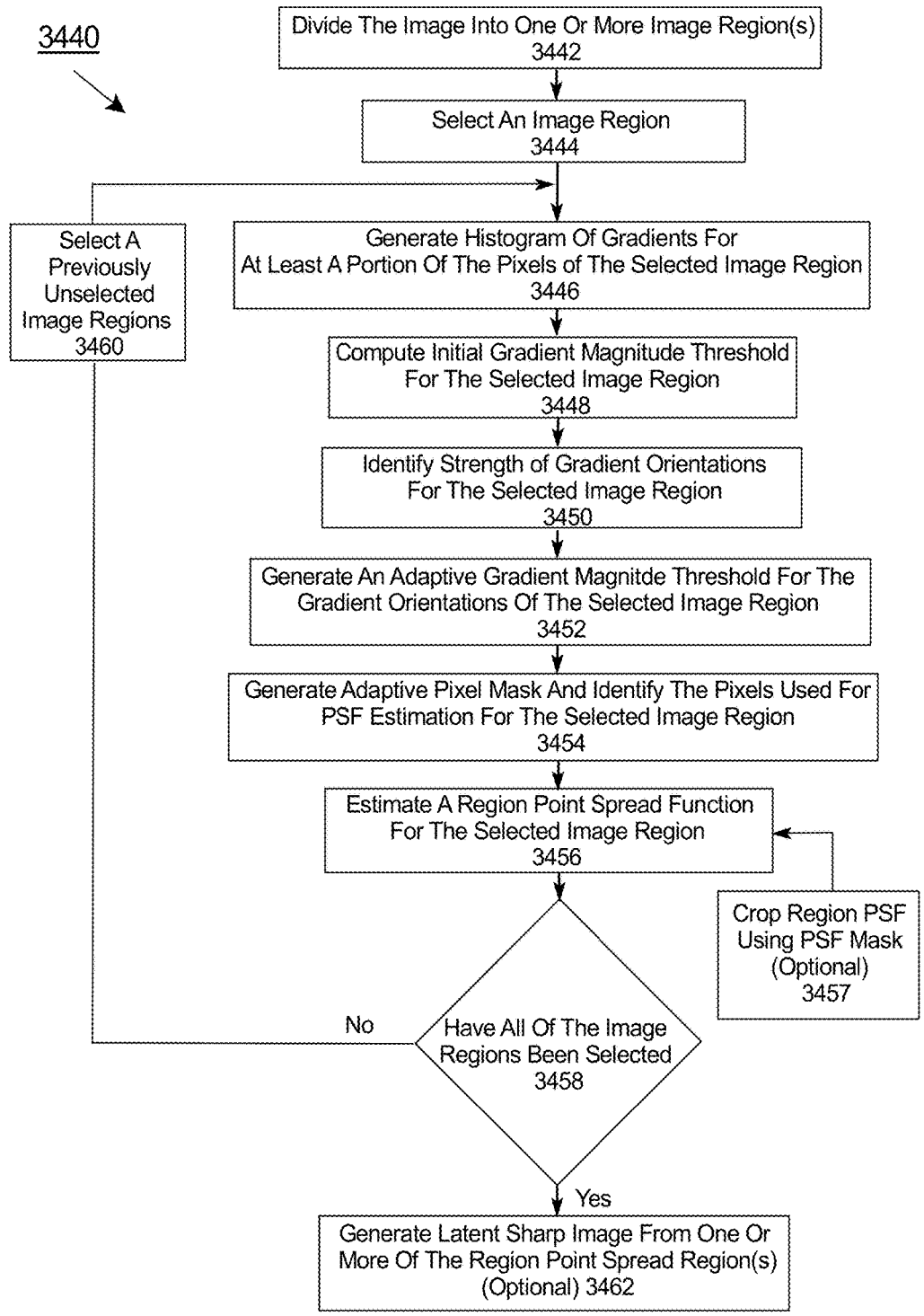
FIG. 34 is flow chart that outlines another method having features of the present invention for estimating a region point spread function for one of the image regions.

More specifically, FIG. 34 is a flow chart 3440 that illustrates another method that can be used by the control system 3022, 3024 (illustrated in FIG. 30) to (i) estimate a separate region point spread function 3616 (illustrated in FIG. 36) for one or more image regions 3118 in the image 3014, and (ii) provide a latent sharp image 3015 (illustrated in FIG. 30) using one or more of the region point spread functions 3616. In the embodiment illustrated in FIG. 34, the problem of reducing strong scene edge bias in point spread function estimation is solved by introducing an adaptive gradient mask to select a balance of pixels with strong/weak orientations for use in PSF estimation process. As provided herein, PSF estimation requires gradient information from all orientations. However, strong scene edge bias often degrades estimated PSF accuracy. The method illustrated in FIG. 34 identifies strong/weak gradient orientations and adaptively adjust gradient thresholds to achieve balanced selection of strong/weak edge pixels.

It should be noted that the method described in reference to FIG. 34 can be performed in conjunction with the method described in FIG. 32. In this embodiment, the method of FIG. 34 is used to select the pixels 3119 in the image region 3118 which are subsequently used for the point spread function refinement. Alternatively, the method described in FIG. 34 can be used with another PSF estimation method, independently of the point spread function estimation method described in reference to FIG. 32.

Starting at step 3442, the image is divided into a plurality of image regions. A non-exclusive example of how an image 3014 can be divided is illustrated in FIG. 31. Next, at step 3444, one of the image regions is selected for processing.

Figure 35:
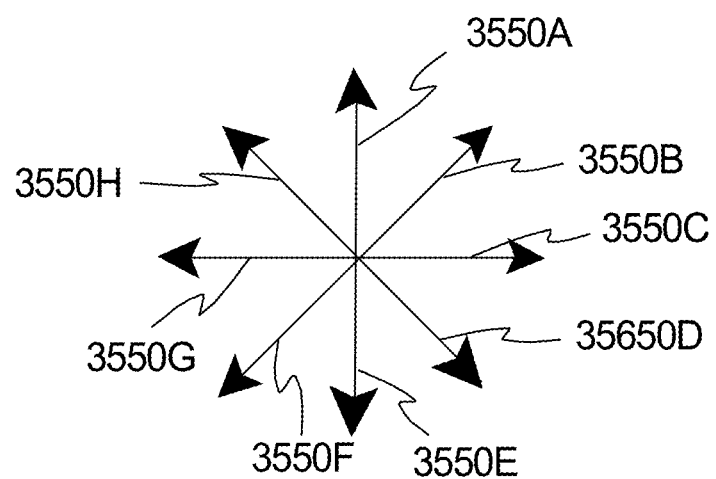
FIG. 35 is a graph that illustrates a plurality of gradient directions.

Subsequently, at step 3446, a histogram of the gradient magnitudes and directions for the pixels of the selected image region is generated. This histogram includes the gradient intensity (magnitude), and gradient orientations for at least a portion of the pixels of the selected image region. The number of gradient orientation can be varied. As non-exclusive examples, the number of gradient orientations can be 4, 6, 8, 10, 12, etc. FIG. 35 is a graph that illustrates a plurality of gradient orientations. In this example, there are eight gradient orientations. For ease of discussion, the eight gradient orientations can be referenced as a first orientation 3550A, second orientation 3550B, third orientation 35350C, fourth orientation 3550D, fifth orientation 3550E, sixth orientation 3550F, seventh orientation 3550G, and eighth orientation 3550H.

Referring back to FIG. 34, in this example, during step 3446, the gradient orientations are quantized into eight directions, and the pixels 3119 are stored in decreasing gradient magnitude order (from higher magnitude (stronger gradient) to lower magnitude (weaker gradient)) for each gradient orientation. Stated in another fashion, the pixels 3119 are sorted according to gradient orientation and gradient magnitude.

With this design, the histogram of gradients identifies (i) one or more pixels ("first gradient pixels") sorted in order of magnitude having the first gradient orientation; (ii) one or more pixels ("second gradient pixels") sorted in order of magnitude having the second gradient orientation; (iii) one or more pixels ("third gradient pixels") sorted in order of magnitude having the third gradient orientation; (iv) one or more pixels ("fourth gradient pixels") sorted in order of magnitude having the fourth gradient orientation; (v) one or more pixels ("fifth gradient pixels") sorted in order of magnitude having the fifth gradient orientation; (vi) one or more pixels ("sixth gradient pixels") sorted in order of magnitude having the sixth gradient orientation; (vii) one or more pixels ("seventh gradient pixels") sorted in order of magnitude having the seventh gradient orientation; and (viii) one or more pixels ("eighth gradient pixels") sorted in order of magnitude having the eight gradient orientation.

After this pixel sorting process, at step 3448, an initial gradient magnitude threshold for the selected image region 3118 is computed. The value of the initial gradient magnitude threshold can be varied according to (i) the histogram of the gradients, and (ii) to achieve the desired balance between the accuracy of the PSF estimation and the computational costs of the PSF estimation. Generally speaking, the lower the initial gradient magnitude threshold will allow for more pixels to be included in the PSF estimation, and more computational costs, while the higher the initial gradient magnitude threshold will allow for fewer pixels to be included in the PSF estimation, and less computational costs. The PSF accuracy is improved when there are a sufficient number of reliable pixels.

In one embodiment, the initial gradient magnitude threshold is selected based on the minimum value that keeps a fixed amount (predetermined number of pixels) of largest magnitude pixels for each gradient orientation. In alternative, non-exclusive embodiments, the predetermined number of pixels 3119 can be approximately ½ of the PSF size, approximately ¼ of the PSF size, or approximately ⅛ of the PSF size. For example, if the PSF size is fifty-one by fifty-one (51×51), then one half (½) of the PSF size would be approximately twenty-five (25) pixels.

Subsequently, at step 3450, the strength of the gradient orientations 3550A-3550H is estimated for the selected image region 3118. Stated in another fashion, the strong gradient orientations and the weak gradient orientations for the selected image region 3118 can be identified. As a non-exclusive embodiment, for each gradient orientation 3550A-3550H, a sum of its gradient magnitudes can be calculated. In this embodiment, (i) a first sum can be calculated for the magnitudes of the first gradient pixels of the first gradient orientation 3550A; (ii) a second sum can be calculated for the magnitudes of the second gradient pixels of the second gradient orientation 3550B; (iii) a third sum can be calculated for the magnitudes of the third gradient pixels of the third gradient orientation 3550C; (iv) a fourth sum can be calculated for the magnitudes of the fourth gradient pixels of the fourth gradient orientation 3550D; (v) a fifth sum can be calculated for the magnitudes of the fifth gradient pixels of the fifth gradient orientation 3550E; (vi) a sixth sum can be calculated for the magnitudes of the sixth gradient pixels of the sixth gradient orientation 3550F; (vii) a seventh sum can be calculated for the magnitudes of the seventh gradient pixels of the seventh gradient orientation 3550G; and (viii) an eighth sum can be calculated for the magnitudes of the eight gradient pixels of the eighth gradient orientation 3550H.

The sums can subsequently be compared and categorized according to value. If the sum is high, then that gradient orientation 3550A-3550H has strong edges. Alternatively, if the sum is low, then that gradient orientation 3550A-3550H has weak edges. In one embodiment, (i) a first edge strength is calculated for the first gradient orientation 3550A; (ii) a second edge strength is calculated for the second gradient orientation 3550B; (iii) a third edge strength is calculated for the third gradient orientation 3550C; (iv) a fourth edge strength is calculated for the fourth gradient orientation 3550D; (v) a fifth edge strength is calculated for the fifth gradient orientation 3550E; (vi) a sixth edge strength is calculated for the sixth gradient orientation 3550F; (vii) a seventh edge strength is calculated for the seventh gradient orientation 3550G; and (viii) an eighth edge strength is calculated for the eighth gradient orientation 3550H Next, at step 3452, an adaptive gradient magnitude threshold is estimated for each of gradient orientations 3550A-3550H based on the edge strength of the respective gradient orientations 3550A-3550H. In one embodiment, (i) a first gradient magnitude threshold is estimated for the first gradient orientation 3550A; (ii) a second gradient magnitude threshold is estimated for the second gradient orientation 3550B; (iii) a third gradient magnitude threshold is estimated for the third gradient orientation 3550C; (iv) a fourth gradient magnitude threshold is estimated for the fourth gradient orientation 3550D; (v) a fifth gradient magnitude threshold is estimated for the fifth gradient orientation 3550E; (vi) a sixth gradient magnitude threshold is estimated for the sixth gradient orientation 3550F; (vii) a seventh gradient magnitude threshold is estimated for the seventh gradient orientation 3550G; and (viii) an eighth gradient magnitude threshold is estimated for the eighth gradient orientation 3550H. In certain embodiments, each of these gradient magnitude thresholds can be different based on the edge strength of the respective gradient orientation.

In one embodiment, each gradient magnitude threshold starts with the initial gradient magnitude threshold, adjusted based on the edge strength of the gradient orientations. For example, (i) for gradient orientations that are determined to be weak, the initial gradient magnitude threshold is decreased (so more pixels with that orientation pass the threshold), and (ii) for gradient orientations that are determined to be strong, the initial gradient magnitude threshold is increased (so fewer pixels with that orientation pass the threshold). Stated in another fashion, the initial gradient magnitude threshold is decreased for gradient orientations with weak edges, while the initial gradient magnitude threshold is increased for gradient orientations with strong edges. Thus, the present invention provides an adaptive threshold that is adjusted based on the strength or weakness of the edges. In one embodiment, the amount of increase and decrease will depend upon the value of the respective sums. As non-exclusive examples, the increase or decrease can be approximately five (5), ten (10), fifteen (15), or twenty (20) percent from the initial gradient magnitude threshold.

Using this procedure, fewer pixels from the gradient orientations having strong edges and more pixels from the gradient orientations with weak edges will be used in the PSF estimation than if a single gradient magnitude threshold is used for all of the gradient orientations. As a result thereof, a balanced selection of gradient pixels composed of strong edge and weak edges are used in PSF estimation. Moreover, the PSF estimation provided herein with the adaptive gradient pixel mask is less likely to be overly influenced by strong edges. As provided herein, the problem of reducing strong scene edge bias in PSF estimation is solved by introducing an adaptive gradient mask to select a balance of pixels with strong/weak orientations.

As a simplified example, if at step 3450, (i) the first edge strength is determined to be the largest; (ii) the second edge strength is determined to be the second largest; (iii) the third edge strength is determined to be the third largest; (iv) the fourth edge strength is determined to be the fourth largest; (v) the fifth edge strength is determined to be the fifth largest; (vi) the sixth edge strength is determined to be the sixth largest; (vii) the seventh edge strength is determined to be the seventh largest; and (viii) the eight edge strength is determined to be the eight largest. Then, in this simplified example, (i) the first gradient magnitude threshold is set to be the largest; (ii) the second gradient magnitude threshold is set to be the second largest; (iii) the third gradient magnitude threshold is set to be the third largest; (iv) the fourth gradient magnitude threshold is set to be the fourth largest; (v) the fifth gradient magnitude threshold is set to be the fifth largest; (vi) the sixth gradient magnitude threshold is set to be the sixth largest; (vii) the seventh gradient magnitude threshold is set to be the seventh largest; and (viii) the eighth gradient magnitude threshold is set to be the eighth largest.

Further, in this simplified example, (i) four of the gradient magnitude thresholds can be greater than the initial gradient magnitude threshold, and (ii) four of the gradient magnitude thresholds can be less than the initial gradient magnitude threshold. In an alternative example, (i) three of the gradient magnitude thresholds can be greater than the initial gradient magnitude threshold, and (ii) five of the gradient magnitude thresholds can be less than the initial gradient magnitude threshold. It should be noted that the thresholds can be adjusted as necessary to maintain the predetermined number of pixels used for the PSF estimation.

Subsequently, at step 3454, the adaptive gradient pixel mask is calculated to identify (i) all the first gradient pixels having a magnitude greater than the first gradient magnitude threshold; (ii) all the second gradient pixels having a magnitude greater than the second gradient magnitude threshold; (iii) all the third gradient pixels having a magnitude greater than the third gradient magnitude threshold; (iv) all the fourth gradient pixels having a magnitude greater than the fourth gradient magnitude threshold; (v) all the fifth gradient pixels having a magnitude greater than the fifth gradient magnitude threshold; (vi) all the sixth gradient pixels having a magnitude greater than the sixth gradient magnitude threshold; (vii) all the seventh gradient pixels having a magnitude greater than the seventh gradient magnitude threshold; and (viii) all the eighth gradient pixels having a magnitude greater than the eight gradient magnitude threshold. Thus, using the adaptive gradient pixel mask, the pixels of the image region use for PSF estimation can be identified.

Subsequently, at step 3456, a region point spread function for the selected image region is estimated using the identified gradient pixels. The region point spread function can be calculated using any standard point spread function estimation method, such as reformulating it as an optimization problem in which a PSF cost function and a latent sharp image cost function are minimized. In addition to alternating minimization of the latent sharp image estimation cost function, and the PSF estimation cost function, it is also common to use a multi-resolution approach, where first, low resolution versions of the latent sharp image L and the PSF kernel K are estimated using a heavily downsampled blurry image region, and then these estimates are refined at higher and higher resolution, until the full resolution of the given blurred image region is reached.

Optionally, at step 3457, the point spread function mask described in reference to FIG. 32 can also be used to crop the calculated point spread function kernel to further reduce the influence of strong edge bias.

Next, at block 3458, the image regions are evaluated to determine if all of the desired image regions 3118 have been evaluated to estimate a region point spread function 3616. If not, at block 3460, a previously unselected image region is selected and blocks 3446-3457 are repeated until all of the image regions desired to be evaluated are, and a separate region point spread function 3616 is estimated for each of these image regions.

Finally, and optionally, at block 3462, a latent sharp image or portion thereof, can be generated using one or more of the region point spread functions 3616.

Figure 36:
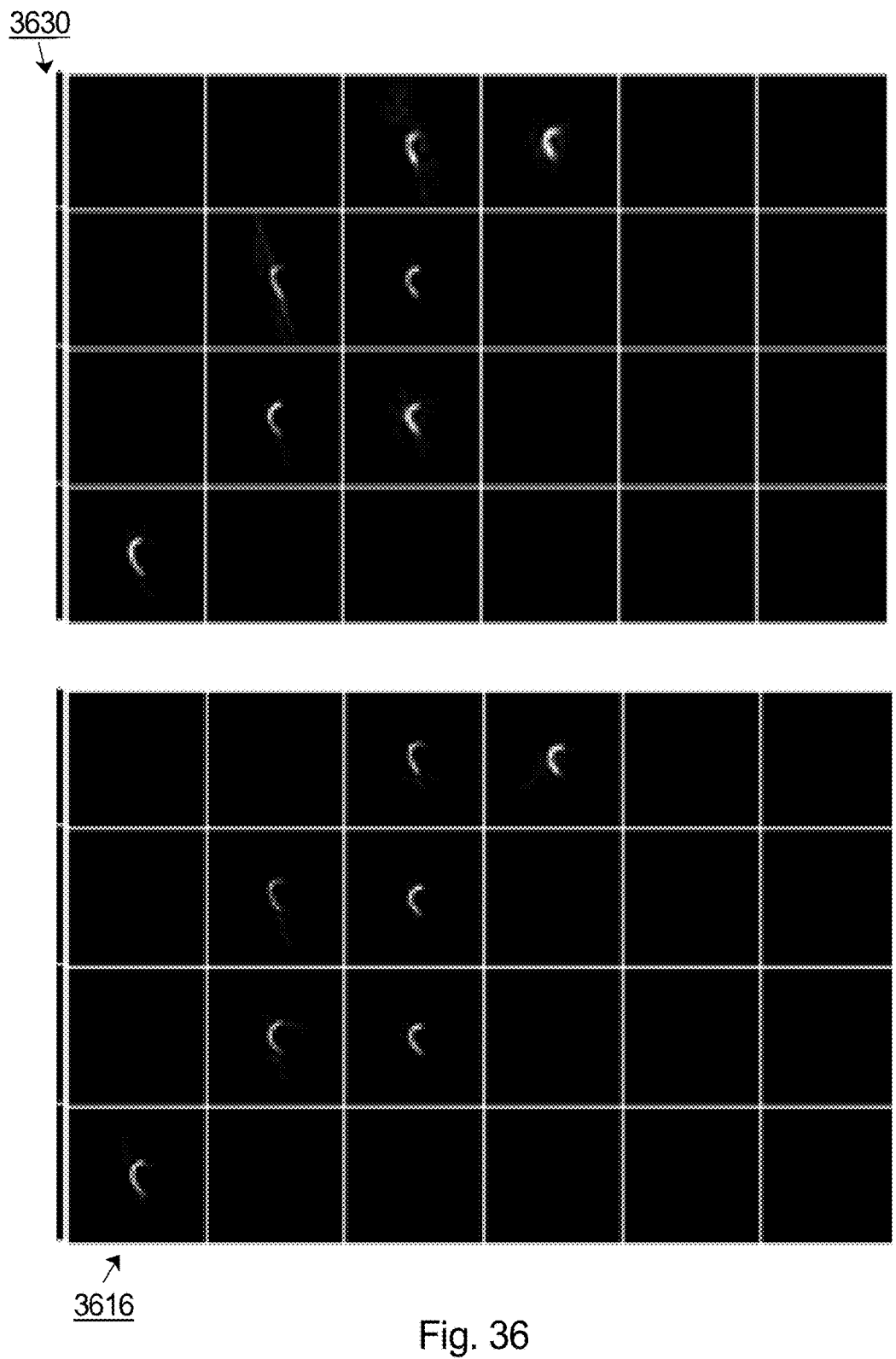
FIG. 36 is a simplified illustration of the region point spread functions for a plurality of the image regions calculated with a prior art method; and the region point spread function calculated for a plurality of the image regions calculated using the method of FIG. 34.

FIG. 36 is a simplified illustration of the region point spread functions 3630 for a plurality of the image region calculated with a prior art method; and the region point spread functions 3616 calculated for the plurality of the image regions calculated using the methods provided herein. The region point spread functions 3616 calculated with the methods provided herein are believed to be more accurate and less influenced by strong edge bias or unreliable edge/texture information.

In this example, the point spread functions 3630, 3616 were estimated for only seven of the twenty-four image regions 3118.

It should be noted that the one or more of the methods provided herein can be performed by the same control system or by different control systems.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for evaluating an image to identify areas of the image that are suitable for point spread function estimation, the method comprising:
    selecting a first image region from the image with a control system that includes a processor, the first image region including a plurality of pixels;
    estimating gradients in at least a portion of the first image region with the control system by analyzing each of the pixels in the at least a portion of the first image region;
    identifying a first region feature of the first image region with the control system, the first region feature being a low-level feature that is related to an accuracy of the point spread function estimation;
    calculating a first feature value for the first region feature with the control system utilizing the estimated gradients in the at least a portion of the first image region;
    transforming the first feature value into a first feature score for the first image region with the control system;
    computing a first region score for the first image region with the control system that is based at least in part on the first feature score; and
    evaluating the first region score with the control system to determine if the first image region is suitable for point spread function estimation.

2. The method of claim 1 wherein identifying includes the first region feature being selected from a group that includes edge skewness, number of edges, gradient dynamic range, block intensity, and highlight of the image region.

3. The method of claim 1 wherein identifying includes the steps of creating a histogram of gradient directions, and identifying the first region feature using the histogram of the gradient directions.

4. The method of claim 1 further comprising identifying a second region feature of the first image region with the control system, the second region feature being a low-level feature that is related to the accuracy of the point spread function estimation.

5. The method of claim 4 wherein identifying the first region feature and identifying the second region feature include each of the first region feature and the second region feature being selected from a group that includes edge skewness, number of edges, gradient dynamic range, block intensity, and highlight of the image region.

6. The method of claim 1 further comprising identifying a second region feature of the first image region with the control system, the second region feature being a low-level feature that is related to the accuracy of the point spread function estimation; calculating a second feature value for the second region feature utilizing the estimated gradients in the at least a portion of the first image region; and transforming the second feature value into a second feature score for the first image region with the control system; and wherein the step of computing includes computing the first region score for the first image region with the control system that is based at least in part on the first feature score and the second feature score.

7. The method of claim 1 further comprising (i) selecting a second image region from the image with the control system, the second image region including a plurality of second pixels; (ii) estimating gradients in at least a portion of the second image region with the control system by analyzing each of the second pixels in the at least a portion of the second image region; (iii) identifying a second region feature of the second image region with the control system, the second region feature being a low-level feature that is related to the accuracy of the point spread function estimation; and (iv) calculating a second feature value for the second region feature with the control system utilizing the estimated gradients in the at least a portion of the second image region.

8. The method of claim 7 further comprising transforming the second feature value into a second feature score for the second image region with the control system; and computing a second region score for the second image region with the control system that is based at least in part on the second feature score.

9. The method of claim 8 further comprising comparing the first region score with the second region score to determine which of the first image region and the second image region is more suitable for point spread function estimation.

10. The method of claim 1 wherein the step of evaluating includes comparing the first region score to a predetermined score threshold with the control system to evaluate if the first image region is suitable for point spread function estimation.

11. A system for evaluating an image to identify areas of the image that are suitable for point spread function estimation, the system comprising:

a control system that includes a processor that (i) selects a first image region from the image, the first image region including a plurality of pixels; (ii) estimates gradients in at least a portion of the first image region by analyzing each of the pixels in the at least a portion of the first image region; (iii) identifies a first region feature of the first image region, the first region feature being a low-level feature that is related to an accuracy of the point spread function estimation; (iv) calculates a first feature value for the first region feature utilizing the estimated gradients in the at least a portion of the first image region; (v) transforms the first feature value into a first feature score for the first image region; (vi) computes a first region score for the first image region that is based at least in part on the first feature score; and (vii) evaluates the first region score to determine if the first image region is suitable for point spread function estimation.

12. The system of claim 11 wherein the first region feature is selected from a group that includes edge skewness, number of edges, gradient dynamic range, block intensity, and highlight of the image region.

13. The system of claim 11 wherein the control system creates a histogram of gradient directions, and identifies the first region feature using the histogram of the gradient directions.

14. The system of claim 11 wherein the control system identifies a second region feature of the first image region, the second region feature being a low-level feature that is related to the accuracy of the point spread function estimation.

15. The system of claim 14 wherein the first region feature and the second region feature are each selected from a group that includes edge skewness, number of edges, gradient dynamic range, block intensity, and highlight of the image region.

16. The system of claim 11 wherein the control system further (i) selects a second image region from the image, the second image region including a plurality of second pixels; (ii) estimates gradients in at least a portion of the second image region by analyzing each of the second pixels in the at least a portion of the second image region; (iii) identifies a second region feature of the second image region, the second region feature being a low-level feature that is related to the accuracy of the point spread function estimation; and (iv) calculating a second feature value for the second region feature utilizing the estimated gradients in the at least a portion of the second image region.

17. The system of claim 16 wherein the control system further (i) transforms the second feature value into a second feature score for the second image region; (ii) computes a second region score for the second image region that is based at least in part on the second feature score; and (iii) compares the first region score with the second region score to determine which of the first image region and the second image region is more suitable for point spread function estimation.

18. The system of claim 11 wherein the control system further compares the first region score to a predetermined score threshold to evaluate if the first image region is suitable for point spread function estimation.

19. A method for evaluating an image to identify areas of the image that are suitable for point spread function estimation, the method comprising:

selecting a first image region from the image with a control system that includes a processor, the first image region including a plurality of pixels;

estimating gradients in at least a portion of the first image region with the control system by analyzing each of the pixels in the at least a portion of the first image region;

identifying a first region feature of the first image region with the control system, the first region feature being a low-level feature that is related to an accuracy of the point spread function estimation;

calculating a first feature value for the first region feature with the control system utilizing the estimated gradients in the at least a portion of the first image region; and determining if the first image region is suitable for point spread function estimation with the control system based at least in part on the first feature value.

20. The method of claim 19 wherein identifying includes the first region feature being selected from a group that includes edge skewness, number of edges, gradient dynamic range, block intensity, and highlight of the image region.

* * * * *